United States Patent
Uera et al.

(10) Patent No.: US 12,240,978 B2
(45) Date of Patent: Mar. 4, 2025

(54) METHODS FOR PRODUCING POLYCARBONATE COPOLYMER AND POLYSILOXANE COMPOUND, POLYCARBONATE COPOLYMER, POLYSILOXANE COMPOUND, COMPOSITION, AND MOLDED BODY

(71) Applicant: MITSUBISHI GAS CHEMICAL COMPANY, INC., Tokyo (JP)

(72) Inventors: Kazuyoshi Uera, Tokyo (JP); Kohei Kamatani, Tokyo (JP); Keisuke Tomita, Tokyo (JP); Hisato Akimoto, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 46 days.

(21) Appl. No.: 17/492,937

(22) Filed: Oct. 4, 2021

(65) Prior Publication Data
US 2022/0033655 A1 Feb. 3, 2022

Related U.S. Application Data

(63) Continuation of application No. 17/439,490, filed as application No. PCT/JP2020/012523 on Mar. 19, 2020.

(30) Foreign Application Priority Data

Mar. 22, 2019 (JP) .................. 2019-055563
Mar. 22, 2019 (JP) .................. 2019-055569

(51) Int. Cl.
*C08L 83/16* (2006.01)
*C08G 64/08* (2006.01)
(Continued)

(52) U.S. Cl.
CPC ............ *C08L 83/16* (2013.01); *C08G 64/085* (2013.01); *C08G 64/1666* (2013.01);
(Continued)

(58) Field of Classification Search
CPC ........ C08G 77/52; C08G 77/60; C08G 65/38; C08G 65/4082; C08G 65/42
See application file for complete search history.

(56) References Cited

U.S. PATENT DOCUMENTS 3,067,169 A 12/1962 Krimm et al.
4,026,827 A * 5/1977 Steffen ................... C08G 77/60
528/25
(Continued)

FOREIGN PATENT DOCUMENTS

EP 398049 A2 * 11/1990
JP 62-297319 A 12/1987
(Continued)

OTHER PUBLICATIONS

"Synthesis of Polyaryloxysilane by Melt-polymerizing Dianilino- and Diphenoxysilanes with Aromatic Diols" authored by Dunnavant et al. and published in the Journal of Polymer Science: Part A-1 (1967) 5, 707-724.*
(Continued)

*Primary Examiner* — Marc S Zimmer
(74) *Attorney, Agent, or Firm* — GREENBLUM & BERNSTEIN, P.L.C.

(57) ABSTRACT

A method for producing a polycarbonate copolymer which has siloxane constituent units represented by any of formulae (1-1)′ to (1-4)′ and prescribed polycarbonate constituent units, the method having a polymerization step for polymerizing a silane-based compound selected from among a prescribed diaryloxysilane compound, a prescribed dialkoxysilane compound and a prescribed silicon compound, a carbonate compound and a diol compound such as an aromatic diol compound or an alicyclic diol compound in the presence of a transesterification catalyst. The polymerization step is carried out in a molten state under reduced pressure while removing alcohols derived from the carbonate compound.

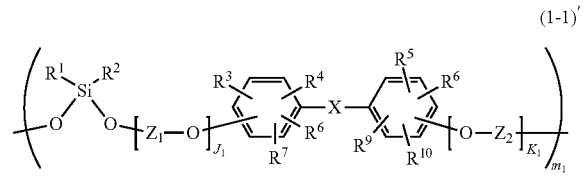

(1-1)′

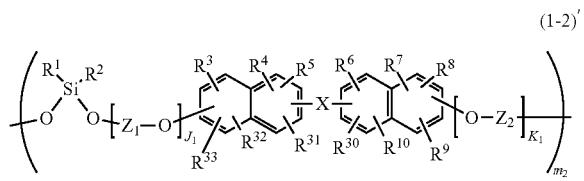

(1-2)′

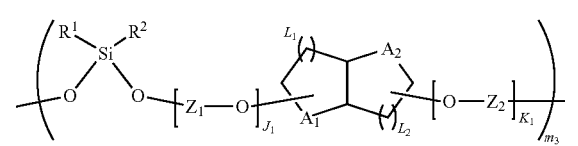

(1-3)′

(Continued)

-continued

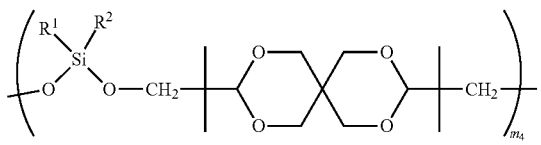

(1-4)'

12 Claims, No Drawings

(51) Int. Cl.
| | |
|---|---|
| C08G 64/16 | (2006.01) |
| C08G 64/38 | (2006.01) |
| C08G 77/448 | (2006.01) |
| C08G 77/60 | (2006.01) |
| C08L 69/00 | (2006.01) |
| G02B 1/04 | (2006.01) |
| C08G 77/00 | (2006.01) |
| C08G 77/08 | (2006.01) |

(52) U.S. Cl.
CPC ........... *C08G 64/38* (2013.01); *C08G 77/448* (2013.01); *C08G 77/60* (2013.01); *C08L 69/00* (2013.01); *G02B 1/041* (2013.01); *C08G 77/08* (2013.01); *C08G 77/80* (2013.01)

(56) References Cited

U.S. PATENT DOCUMENTS

| | | | | |
|---|---|---|---|---|
| 4,172,806 | A | * | 10/1979 | Vincent ................ C07F 7/0838 252/573 |
| 5,391,691 | A | | 2/1995 | Yokoyama et al. |
| 5,633,332 | A | | 5/1997 | Land et al. |
| 6,407,193 | B1 | | 6/2002 | Hiiro et al. |
| 6,476,249 | B1 | | 11/2002 | Ito |
| 7,241,851 | B2 | * | 7/2007 | Cella ...................... C07G 1/00 528/21 |
| 2013/0267665 | A1 | | 10/2013 | Huggins et al. |
| 2014/0014884 | A1 | | 1/2014 | Hayashida |
| 2014/0206826 | A1 | | 7/2014 | Isahaya et al. |
| 2016/0264726 | A1 | | 9/2016 | Isahaya et al. |
| 2017/0174833 | A1 | | 6/2017 | Isahaya et al. |
| 2020/0407499 | A1 | | 12/2020 | Ideta et al. |

FOREIGN PATENT DOCUMENTS

| | | | |
|---|---|---|---|
| JP | 7-97439 | A | 4/1995 |
| JP | 8-502537 | A | 3/1996 |
| JP | 9-235375 | A | 9/1997 |
| JP | 2015-512999 | A | 4/2015 |
| JP | 2016-148047 | A | 8/2016 |
| WO | 1998/007773 | A1 | 2/1998 |
| WO | 2000/018822 | A1 | 4/2000 |
| WO | 2000/18822 | A1 | 4/2000 |
| WO | WO 2020-064916 | * | 4/2020 |

OTHER PUBLICATIONS

Extended European Search Report issued in corresponding European Patent Application No. 21204453.1 dated Apr. 4, 2022.
Office Action that issued in U.S. Appl. No. 17/439,490 dated Aug. 22, 2023.
Schnell, H., "Chemistry and Physics of Polycarbonates", Interscience Publishers, 1964, pp. 44-51.
Liaw et al., "Synthesis and Characterization of Novel Polyaryloxydiphenylsilane Derived From 2,2'-Dimethyl-biphenyl-4,4'-Diol", Journal of Polymer Science: Part A: Polymer Chemistry, vol. 37, 4591-4595 (1999).
Pacansky, T.J. et al., "Synthesis and Thermomechanical Properties of Alternating Copolymers Containing Bisphenol-A", Journal of Polymer Science, vol. 18, 1980, pp. 3119-3127.
International Search Report issued in International Patent Application No. PCT/JP2020/012523, dated Jun. 2, 2020, along with English translation thereof.
Written Opinion of the International Searching Authority issued in International Patent Application No. PCT/JP2020/012523, dated Jun. 2, 2020, along with English translation thereof.
Office Action that issued in related co-pending U.S. Appl. No. 17/439,490 dated Dec. 20, 2023.
Office Action that issued to corressponding U.S. Appl. No. 17/439,490, dated on Apr. 24, 2024.

* cited by examiner

METHODS FOR PRODUCING POLYCARBONATE COPOLYMER AND POLYSILOXANE COMPOUND, POLYCARBONATE COPOLYMER, POLYSILOXANE COMPOUND, COMPOSITION, AND MOLDED BODY

CROSS REFERENCE TO RELATED APPLICATIONS

The present application is a continuation of U.S. patent application Ser. No. 17/439,490, filed on Sep. 15, 2021, which is a National Phase application of Int. Appl. No. PCT/JP2020/012523, filed on Mar. 19, 2020, and claims the benefit of Japanese Pat. Appl. No. 2019-055569, filed on Mar. 22, 2019, and Japanese Pat. Appl. No 2019-055563, filed on Mar. 22, 2019. The entire disclosure of each of the above-identified applications, including the specification, any drawings, and claims, is incorporated herein by reference in its entirety.

TECHNICAL FIELD

The present invention relates to a method for producing a polycarbonate copolymer and a polysiloxane compound, in particular, a method for producing a polycarbonate copolymer having a siloxane constituent unit, a polycarbonate copolymer, and the like.

BACKGROUND ART

A thermoplastic polycarbonate resin has excellent impact resistance and mechanical properties, and is processed into a variety of molded products according to a processing method that is simple and is excellent in terms of productivity, such as injection molding. Such a thermoplastic polycarbonate resin is utilized in a wide variety of industrial fields, such as electrical and electric equipment, OA equipment, heavy electrical machinery, precision machinery, and automotive field.

The conventional polycarbonate resin has been disadvantageous in that its high melt viscosity would lead to poor fluidity, and thus that it has been difficult to perform injection molding on precision parts or thin products thereof. Hence, the conventional polycarbonate resin has conventionally been problematic in that it is necessary to increase the temperature in mold fabrication, and in that the molding cycle is prolonged in molding performed under high-temperature conditions, thereby leading to high costs, or the polycarbonate resin is deteriorated during molding. Thus, an attempt to improve the fluidity of the polycarbonate resin has been made (Patent Literature 1 and Patent Literature 2). However, sufficiently high fluidity has not been necessarily realized without impairing the original properties of the polycarbonate resin (impact resistance, etc.).

Other than the polycarbonate resin, an aromatic polysiloxane polymer that is, what is called, polyarylene siloxane, has been known as a material for a molded product obtained by a molding method such as, for example, injection molding (e.g., Patent Literature 3). In recent years, the importance of polysiloxane compounds such as polyarylene siloxane has been increased, and such polyarylene siloxane has been used, for example, as a release layer or a photoresist material in photocopy, a plasticizer for polycarbonate, or a component of a powder surface coating system.

As methods for producing polysiloxane compounds such as polyarylene siloxanes, there have been known: a method for producing a polysiloxane compound, in which hydrochloric acid is generated because dimethyldichlorosilane is allowed to react with bisphenol A in a solvent (Non Patent Literature 1); a method for producing a polysiloxane compound, comprising performing a reaction in a solvent to which acetic acid is added (Patent Literature 4); and the like.

Meanwhile, a polycarbonate resin, a polysiloxane compound and the like, which are particularly suitable for a specific purpose such as an optical purpose, have not been necessarily realized, so far.

PRIOR ART DOCUMENTS

Patent Documents

Patent Literature 1: JP Patent Publication (Kokai) No. 2016-148047 A
Patent Literature 2: JP Patent Publication (Kokai) No. 62-297319 A (1987)
Patent Literature 3: JP Patent Publication (Kohyo) No. 08-502537 A (1996)
Patent Literature 4: JP Patent Publication (Kohyo) No. 2015-512999 A

Non-Patent Documents

Non Patent Literature 1: Journal of Polymer Science, Vol. 18, 3119-3127 (1980)

SUMMARY OF INVENTION

Problems to be Solved by the Invention

Provided are: a polycarbonate copolymer comprising a siloxane constituent unit and having excellent impact resistance and high fluidity upon melting; a method for efficiently producing such a polycarbonate copolymer; and the like.

Moreover, provided are: a method for safely and efficiently producing a polycarbonate copolymer having a siloxane constituent unit, and a polysiloxane compound; and the like. For example, provided is a method for efficiently producing a polycarbonate copolymer and a polysiloxane compound such as polyarylene siloxane, which is not attended with generation of corrosive substances such as hydrochloric acid or acetic acid and does not need the use of a solvent, while enabling a reduction in environmental load.

Furthermore, provided are a polycarbonate resin, a polysiloxane compound, and the like, which are particularly suitable for a specific purpose such as an optical purpose.

Means for Solving the Problems

The present invention provides: a polycarbonate copolymer comprising a siloxane constituent unit and having excellent impact resistance and high fluidity, as described below; a method for producing the polycarbonate copolymer, and the like.

The present invention also provides: a method for efficiently producing a polycarbonate copolymer or a polysiloxane compound, which does not generate by-products causing high environmental load, such as acids, and which can be carried out without using solvents, in particular, without using solvents requiring safety considerations; a polysiloxane compound; and the like.

[1] A method for producing a polycarbonate copolymer having a siloxane constituent unit represented by any one of the following formula (1-1) to formula (1-4) and a polycarbonate constituent unit represented by any one of the following formula (3-1) to formula (3-4), wherein
the method has a polymerization step of polymerizing:
in the presence of a transesterification catalyst,
a silane compound selected from:
  a diaryloxy silane compound comprising, at least, any one of dialkyldiaryloxy silane, diaryldiaryloxy silane, and monoalkylmonoaryldiaryloxy silane,
  a dialkoxy silane compound comprising, at least, any one of dialkyldialkoxy silane, diaryldialkoxy silane, and monoalkylmonoaryldialkoxy silane, and
  a silicon compound comprising at least one of a cyclic siloxane compound and a linear siloxane compound;
a carbonate compound; and
a diol compound comprising an aromatic diol compound or an alicyclic diol compound, wherein
in the polymerization step, the polycarbonate copolymer is produced, while removing alcohol derived from the carbonate compound, in a molten state and under reduced pressure:

[Formula 1]

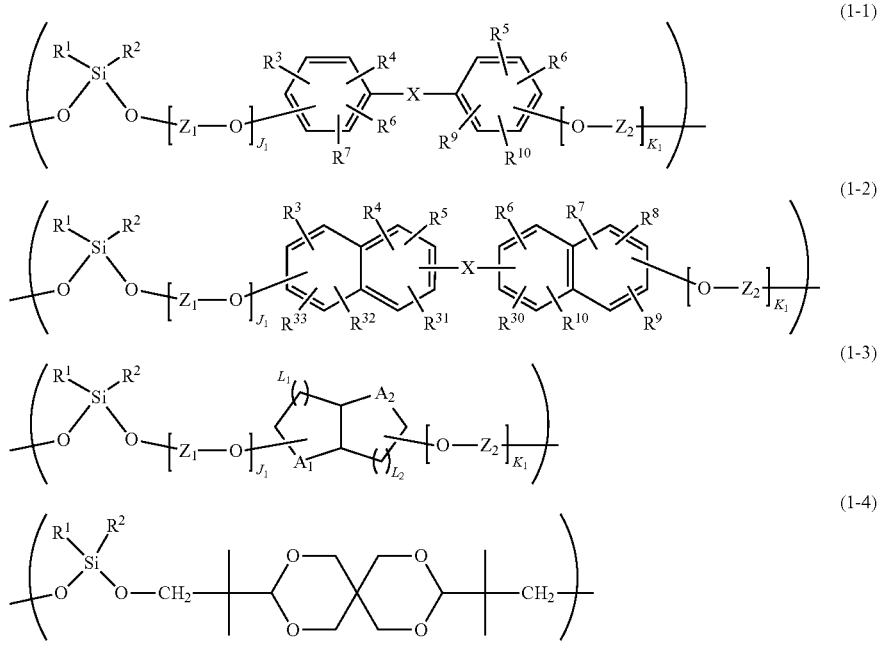

wherein, in the above formulae (1-1) to (1-4), $R^1$ and $R^2$ each independently represent an alkyl group containing 1 to 20 carbon atoms and optionally having a substituent, or an aryl group containing 6 to 30 carbon atoms and optionally having a substituent, $R^3$ to $R^{10}$ and $R^{30}$ to $R^{33}$ each independently represent hydrogen, halogen, alkoxy, an alkyl group containing 1 to 20 carbon atoms and optionally having a substituent, an alkenyl group containing 2 to 20 carbon atoms and optionally having a substituent, or an aryl group containing 6 to 30 carbon atoms and optionally having a substituent, $Z_1$ and $Z_2$ each independently represent an alkylene group containing 1 to 5 carbon atoms and optionally having a substituent, $J_1$ each independently represents an integer of 0 or more and 5 or less, $K_1$ each independently represents an integer of 0 or more and 5 or less, $A_1$ and $A_2$ each independently represent either —O— or —CH—, $L_1$ and $L_2$ each independently represent an integer of 0 or more and 3 or less, and X represents a single bond or any one of structural formulae represented by the following formula (2):

[Formula 2]

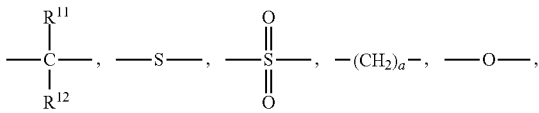

-continued

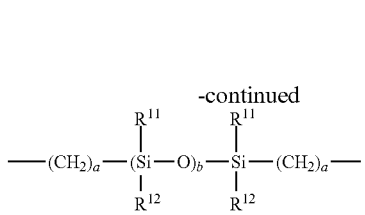

wherein $R^{11}$ and $R^{12}$ each independently represent hydrogen, halogen, an alkyl group containing 1 to 20 carbon atoms and optionally having a substituent, or an aryl group containing 6 to 30 carbon atoms and optionally having a substituent, or $R^{11}$ and $R^{12}$ bind to each other to form a carbocyclic or heterocyclic ring containing 1 to 20 carbon atoms and optionally having a substituent, and a and b each independently represent an integer of 0 or 1 or more and 5000 or less, and

[Formula 3]

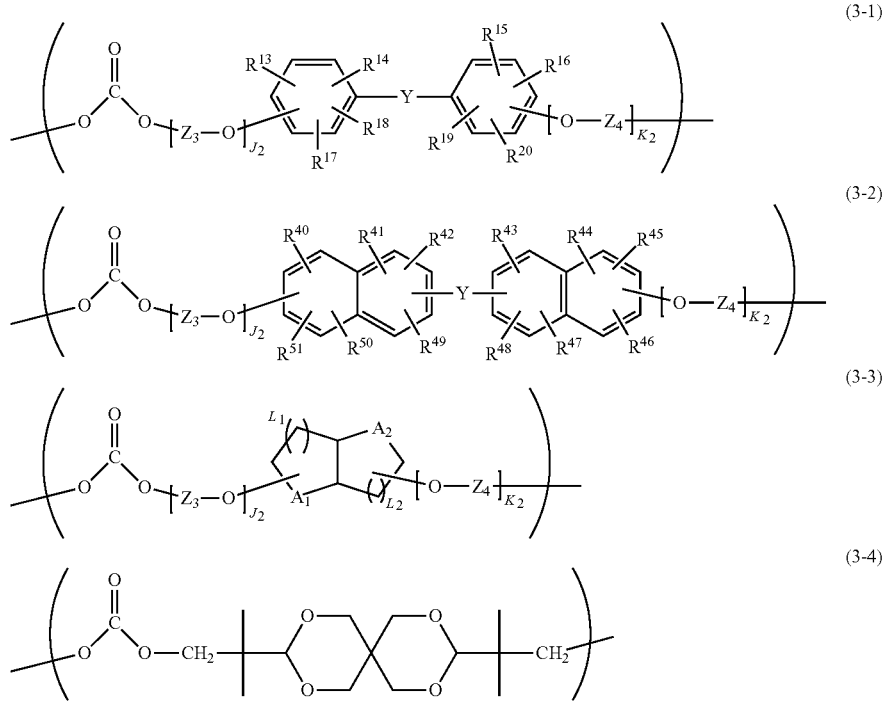

wherein, in the above formulae (3-1) to (3-4), $R^{13}$ to $R^{20}$ and $R^r$ to $R^{51}$ each independently represent hydrogen, halogen, alkoxy, an alkyl group containing 1 to 20 carbon atoms and optionally having a substituent, an alkenyl group containing 2 to 20 carbon atoms and optionally having a substituent, or an aryl group containing 6 to 30 carbon atoms and optionally having a substituent, $Z_3$ and $Z_4$ each independently represent an alkylene group containing 1 to 5 carbon atoms and optionally having a substituent, $J_2$ each independently represents an integer of 0 or more and 5 or less, $K_2$ each independently represents an integer of 0 or more and 5 or less, $A_1$ and $A_2$ each independently represent either —O— or —CH—, $L_1$ and $L_2$ each independently represent an integer of 0 or more and 3 or less, and Y represents a single bond or any one of structural formulae represented by the following formula (4):

[Formula 4]

(4)

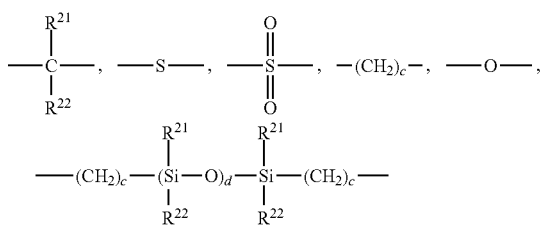

wherein $R^{21}$ and $R^{22}$ each independently represent hydrogen, halogen, an alkyl group containing 1 to 20 carbon atoms and optionally having a substituent, or an aryl group containing 6 to 30 carbon atoms and optionally having a substituent, or $R^{21}$ and $R^{22}$ bind to each other to form a carbocyclic or heterocyclic ring containing 1 to 20 carbon atoms and optionally having a substituent, and c and d each independently represent an integer of 0 or 1 or more and 5000 or less.

[2] The method for producing a polycarbonate copolymer according to the above [1], wherein $Z_1$ to $Z_4$ each independently represent an alkylene group containing 1 to 3 carbon atoms and optionally having a substituent, $J_1$ and $J_2$ each independently represent an integer of 0 or more and 2 or less, and $K_1$ and $K_2$ each independently represent an integer of 0 or more and 2 or less.

[3] The method for producing a polycarbonate copolymer according to the above [1] or [2], wherein the X has a siloxane constituent unit showing a fluorene ring structure formed by the binding of $R^{11}$ and $R^{12}$, and/or the Y has a polycarbonate constituent unit showing a fluorene ring structure formed by the binding of $R^2$ and $R^P$.

[4] A method for producing a polycarbonate copolymer having a siloxane constituent unit represented by the following formula (1) and a polycarbonate constituent unit represented by the following formula (3), wherein the method has a polymerization step of polymerizing:
in the presence of a transesterification catalyst,
a silane compound selected from:
a diaryloxy silane compound comprising, at least, any one of dialkyldiaryloxy silane, diaryldiaryloxy silane, and monoalkylmonoaryldiaryloxy silane, a dialkoxy silane compound comprising, at least, any one of dialkyldialkoxy silane, diaryldialkoxy silane, and monoalkylmonoaryldialkoxy silane, and a silicon compound comprising at least one of a cyclic siloxane compound and a linear siloxane compound;

a carbonate compound; and a diol compound comprising an aromatic diol compound or an alicyclic diol compound, wherein in the polymerization step, the polycarbonate copolymer is produced, while removing alcohol derived from the carbonate compound, in a molten state and under reduced pressure:

[Formula 5]

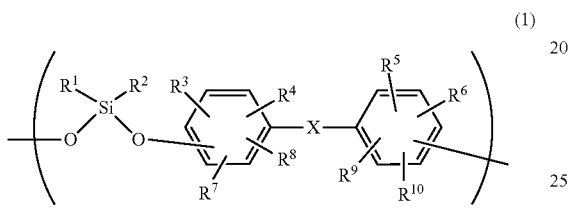

(1)

wherein $R^1$ and $R^2$ each independently represent an alkyl group containing 1 to 20 carbon atoms and optionally having a substituent, or an aryl group containing 6 to 30 carbon atoms and optionally having a substituent, $R^3$ to $R^{10}$ each independently represent hydrogen, halogen, alkoxy, an alkyl group containing 1 to 20 carbon atoms and optionally having a substituent, an alkenyl group containing 2 to 20 carbon atoms and optionally having a substituent, or an aryl group containing 6 to 30 carbon atoms and optionally having a substituent, and X represents any one of structural formulae represented by the following formula (2):

[Formula 6]

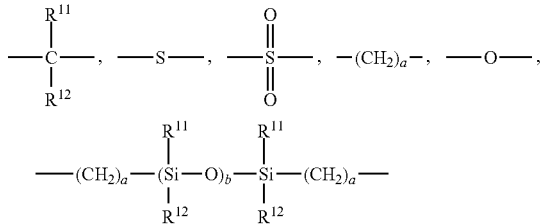

(2)

wherein $R^{11}$ and $R^{12}$ each independently represent hydrogen, halogen, an alkyl group containing 1 to 20 carbon atoms and optionally having a substituent, or an aryl group containing 6 to 30 carbon atoms and optionally having a substituent, or $R^{11}$ and $R^{12}$ bind to each other to form a carbocyclic or heterocyclic ring containing 1 to 20 carbon atoms and optionally having a substituent, and a and b each independently represent an integer of 0 or 1 or more and 5000 or less, and

[Formula 7]

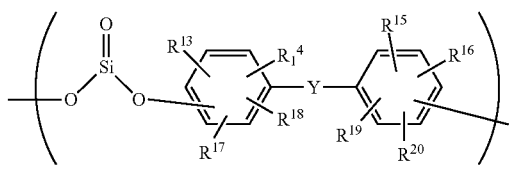

(3)

wherein $R^{13}$ to $R^{20}$ each independently represent hydrogen, halogen, alkoxy, an alkyl group containing 1 to 20 carbon atoms and optionally having a substituent, an alkenyl group containing 2 to 20 carbon atoms and optionally having a substituent, or an aryl group containing 6 to 30 carbon atoms and optionally having a substituent, and Y represents any one of structural formulae represented by the following formula (4):

[Formula 8]

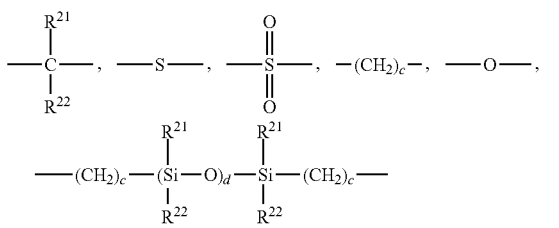

(4)

wherein $R^{21}$ and $R^{22}$ each independently represent hydrogen, halogen, an alkyl group containing 1 to 20 carbon atoms and optionally having a substituent, or an aryl group containing 6 to 30 carbon atoms and optionally having a substituent, or $R^{21}$ and $R^{22}$ bind to each other to form a carbocyclic or heterocyclic ring containing 1 to 20 carbon atoms and optionally having a substituent, and c and d each independently represent an integer of 0 or 1 or more and 5000 or less.

[5] The method for producing a polycarbonate copolymer according to any one of the above [1] to [4], wherein the transesterification catalyst comprises an alkali metal compound and/or an alkaline-earth metal.

[6] The method for producing a polycarbonate copolymer according to the above [5], wherein the alkali metal compound and/or the alkaline-earth metal compound comprise a carbonate.

[7] The method for producing a polycarbonate copolymer according to any one of the above [1] to [6], wherein the weight average molecular weight of the polycarbonate copolymer is 10,000 to 300,000.

[8] The method for producing a polycarbonate copolymer according to any one of the above [1] to [7], wherein, in the polymerization step, the amount of the transesterification catalyst is $1.0 \times 10^{-7}$ to $1.0 \times 10^{-2}$ at a molar ratio, with respect to the diol compound.

[9] The method for producing a polycarbonate copolymer according to any one of the above [1] to [8], wherein the reaction temperature in the polymerization step is within a range of 150° C. or higher and 300° C. or lower.

[10] The method for producing a polycarbonate copolymer according to any one of the above [1] to [9], which further has a pressure reduction step of gradually reducing the reaction pressure to 400 Pa or less in the polymerization step.

[11] The method for producing a polycarbonate copolymer according to any one of the above [1] to [10], wherein, in the polymerization step, the carbonate compound is polymerized with the diol compound under a pressure of 400 Pa or less.

[12] The method for producing a polycarbonate copolymer according to any one of the above [1] to [11], wherein a solvent is not used in the polymerization step.

[13] The method for producing a polycarbonate copolymer according to any one of the above [1] to [12], wherein the ratio between the total number of moles of the carbonate compound and the diaryloxy silane compound and the mole number of the diol compound, used in the polymerization step, is 0.9 or more and 1.2 or less.

[14] The method for producing a polycarbonate copolymer according to any one of the above [1] to [13], wherein, in the polycarbonate copolymer, the mole number of the siloxane constituent unit is 1 to 1000, and the mole number of the polycarbonate constituent unit is 1 to 1000.

[15] The method for producing a polycarbonate copolymer according to any one of the above [1] to [14], wherein the molar ratio between the siloxane constituent unit and the polycarbonate constituent unit is 0.01:99.99 to 99.99:0.01.

[16] The method for producing a polycarbonate copolymer according to any one of the above [1] to [15], wherein the Q value of the polycarbonate copolymer measured under conditions of 280° C. and 160 kgf is 8 ($\times 10^{-2}$ cm$^3$ s$^{-1}$) or more.

[17] A polycarbonate copolymer having a siloxane constituent unit represented by any one of the following formula (1-1) to formula (1-4) and a polycarbonate constituent unit represented by any one of the following formula (3-1) to formula (3-4), and comprising 30% by weight or less of a low molecular weight compound having a weight average molecular weight of 1,000 or less:

[Formula 9]

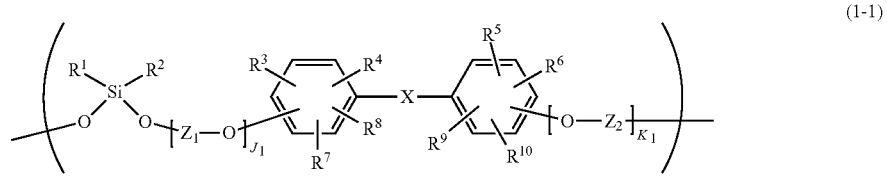

(1-1)

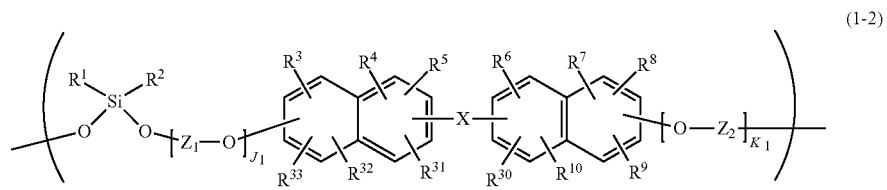

(1-2)

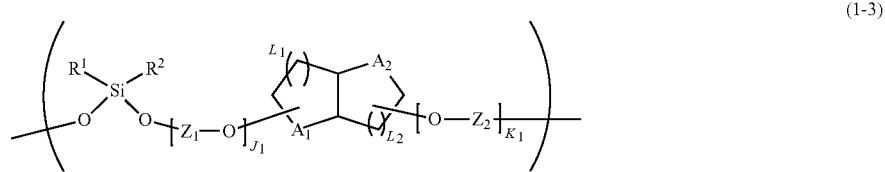

(1-3)

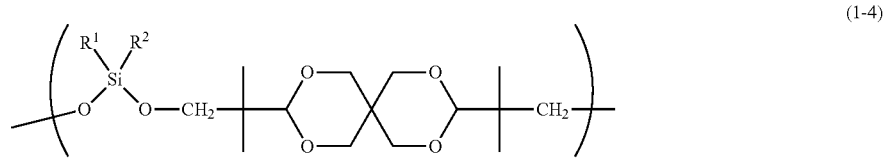

(1-4)

wherein, in the above formulae (1-1) to (1-4), $R^1$ and $R^2$ each independently represent an alkyl group containing 1 to 20 carbon atoms and optionally having a substituent, or an aryl group containing 6 to 30 carbon atoms and optionally having a substituent, $R^3$ to $R^{10}$ and $R^3$ to $R^{33}$ each independently represent hydrogen, halogen, alkoxy, an alkyl group containing 1 to 20 carbon atoms and optionally having a substituent, an alkenyl group containing 2 to 20 carbon atoms and optionally having a substituent, or an aryl group containing 6 to 30 carbon atoms and optionally having a substituent, $Z_1$ and $Z_2$ each independently represent an alkylene group containing 1 to 5 carbon atoms and optionally having a substituent, $J_1$ each independently represents an integer of 0 or more and 5 or less, $K_1$ each independently represents an integer of 0 or more and 5 or less, $A_1$ and $A_2$ each independently represent either —O— or —CH—, $L_1$ and $L_2$ each independently represent an integer of 0 or more and 3 or less, and X represents a single bond or any one of structural formulae represented by the following formula (2):

[Formula 10]

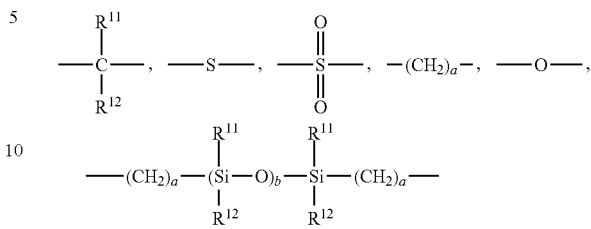

(2)

wherein $R^{11}$ and $R^{12}$ each independently represent hydrogen, halogen, an alkyl group containing 1 to 20 carbon atoms and optionally having a substituent, or an aryl group containing 6 to 30 carbon atoms and optionally having a substituent, or $R^{11}$ and $R^{12}$ bind to each other to form a carbocyclic or heterocyclic ring containing 1 to 20 carbon atoms and optionally having a substituent, and a and b each independently represent an integer of 0 or 1 or more and 5000 or less, and

[Formula 11]

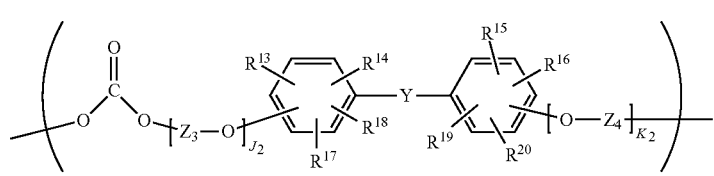

(3-1)

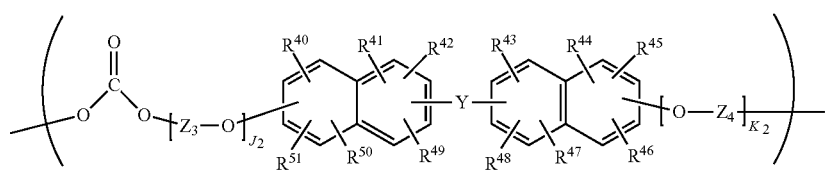

(3-2)

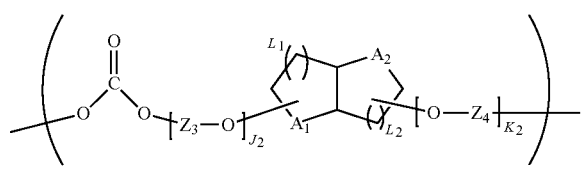

(3-3)

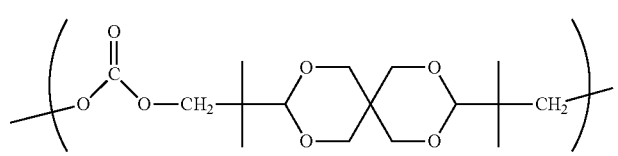

(3-4)

wherein, in the above formulae (3-1) to (3-4), $R^{13}$ to $R^{20}$ and $R^{40}$ to $R^{51}$ each independently represent hydrogen, halogen, alkoxy, an alkyl group containing 1 to 20 carbon atoms and optionally having a substituent, an alkenyl group containing 2 to 20 carbon atoms and optionally having a substituent, or an aryl group containing 6 to 30 carbon atoms and optionally having a substituent, $Z_3$ and $Z_4$ each independently represent an alkylene group containing 1 to 5 carbon atoms and optionally having a substituent, $J_2$ each independently represents an integer of 0 or more and 5 or less, $K_2$ each independently represents an integer of 0 or more and 5 or less, $A_1$ and $A_2$ each independently represent either —O— or —CH—, $L_1$ and $L_2$ each independently represent an integer of 0 or more and 3 or less, and Y represents a single bond or any one of structural formulae represented by the following formula (4):

[Formula 12]

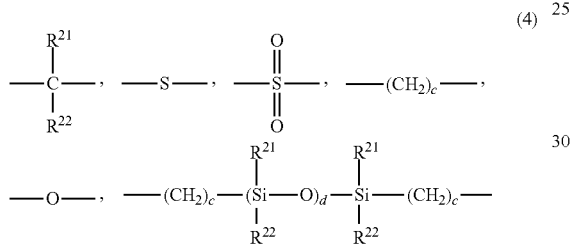

(4)

wherein $R^{21}$ and RP each independently represent hydrogen, halogen, an alkyl group containing 1 to 20 carbon atoms and optionally having a substituent, or an aryl group containing 6 to 30 carbon atoms and optionally having a substituent, or $R^{21}$ and $R^{22}$ bind to each other to form a carbocyclic or heterocyclic ring containing 1 to 20 carbon atoms and optionally having a substituent, and c and d each independently represent an integer of 0 or 1 or more and 5000 or less.

[18] The polycarbonate copolymer according to the above [17], wherein
$Z_1$ to $Z_4$ each independently represent an alkylene group containing 1 to 3 carbon atoms and optionally having a substituent,
$J_1$ and $J_2$ each independently represent an integer of 0 or more and 2 or less, and
$K_1$ and $K_2$ each independently represent an integer of 0 or more and 2 or less.

[19] The polycarbonate copolymer according to the above [17] or [18], wherein the X has a siloxane constituent unit showing a fluorene ring structure formed by the binding of $R^{11}$ and $R^{12}$, and/or the Y has a polycarbonate constituent unit showing a fluorene ring structure formed by the binding of $R^{21}$ and $R^{22}$.

[20] A polycarbonate copolymer having a siloxane constituent unit having the following formula (1) and a polycarbonate constituent unit represented by the following formula (3), wherein the percentage of a low molecular weight compound having a weight average molecular weight of 1,000 or less, which is calculated from the GPC area ratio, is 30% by weight or less:

[Formula 13]

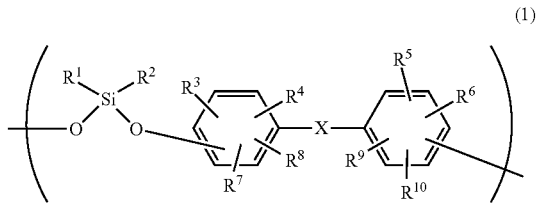

(1)

wherein $R^1$ and $R^2$ each independently represent an alkyl group containing 1 to 20 carbon atoms and optionally having a substituent, or an aryl group containing 6 to 30 carbon atoms and optionally having a substituent, $R^3$ to $R^{10}$ each independently represent hydrogen, halogen, alkoxy, an alkyl group containing 1 to 20 carbon atoms and optionally having a substituent, an alkenyl group containing 2 to 20 carbon atoms and optionally having a substituent, or an aryl group containing 6 to 30 carbon atoms and optionally having a substituent, and X represents any one of structural formulae represented by the following formula (2):

[Formula 14]

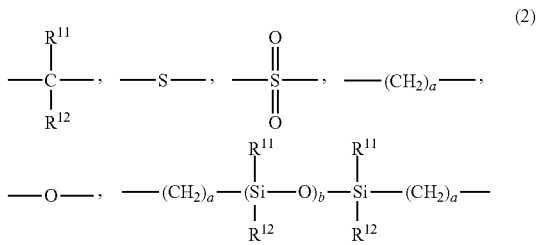

(2)

wherein $R^{11}$ and $R^{12}$ each independently represent hydrogen, halogen, an alkyl group containing 1 to 20 carbon atoms and optionally having a substituent, or an aryl group containing 6 to 30 carbon atoms and optionally having a substituent, or $R^{11}$ and $R^{12}$ bind to each other to form a carbocyclic or heterocyclic ring containing 1 to 20 carbon atoms and optionally having a substituent, and a and b each independently represent an integer of 0 or 1 or more and 5000 or less, and

[Formula 15]

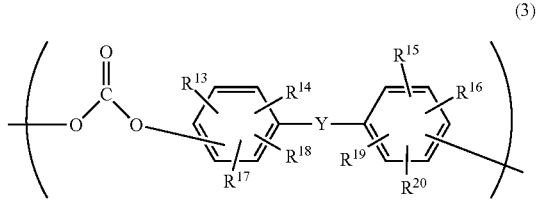

(3)

wherein $R^3$ to $R^{20}$ each independently represent hydrogen, halogen, alkoxy, an alkyl group containing 1 to 20 carbon atoms and optionally having a substituent, an alkenyl group containing 2 to 20 carbon atoms and optionally having a substituent, or an aryl group containing 6 to 30 carbon atoms and optionally having a substituent, and Y represents any one of structural formulae represented by the following formula (4):

[Formula 16]

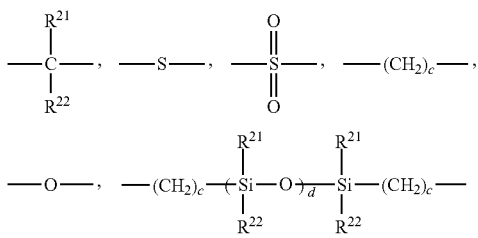

(4)

wherein $R^{21}$ and $R^{22}$ each independently represent hydrogen, halogen, an alkyl group containing 1 to 20 carbon atoms and optionally having a substituent, or an aryl group containing 6 to 30 carbon atoms and optionally having a substituent, or $R^{21}$ and Ru bind to each other to form a carbocyclic or heterocyclic ring containing 1 to 20 carbon atoms and optionally having a substituent, and c and d each independently represent an integer of 0 or 1 or more and 5000 or less.

[21] The polycarbonate copolymer according to any one of the above [17] to [20], wherein the mole number of the siloxane constituent unit is 1 to 1000, and the mole number of the polycarbonate constituent unit is 1 to 1000.

[22] The polycarbonate copolymer according to any one of the above [17] to [21], wherein the molar ratio between the siloxane constituent unit and the polycarbonate constituent unit is 0.01:99.9 to 99.9:0.01.

[23] The polycarbonate copolymer according to the above [22], wherein the molar ratio between the siloxane constituent unit and the polycarbonate constituent unit is 30.00:70.00 to 99.9:0.01.

[24] The polycarbonate copolymer according to any one of the above [17] to [23], wherein the Q value of the polycarbonate copolymer measured under conditions of 280° C. and 160 kgf is 8 ($\times 10^{-2}$ cm$^3$ s$^{-1}$) or more.

[25] A polycarbonate copolymer having a siloxane constituent unit represented by any one of the following formula (1-1) to formula (1-4) and a polycarbonate constituent unit represented by any one of the following formula (3-1) to formula (3-4), wherein the total content of ring forms represented by the following formulae (5-1) to (5-3) is 4.0% by weight or less:

[Formula 17]

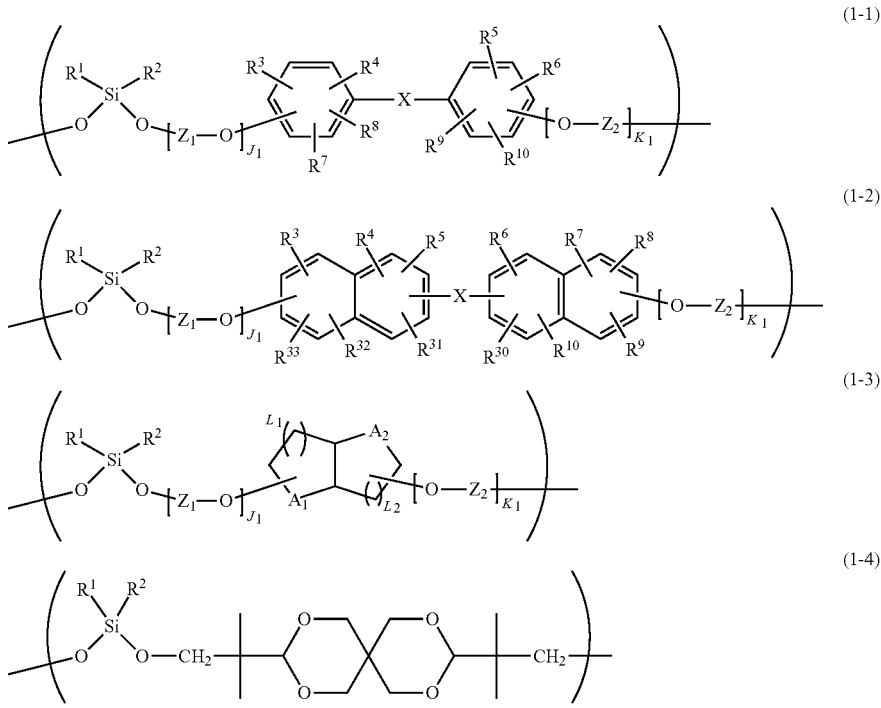

wherein, in the above formulae (1-1) to (1-4), $R^1$ and $R^2$ each independently represent an alkyl group containing 1 to 20 carbon atoms and optionally having a substituent, or an aryl group containing 6 to 30 carbon atoms and optionally having a substituent, $R^3$ to $R^{10}$ and $R^3$ to $R^{33}$ each independently represent hydrogen, halogen, alkoxy, an alkyl group containing 1 to 20 carbon atoms and optionally having a substituent, an alkenyl group containing 2 to 20 carbon atoms and optionally having a substituent, or an aryl group containing 6 to 30 carbon atoms and optionally having a substituent, $Z_1$ and $Z_2$ each independently represent an alkylene group containing 1 to 5 carbon atoms and optionally having a substituent, $J_1$ each independently represents an integer of 0 or more and 5 or less, $K_1$ each independently represents an integer of 0 or more and 5 or less, $A_1$ and $A_2$ each independently represent either —O— or —CH—, $L_1$ and $L_2$ each independently represent an integer of 0 or more and 3 or less, and X represents a single bond or any one of structural formulae represented by the following formula (2):

[Formula 18]

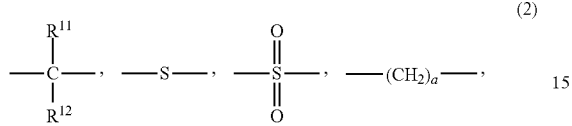

(2)

[Formula 19]

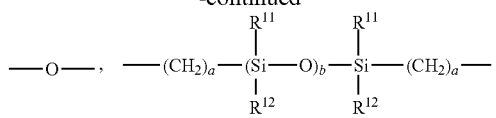

wherein $R^{11}$ and $R^{12}$ each independently represent hydrogen, halogen, an alkyl group containing 1 to 20 carbon atoms and optionally having a substituent, or an aryl group containing 6 to 30 carbon atoms and optionally having a substituent, or $R^{11}$ and $R^{12}$ bind to each other to form a carbocyclic or heterocyclic ring containing 1 to 20 carbon atoms and optionally having a substituent, and a and b each independently represent an integer of 0 or 1 or more and 5000 or less, and

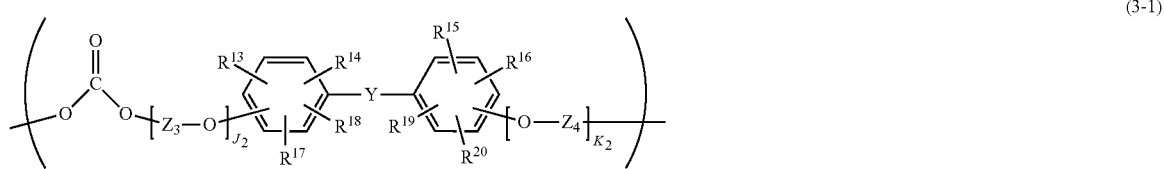

(3-1)

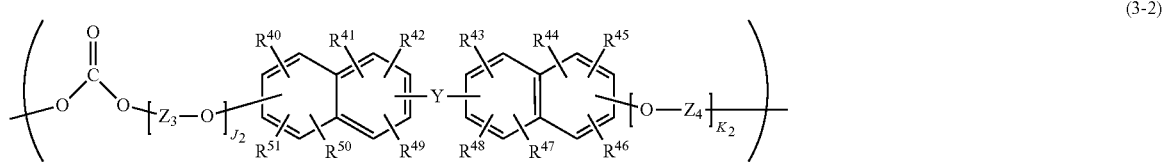

(3-2)

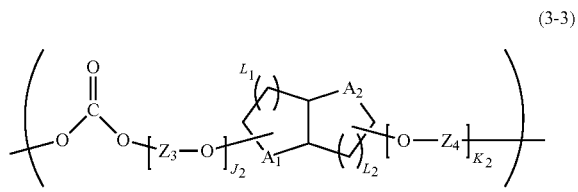

(3-3)

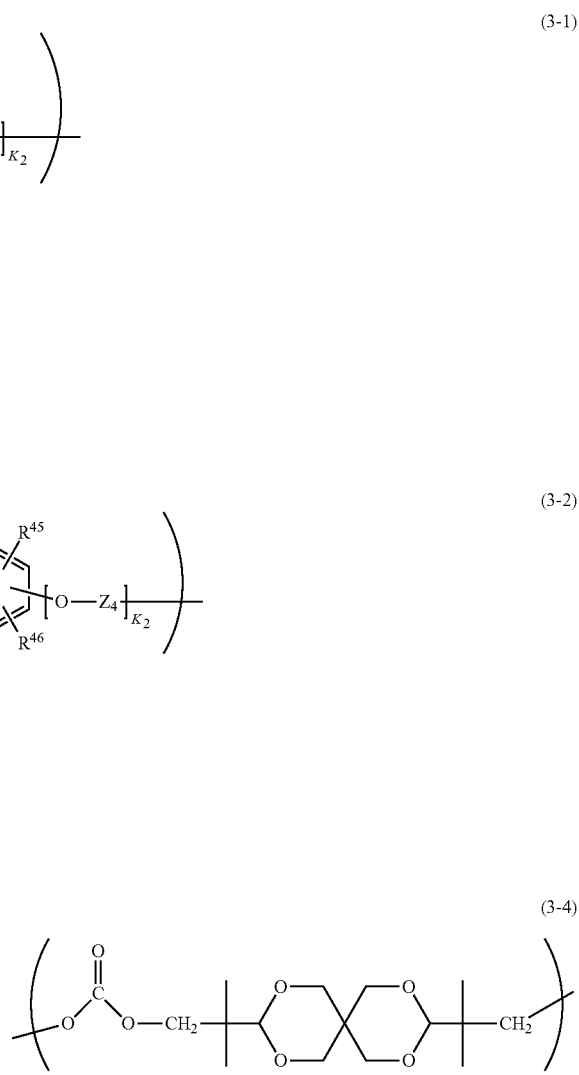

(3-4)

wherein, in the above formulae (3-1) to (3-4), $R^{13}$ to $R^{20}$ and $R^{40}$ to $R^{51}$ each independently represent hydrogen, halogen, alkoxy, an alkyl group containing 1 to 20 carbon atoms and optionally having a substituent, an alkenyl group containing 2 to 20 carbon atoms and optionally having a substituent, or an aryl group containing 6 to 30 carbon atoms and optionally having a substituent, $Z_3$ and $Z_4$ each independently represent an alkylene group containing 1 to 5 carbon atoms and optionally having a substituent, $J_2$ each independently represents an integer of 0 or more and 5 or less, $K_2$ each independently represents an integer of 0 or more and 5 or less, $A_1$ and $A_2$ each independently represent either —O— or —CH—, $L_1$ and $L_2$ each independently represent an integer of 0 or more and 3 or less, and Y represents a single bond or any one of structural formulae represented by the following formula (4):

[Formula 20]

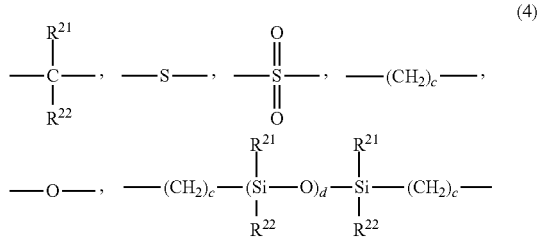

(4)

wherein $R^{21}$ and $R^{22}$ each independently represent hydrogen, halogen, an alkyl group containing 1 to 20 carbon atoms and optionally having a substituent, or an aryl group containing 6 to 30 carbon atoms and optionally having a substituent, or $R^{21}$ and $R^{22}$ bind to each other to form a carbocyclic or heterocyclic ring containing 1 to 20 carbon atoms and optionally having a substituent, and c and d each independently represent an integer of 0 or 1 or more and 5000 or less, and

[Formula 21]

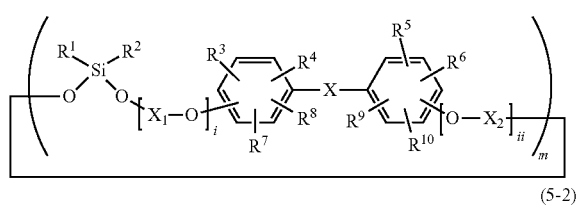

(5-1)

(5-2)

-continued

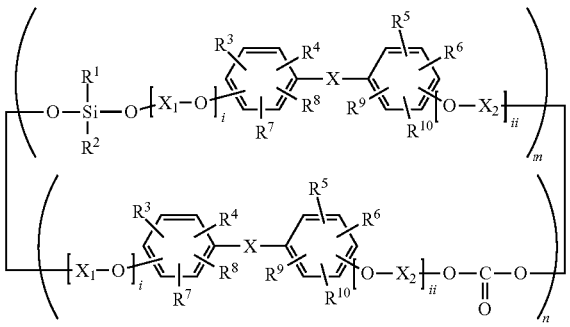

(5-3)

wherein, in the above formulae (5-1) to (5-3), m and n represent the total number of constituent units comprising an (—OSi($R_1R_2$)O—) site in each ring form, and the total number of constituent units comprising an (—OC(=O)O—) site in each ring form, respectively, wherein, in the above formula (5-1), m represents an integer of 2 to 10, in the formula (5-2), n represents an integer of 2 to 10, in the formula (5-3), the total value of m is 1 to 10, and the total value of n is 1 to 10, and in the formula (5-3), the constituent units comprising an (—OSi($R_1R_2$)O—) site and the constituent units comprising an (—OC(=O)O—) site are arbitrarily disposed, in the formulae (5-1) to (5-3), $R^1$ and $R^2$ each independently represent an alkyl group containing 1 to 20 carbon atoms and optionally having a substituent, or an aryl group containing 6 to 30 carbon atoms and optionally having a substituent, $R^3$ to $R^{10}$ and $R^{13}$ to $R^{20}$ each independently represent hydrogen, halogen, alkoxy, an alkyl group containing 1 to 20 carbon atoms and optionally having a substituent, an alkenyl group containing 2 to 20 carbon atoms and optionally having a substituent, or an aryl group containing 6 to 30 carbon atoms and optionally having a substituent, $X_1$ and $X_2$ each independently represent an alkylene group containing 1 to 5 carbon atoms and optionally having a substituent, i and ii each independently represent an integer of 0 or more and 5 or less, and X represents a single bond or any one of structural formulae represented by the following formula (2):

[Formula 22]

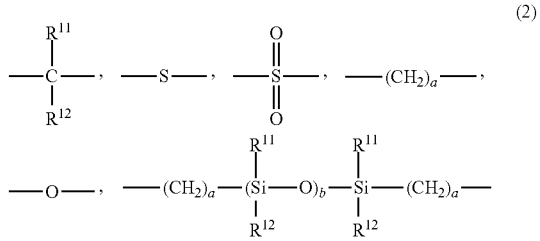

(2)

wherein $R^{11}$ and $R^{12}$ each independently represent hydrogen, halogen, an alkyl group containing 1 to 20 carbon atoms and optionally having a substituent, or an aryl group containing 6 to 30 carbon atoms and optionally having a substituent, or $R^{11}$ and $R^{12}$ bind to each other to form a carbocyclic or heterocyclic ring containing 1 to 20 carbon atoms and optionally having a substituent, and a and b each independently represent an integer of 0 or 1 or more and 5000 or less.

[25] The polycarbonate copolymer according to any one of the above [17] to [25], wherein the total content of ring forms represented by the following formulae (6-1) and (6-2) is 2.0% by weight or less:

[Formula 23]

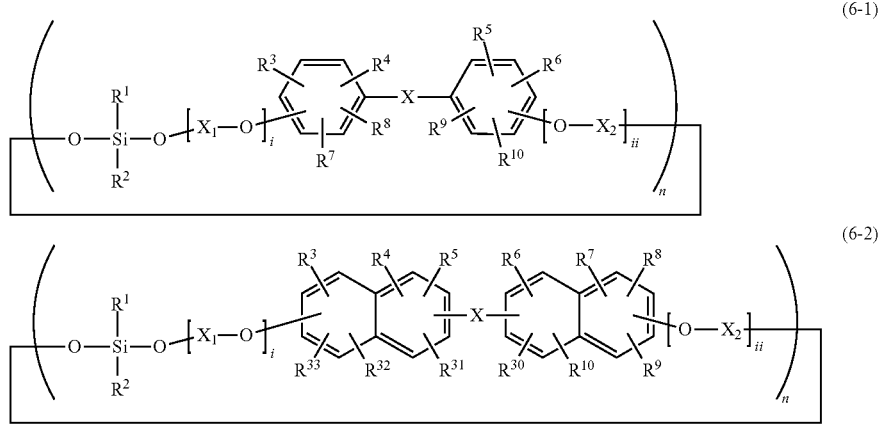

wherein, in the above formulae (6-1) and (6-2), $R^1$ and $R^2$ each independently represent an alkyl group containing 1 to 20 carbon atoms and optionally having a substituent, or an aryl group containing 6 to 30 carbon atoms and optionally having a substituent, $R^3$ to $R^{10}$ and $R^{30}$ to $R^{33}$ each independently represent hydrogen, halogen, alkoxy, an alkyl group containing 1 to 20 carbon atoms and optionally having a substituent, an alkenyl group containing 2 to 20 carbon atoms and optionally having a substituent, or an aryl group containing 6 to 30 carbon atoms and optionally having a substituent, $X_1$ and $X_2$ each independently represent an alkylene group containing to 5 carbon atoms and optionally having a substituent, i and ii each independently represent an integer of 0 or more and 5 or less, n represents an integer of 2 to 10, and X represents a single bond or anyone of structural formulae represented by the following formula (2):

[Formula 24]

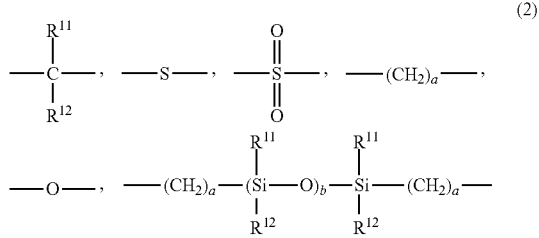

wherein $R^{11}$ and $R^{12}$ each independently represent hydrogen, halogen, an alkyl group containing 1 to 20 carbon atoms and optionally having a substituent, or an aryl group containing 6 to 30 carbon atoms and optionally having a substituent, or $R^{11}$ and $R^{12}$ bind to each other to form a carbocyclic or heterocyclic ring containing 1 to 20 carbon atoms and optionally having a substituent, and a and b each independently represent an integer of 0 or 1 or more and 5000 or less.

[27] The polycarbonate copolymer according to any one of the above [17] to [26], wherein the pyrolysis temperature necessary for a loss of 1% mass is 415° C. or lower.

[28] A composition comprising the polycarbonate copolymer according to any one of the above [17] to [27] and a polycarbonate resin.

[29] The composition according to the above [28], wherein the total amount of Si is 0.1% to 20% by mass.

[30] The composition according to the above [28] or [29], wherein $Q_1$ that is the Q value of the composition measured under conditions of 280° C. and 160 kgf is 120% or more of $Q_2$ that is the Q value of only the polycarbonate resin comprised in the composition measured under the same conditions as described above.

[31] A molded body obtained by molding the polycarbonate copolymer according to the above [17] to [27].

[32] An optical lens comprising the polycarbonate copolymer according to the above [17] to [27].

[33] An optical lens obtained by molding the composition according to any one of the above [28] to [30].

[34] A method for producing a polysiloxane compound, which has a polymerization step of polymerizing:

an oxy silane compound comprising at least any one of a diaryloxy silane compound that is any one of dialkyldiaryloxy silane, diaryldiaryloxy silane and monoalkylmonoaryldiaryloxy silane, and a dialkoxy silane compound that is any one of dialkyldialkoxy silane, diaryldialkoxy silane and monoalkylmonoaryldialkoxy silane; and a diol compound comprising an aromatic diol compound or an alicyclic diol compound, wherein in the polymerization step, the oxy silane compound and the diol compound are polymerized using a transesterification catalyst, while removing the generated aryl alcohol and/or alkyl alcohol, in a molten state and under reduced pressure, and the amount of the transesterification catalyst to the diol compound is 0.01 μmol/mol to 16,000 μmol/mol at a molar ratio, so that a poly(arylene/alkylene) siloxane compound with a weight average molecular weight of 10,000 to 300,000, comprising a constituent unit represented by any one of the following formulae (1-1') to (1-4'), is produced:

[Formula 25]

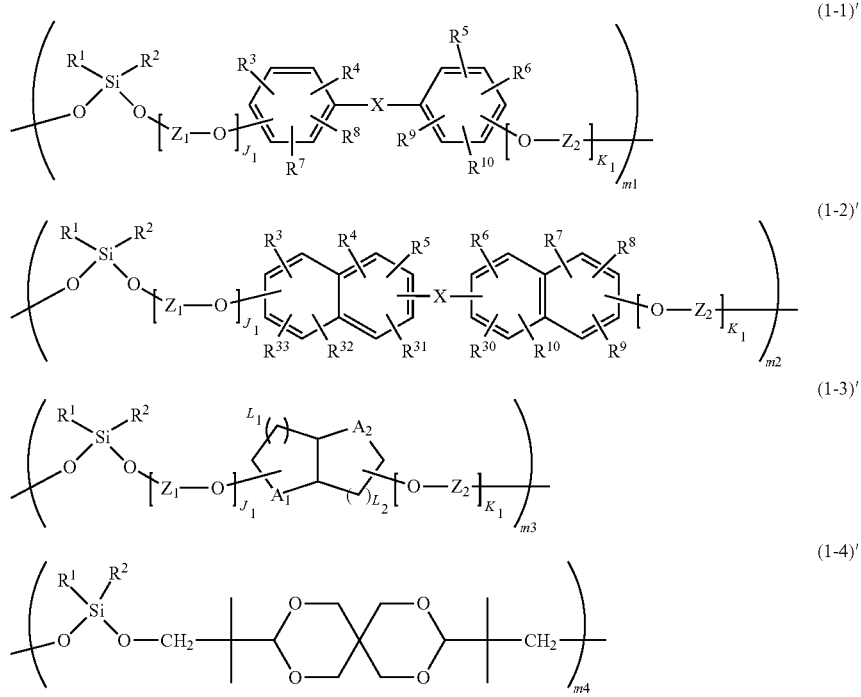

wherein, in the above formulae (1-1') to (1-4'), $R^1$ and $R^2$ each independently represent an alkyl group containing 1 to 20 carbon atoms and optionally having a substituent, or an aryl group containing 6 to 30 carbon atoms and optionally having a substituent, $R^3$ to $R^{10}$ and $R^{30}$ to $R^{33}$ each independently represent hydrogen, halogen, alkoxy, an alkyl group containing 1 to 20 carbon atoms and optionally having a substituent, an alkenyl group containing 2 to 20 carbon atoms and optionally having a substituent, or an aryl group containing 6 to 30 carbon atoms and optionally having a substituent, $Z_1$ and $Z_2$ each independently represent an alkylene group containing 1 to 5 carbon atoms and optionally having a substituent, $J_1$ each independently represent an integer of 0 or more and 5 or less, $K_1$ each independently represents an integer of 0 or more and 5 or less, $A_1$ and $A_2$ each independently represent either —O— or —CH—, $L_1$ and $L_2$ each independently represent an integer of 0 or more and 3 or less, $m_1$ to $m_4$ each represent the total number of constituent units in each formula, which is a natural number of 10 or more and 1000 or less, and X represents a single bond or any one of structural formulae represented by the following formula (2):

[Formula 26]

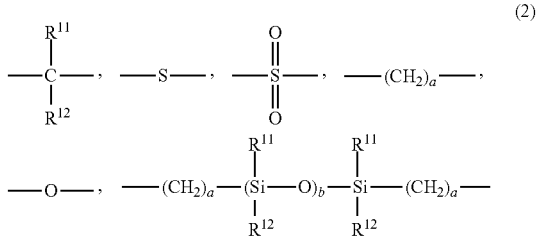

wherein $R^{11}$ and $R^{12}$ each independently represent hydrogen, halogen, an alkyl group containing 1 to 20 carbon atoms and optionally having a substituent, or an aryl group containing 6 to 30 carbon atoms and optionally having a substituent, or $R^{11}$ and $R^{12}$ bind to each other to form a carbocyclic or heterocyclic ring containing 1 to 20 carbon atoms and optionally having a substituent, and a and b each independently represent an integer of 0 or 1 or more and 5000 or less.

[35] The method for producing a polysiloxane compound according to the above [34], wherein
$Z_1$ and $Z_2$ each independently represent an alkylene group containing 1 to 3 carbon atoms and optionally having a substituent,
$J_1$ each independently represents an integer of 0 or more and 2 or less, and
$K_1$ each independently represents an integer of 0 or more and 2 or less.

[36] The method for producing a polysiloxane compound according to the above [34] or [35], wherein the X has a siloxane constituent unit showing a fluorene ring structure formed by the binding of $R^{11}$ and $R^{12}$, and/or the Y has a polycarbonate constituent unit showing a fluorene ring structure formed by the binding of $R^{21}$ and $R^{22}$.

[37] A method for producing a polysiloxane compound, which has a polymerization step of polymerizing:
a diaryloxy silane compound comprising at least any one of dialkyldiaryloxy silane, diaryldiaryloxy silane and monoalkylmonoaryldiaryloxy silane; and an aromatic diol compound, wherein
in the polymerization step, the diaryloxy silane compound and the aromatic diol compound are polymerized using a transesterification catalyst, while removing aryl alcohol, in a molten state and under reduced pressure, and the amount of the transesterification catalyst to the aromatic diol compound is 0.01 μmol/mol to 16,000 μmol/mol at a molar ratio, so that
a polyarylene siloxane compound with a weight average molecular weight of 10,000 to 300,000, comprising a constituent unit represented by the following formula (1) is produced:

[Formula 27]

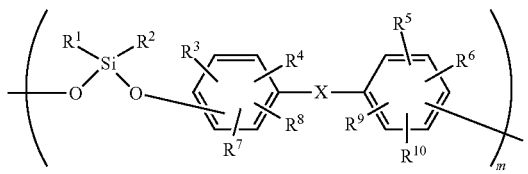
(1)

wherein $R^1$ and $R^2$ each independently represent an alkyl group containing 1 to 20 carbon atoms and optionally having a substituent, or an aryl group containing 6 to 30 carbon atoms and optionally having a substituent,
$R^3$ to $R^{10}$ each independently represent hydrogen, halogen, alkoxy, an alkyl group containing 1 to 20 carbon atoms and optionally having a substituent, an alkenyl group containing 2 to 20 carbon atoms and optionally having a substituent, or an aryl group containing 6 to 30 carbon atoms and optionally having a substituent,
m represents a natural number of 10 or more and 1000 or less, and
X represents any one of structural formulae represented by the following formula (2):

[Formula 28]

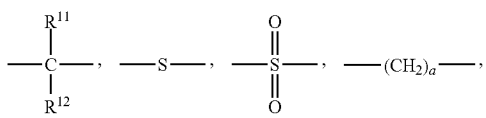
(2)

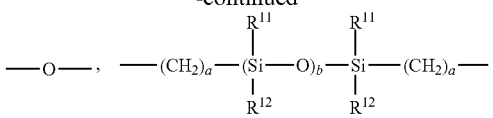

wherein $R^{11}$ and $R^{12}$ each independently represent hydrogen, halogen, an alkyl group containing 1 to 20 carbon atoms and optionally having a substituent, or an aryl group containing 6 to 30 carbon atoms and optionally having a substituent, or $R^{11}$ and $R^{12}$ bind to each other to form a carbocyclic or heterocyclic ring containing 1 to 20 carbon atoms and optionally having a substituent, and
a and b each independently represent an integer of 0 or 1 or more and 5000 or less.

[38] The method for producing a polysiloxane compound according to any one of the above [34] to [37], wherein the reaction temperature in the polymerization step is within a range of 150° C. or higher and 300° C. or lower.

[39] The method for producing a polysiloxane compound according to any one of the above [34] to [38], wherein, in the polymerization step, the reaction pressure is 101,300 Pa or less.

[40] The method for producing a polysiloxane compound according to any one of the above [34] to [39], which further has a pressure reduction step of gradually reducing the reaction pressure to 400 Pa or less in the polymerization step.

[41] The method for producing a polysiloxane compound according to any one of the above [34] to [40], wherein, in the polymerization step, the amount of the transesterification catalyst to the aromatic diol compound is 0.1 to 100 μmol/mol at a molar ratio.

[42] The method for producing a polysiloxane compound according to any one of the above [34] to [41], wherein the transesterification catalyst comprises an alkali metal compound and/or an alkaline-earth metal compound.

[43] The method for producing a polysiloxane compound according to the above [41], wherein the alkali metal compound and/or the alkaline-earth metal compound comprise any one or more of a carbonate, a hydroxide, an oxide, and an alkoxy compound.

[44] The method for producing a polysiloxane compound according to the above [42], wherein the alkali metal compound and/or the alkaline-earth metal compound are a carbonate(s).

[45] The method for producing a polysiloxane compound according to any one of the above [34] to [44], wherein, in the polymerization step, a solvent is not used.

[46] The method for producing a polysiloxane compound according to any one of the above [34] to [45], wherein the molar ratio between the diaryloxy silane compound and the aromatic diol compound, which are used in the polymerization step, is 0.9 or more and 1.2 or less.

[47] The method for producing a polysiloxane compound according to any one of the above [34] to [46], wherein, in the polymerization step, the oxy silane compound or the diaryloxy silane compound, and the diol compound or the aromatic diol compound are polymerized at a reaction temperature of higher than 200° C., and/or under reduced pressure.

[48] A polysiloxane compound comprising a constituent unit represented by any one of the following formulae (1-1) to (1-4) and having a weight average molecular weight of 5,000 to 300,000, wherein the total content of a ring form represented by the following formula (5-4) is 4.0% by weight or less:

[Formula 29]

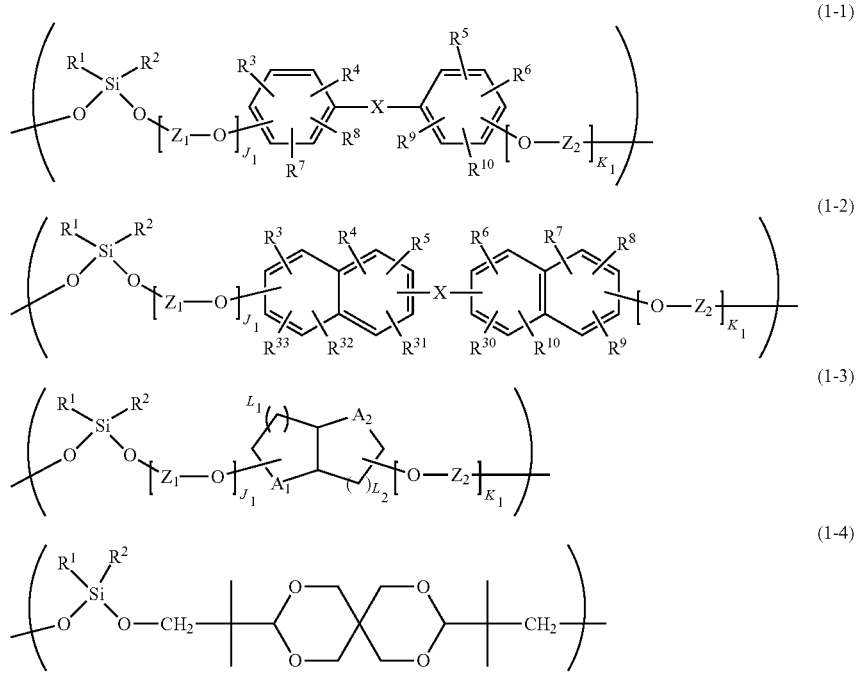

wherein, in the above formulae (1-1) to (1-4), $R^1$ and $R^2$ each independently represent an alkyl group containing 1 to 20 carbon atoms and optionally having a substituent, or an aryl group containing 6 to 30 carbon atoms and optionally having a substituent, $R^3$ to $R^{10}$ and $R^{30}$ to $R^{33}$ each independently represent hydrogen, halogen, alkoxy, an alkyl group containing 1 to 20 carbon atoms and optionally having a substituent, an alkenyl group containing 2 to 20 carbon atoms and optionally having a substituent, or an aryl group containing 6 to 30 carbon atoms and optionally having a substituent, $Z_1$ and $Z_2$ each independently represent an alkylene group containing 1 to 5 carbon atoms and optionally having a substituent, $J_1$ each independently represents an integer of 0 or more and 5 or less, $K_1$ each independently represents an integer of 0 or more and 5 or less, $A_1$ and $A_2$ each independently represent either —O— or —CH—, and $L_1$ and $L_2$ each independently represent an integer of 0 or more and 3 or less, and X represents a single bond or any one of structural formulae represented by the following formula (2):

[Formula 30]

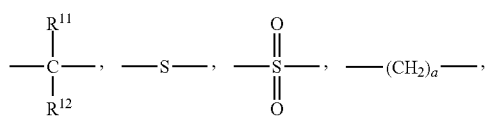

-continued

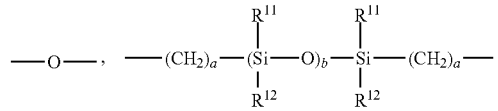

wherein $R^{11}$ and $R^{12}$ each independently represent hydrogen, halogen, an alkyl group containing 1 to 20 carbon atoms and optionally having a substituent, or an aryl group containing 6 to 30 carbon atoms and optionally having a substituent, or $R^{11}$ and $R^{12}$ bind to each other to form a carbocyclic or heterocyclic ring containing 1 to 20 carbon atoms and optionally having a substituent, and a and b each independently represent an integer of 0 or 1 or more and 5000 or less, and

[Formula 31]

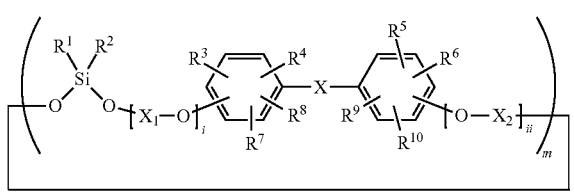

wherein the constituent unit represented by the formula (5-4) and other constituent units are arbitrarily disposed, and the total value of m is 2 to 10, $R^1$ and $R^2$ each independently represent an alkyl group containing 1 to 20 carbon atoms and optionally having a substituent, or an aryl group containing 6 to 30 carbon atoms and optionally having a substituent, $R^3$ to $R^{10}$ each independently represent hydrogen, halogen, alkoxy, an alkyl group containing 1 to 20 carbon atoms and optionally having a substituent, an alkenyl group containing 2 to 20 carbon atoms and optionally having a substituent, or an aryl group containing 6 to 30 carbon atoms and optionally having a substituent, $X_1$ and $X_2$ each independently represent an alkylene group containing 1 to 5 carbon atoms and optionally having a substituent, i and ii each independently represent an integer of 0 or more and 5 or less, m represents an integer of 2 to 10, and X represents a single bond or any one of structural formulae represented by the following formula (2):

[Formula 32]

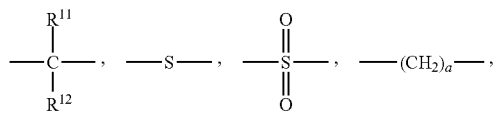

(2)

[Formula 33]

-continued

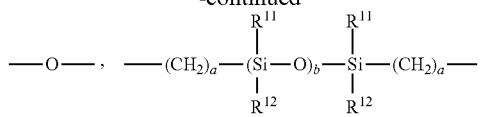

wherein $R^{11}$ and $R^{12}$ each independently represent hydrogen, halogen, an alkyl 53 group containing 1 to 20 carbon atoms and optionally having a substituent, or an aryl group containing 6 to 30 carbon atoms and optionally having a substituent, or $R^{11}$ and $R^{12}$ bind to each other to form a carbocyclic or heterocyclic ring containing 1 to 20 carbon atoms and optionally having a substituent, and a and b each independently represent an integer of 0 or 1 or more and 5000 or less.

[49] The polysiloxane compound according to the above [48], wherein the total content of ring forms represented by the following formulae (6-1) and (6-2) is 4.0% by weight or less:

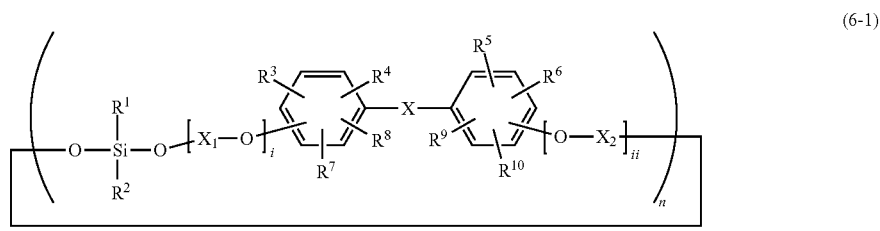

(6-1)

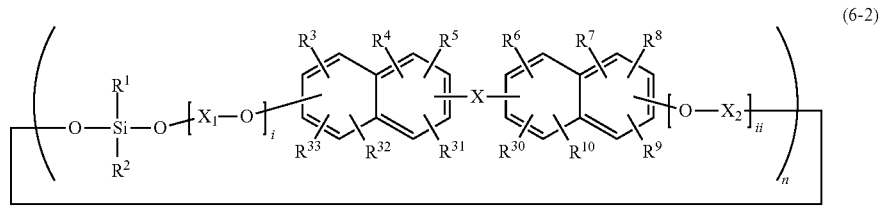

(6-2)

wherein, in the above formulae (6-1) and (6-2), $R^1$ and $R^2$ each independently represent an alkyl group containing 1 to 20 carbon atoms and optionally having a substituent, or an aryl group containing 6 to 30 carbon atoms and optionally having a substituent, $R^3$ to $R^{10}$ and $R^{30}$ to $R^{33}$ each independently represent hydrogen, halogen, alkoxy, an alkyl group containing 1 to 20 carbon atoms and optionally having a substituent, an alkenyl group containing 2 to 20 carbon atoms and optionally having a substituent, or an aryl group containing 6 to 30 carbon atoms and optionally having a substituent, $X_1$ and $X_2$ each independently represent an alkylene group containing 1 to 5 carbon atoms and optionally having a substituent, i and ii each independently represent an integer of 0 or more and 5 or less, n represents an integer of 2 to 10, and X represents a single bond or any one of structural formulae represented by the following formula (2):

[Formula 34]

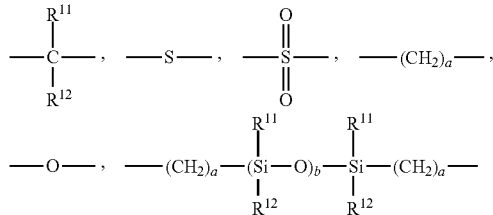

(2)

wherein $R^{11}$ and $R^{12}$ each independently represent hydrogen, halogen, an alkyl group containing 1 to 20 carbon atoms and optionally having a substituent, or an aryl group containing 6 to 30 carbon atoms and optionally having a substituent, or $R^{11}$ and $R^{12}$ bind to each other to form a carbocyclic or heterocyclic ring containing 1 to 20 carbon atoms and optionally having a substituent, and a and b each independently represent an integer of 0 or 1 or more and 5000 or less.

[50] The polysiloxane compound according to the above [48] or [49], wherein the pyrolysis temperature necessary for a loss of 1% mass is 415° C. or lower.

[51] A composition comprising a polysiloxane compound produced by the production method according to any one of the above [34] to [46] or the polysiloxane compound according to any one of the above [48] to [50], and a polycarbonate resin.

[52] The composition according to the above [51], wherein the total amount of Si is 0.1% to 20% by mass.

[53] The composition according to the above [51] or [52], wherein $Q_1$ that is the Q value of the composition measured under conditions of 280° C. and 160 kgf is 120% or more of $Q_2$ that is the Q value of only the polycarbonate resin comprised in the composition measured under the same conditions as described above.

[54] A molded body obtained by molding the polysiloxane compound produced by the production method according to any one of the above [34] to [46] or the polysiloxane compound according to any one of the above [48] to [50].

[55] An optical lens comprising the polysiloxane compound produced by the production method according to any one of the above [34] to [46] or the polysiloxane compound according to any one of the above [48] to [50].

Advantageous Effects of Invention

According to the method for producing a polycarbonate copolymer of the present invention, a polycarbonate copolymer having a siloxane constituent unit, which has high fluidity upon melting, can be produced. Moreover, according to the present invention, a polycarbonate copolymer having such excellent characteristics, a composition containing the polycarbonate copolymer, and a molded body obtained by molding the polycarbonate copolymer can also be realized.

Furthermore, according to the method for producing a polycarbonate copolymer and the method for producing a polyarylene compound of the present invention, a compound of interest such as polyarylene siloxane can be efficiently produced without generation of by-products having high environmental load, such as acids, and without needing solvents. The present invention can also realize a polyarylene compound having excellent properties, such as polyarylene siloxane.

EMBODIMENTS FOR CARRYING OUT THE INVENTION

[I. Polycarbonate Copolymer]

The method for producing a polycarbonate copolymer of the present invention has a polymerization step of polymerizing, in the presence of a transesterification catalyst, at least one silane compound selected from a predetermined diaryloxy silane compound, a predetermined dialkoxy silane compound and a predetermined silicon compound (siloxane compound), a carbonate compound, and an aromatic diol compound, each of which will be described in detail later.

An outline of the aforementioned polymerization reaction is as follows. For example, if a diaryloxy silane compound (Si(CH$_3$)$_2$(OPh)$_2$) having two methyl groups and two phenoxy groups as one example of a silane compound, a diphenyl carbonate (PhO—CO—OPh) as one example of a carbonate compound, and bisphenol A as one example of an aromatic diol compound are allowed to react with one another, the following polycarbonate copolymer can be obtained.

That is to say, it is a polycarbonate copolymer having a siloxane constituent unit generated as a result of, for example, the reaction of the following formula (A), and a polycarbonate constituent unit generated as a result of the reaction of the following formula (B).

In this polymerization reaction, as described below, alcohol derived from the carbonate compound is generated as a by-product. For example, when a diaryl carbonate is used as a carbonate compound, aryl alcohol such as phenol (PhOH) is generated. Thus, in the polymerization step, the polymerization reaction is promoted, while removing alcohol as a by-product, for example, aryl alcohol such as phenol, in a state in which the aforementioned mixture of individual components is melted and under reduced pressure.

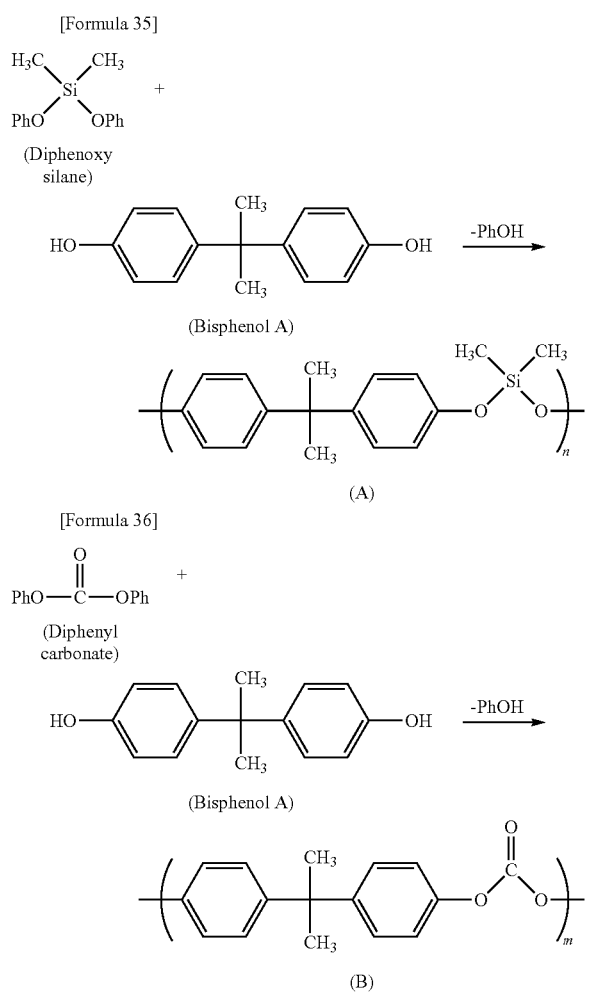

Hereafter, the method for producing a polycarbonate copolymer according to the present invention will be described in detail.

<1. Method for Producing a Polycarbonate Copolymer>
[(I) Silane Compound]

The silane compound used in the polymerization step is used to form a siloxane constituent unit in the polycarbonate copolymer, for example, as shown in the above formula (A). The type of the silane compound is not particularly limited, as long as the silane compound is capable of forming a siloxane constituent unit comprising an —OSi($R^1R^2$)O— site, the details of which are described later, in the main chain of the polycarbonate copolymer. The silane compound is selected from a predetermined diaryloxy silane compound, a predetermined dialkoxy silane compound, and a predetermined silicon compound (siloxane compound).

That is, in the polymerization step, there is used a silane compound comprising at least any one of diaryloxy silane compounds, at least any one of dialkoxy silane compounds, and at least any one of silicon compounds, regarding which the details will be described in detail later. As such silane compounds, a plurality of diaryloxy silane compounds may be used in combination, a plurality of dialkoxy silane compounds may be used in combination, or a plurality of silicon compounds may be used in combination. Otherwise, a mixture of a diaryloxy silane compound and a silicon compound, a mixture of a dialkoxy silane compound and a silicon compound, or a mixture of a diaryloxy silane compound and a dialkoxy silane compound may also be used.

Hereafter, the diaryloxy silane compound will be described.
(A-1) Diaryloxy Silane Compound The diaryloxy silane compound includes dialkyldiaryloxy silane, diaryldiaryloxy silane, and monoalkylmonoaryldiaryloxy silane. That is, in the polymerization step, any one of these compounds, or a plurality of these compounds may be used as a silane compound(s).

When the diaryloxy silane compound is represented by the general formula Si($R^aR^b$)(OAr)$_2$, $R^a$ and $R^b$ are each independently selected from an alkyl group and an aryl group. It is preferable that $R_a$ and $R^b$ each independently represent an alkyl group having a total carbon number of 1 to 20 and optionally having a substituent, and an aryl group having a total carbon number of 6 to 30 and optionally having a substituent. More preferably, when $R^a$ and $R^b$ are each an alkyl group optionally having a substituent, the total carbon number is preferably 1 to 10, more preferably 1 to 6, and particularly preferably 1 or 2.

On the other hand, when $R^a$ and $R^b$ are each an aryl group optionally having a substituent, the total carbon number is preferably 6 to 20, more preferably 6 to 12, and particularly preferably 6 to 8.

The aforementioned substituent includes a hydroxyl group, halogen, an amino group, a vinyl group, a carboxyl group, a cyano group, a (meth)acryloxy group, a glycidyloxy group, and a mercapto group.

Specific examples of preferred $R^a$ and $R^b$ in the formula (1) may include a methyl group, a phenyl group, a vinyl group, and a propyl group.

Besides, as is clear from the above formula (A), the aryloxy group (OAr group) of the silane compound is not introduced into the polymer chain of the polycarbonate copolymer, and it generates a by-product such as phenol (ArOH). Thus, the type of the aryloxy group is not particularly limited. However, in order to remove by-products generated in the polymerization step from the reaction system as easily as possible, an aryloxy group having a low polarity and a low molecular weight is preferable, and it is, for example, a phenoxy group.

Specific examples of the dialkyldiaryloxy silane may include dimethyldiphenoxy silane, methylethyldiphenoxy silane, and diethyldiphenoxy silane. A specific example of the diaryldiaryloxy silane may be diphenyldiphenoxy silane. In addition, a specific example of the monoalkylmonoaryldiaryloxy silane may be methylphenylphenoxy silane.
(A-2) Dialkoxy Silane Compound The dialkoxy silane compound includes dialkyldialkoxy silane, diaryldialkoxy silane, and monoalkylmonoaryldialkoxy silane. That is, in the polymerization step, any one of these compounds, or a plurality of these compounds may be used as a silane compound (s).

When the dialkoxy silane compound is represented by the general formula Si($R^aR^b$)(OR$^c$)$_2$, $R^a$ and $R^b$ each independently selected from the same alkyl group and aryl group as those for the $R^a$ and $R^b$ described in (A-1) Diaryloxy silane compound.

Besides, as is clear from the above formula (A), the alkoxy group (OR$^c$ group) of the silane compound is not introduced into the polymer chain of the polycarbonate copolymer, and it generates a by-product such as methanol (MeOH). Thus, the type of the alkoxy group is not particularly limited. However, in order to remove by-products generated in the polymerization step from the reaction system as easily as possible, the alkoxy group (OR$^c$ group) is, for example, a methoxy group.

Specific examples of the dialkyldialkoxy silane may include dimethyldimethoxy silane, methylethyldimethoxy silane, and diethyldimethoxy silane. A specific example of the diaryldialkoxy silane may be diphenyldimethoxy silane. In addition, a specific example of the monoalkylmonoaryldialkoxy silane may be methylphenyldimethoxy silane.

(B) Silicon Compound (Siloxane Compound)

Hereafter, the silicon compound will be described. The silicon compound includes a predetermined cyclic siloxane compound and a predetermined linear siloxane compound. That is, in the polymerization step, any one of these compounds may be used as a silane compound.

(B-1) Cyclic Siloxane Compound

As a siloxane compound used in the polymerization step, a cyclic siloxane compound represented by the following formula (5) may be used:

[Formula 37]

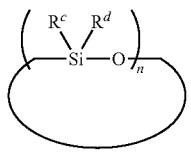

(5)

In the formula (5), $R^c$ and $R^d$ each independently represent an alkyl group, an alkenyl group, or an aryl group, each optionally having a substituent. Preferably, $R^c$ and $R^d$ in the formula (5) each represent an alkyl group having a total carbon number of 1 to 20, or an aryl group having a total carbon number of 6 to 30, each of which may optionally have a substituent.

When $R^c$ and $R^d$ are each an alkyl group optionally having a substituent, the total carbon number is preferably 1 to 10, more preferably 1 to 6, and particularly preferably 1 or 2.

On the other hand, when $R^c$ and $R^d$ are each an aryl group optionally having a substituent, the total carbon number is preferably 6 to 20, more preferably 6 to 12, and particularly preferably 6 to 8.

The aforementioned substituent includes a hydroxyl group, halogen, an amino group, a vinyl group, a carboxyl group, a cyano group, a (meth)acryloxy group, a glycidyloxy group, and a mercapto group.

Specific examples of preferred $R^c$ and $R^d$ in the formula (5) may include a methyl group, a phenyl group, a vinyl group, and a propyl group.

The cyclic siloxane compound has a siloxane structure, and the siloxane structure may be an —OSi($R^cR^d$)O— structure having the aforementioned $R^c$ group and $R^d$ group. In the polymerization step, such an —OSi($R^cR^d$)O— site of the cyclic siloxane compound is introduced into the polycarbonate copolymer, the details of which will be described later.

In the formula (5), n represents an integer of 3 or more and 30 or less. The n value in the formula (5) is preferably 3 or more and 15 or less, more preferably 3 or more and 10 or less, further preferably 3 or more and 8 or less, and particularly preferably 3 or more and 5 or less.

The molecular weight of the cyclic siloxane compound represented by the formula (5) is preferably 2,000 or less, more preferably 1,600 or less, further preferably 1,200 or less, and particularly preferably 1,000 or less. On the other hand, the molecular weight of the cyclic siloxane compound represented by the formula (5) is, for example, 100 or more, and it is preferably 150 or more, and more preferably 200 or more.

(B-2) Linear Siloxane Compound

As a siloxane compound used in the polymerization step, a linear siloxane compound represented by the following formula (6) may also be used:

[Formula 38]

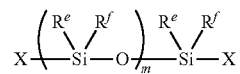

(6)

In the formula (6), $R^e$ and $R^f$ each independently represent an alkyl group or an aryl group, each optionally having a substituent. Preferably, $R^e$ and $R^f$ in the formula (6) each represent an alkyl group having a total carbon number of 1 to 20 and optionally having a substituent, or an aryl group having a total carbon number of 6 to 30 and optionally having a substituent.

When $R^e$ and $R^f$ are each an alkyl group optionally having a substituent, the total carbon number is preferably 1 to 10, more preferably 1 to 8, and particularly preferably 1 or 2.

On the other hand, when $R^e$ and $R^f$ are each an aryl group optionally having a substituent, the total carbon number is preferably 6 to 20, more preferably 6 to 12, and particularly preferably 6 to 8.

The aforementioned substituent includes a hydroxyl group, halogen, an amino group, a vinyl group, a carboxyl group, a cyano group, a (meth)acryloxy group, a glycidyloxy group, and a mercapto group.

Specific examples of preferred $R^e$ and $R^f$ in the formula (6) may include a methyl group, a phenyl group, a vinyl group, and a propyl group.

The linear siloxane compound also has a siloxane structure, and the siloxane structure may be an —OSi($R^eR^f$)O— structure having the aforementioned $R^e$ group and $R^f$ group. In the polymerization step, such an —OSi($R^eR^f$)O— site of the linear siloxane compound is introduced into the polycarbonate copolymer, the details of which will be described later.

In the formula (6), m represents an integer of 2 or more and 10,000 or less. The m value in the formula (6) is preferably 10 or more and 7,000 or less, more preferably 100 or more and 2,000 or less, further preferably 200 or more and 500 or less.

In the formula (6), X each independently represent a hydrogen atom, a hydroxyl group, an alkoxy group having a total carbon number of 1 to 10 and optionally having a substituent, a hydrocarbon group having a total carbon number of 1 to 10, optionally having a substituent, and optionally having an oxygen atom or a nitrogen atom, or an amino group optionally having a substituent. Preferably, X each independently represent any one of a hydrogen atom, a hydroxyl group, an alkoxy group having a total carbon number of 1 to 10 and optionally having a substituent, and an alkyl group having a total carbon number of 1 to 10, optionally having a substituent, and optionally having an oxygen atom or a nitrogen atom; more preferably, a hydroxyl group, or an alkyl group having a total carbon number of 1 to 10 and optionally having a substituent; and further preferably, a hydroxyl group, or an alkyl group having a total carbon number of 1 to 5.

The aforementioned substituent for X includes a hydroxyl group, halogen, an amino group, a vinyl group, a carboxyl group, a cyano group, a (meth)acryloxy group, a glycidyloxy group, and a mercapto group.

The molecular weight of the linear siloxane compound represented by the formula (6) is preferably 60,000 or less, more preferably 56,000 or less, further preferably 50,000 or less, and particularly preferably 45,000 or less. On the other hand, the molecular weight of the linear siloxane compound represented by the formula (6) is, for example, 1,000 or more, and it is preferably 5,000 or more, and more preferably 10,000 or more.

Among the aforementioned cyclic siloxane compound represented by the formula (5) and the linear siloxane compound represented by the following formula (6), only a single siloxane compound may be used, or two or more types of siloxane compounds may be used as a mixture. Otherwise, the siloxane compound represented by the formula (5) or the formula (6) may be used in combination with the aforementioned diaryloxy silane compound (A).

Besides, the aforementioned silane compound can be synthesized by a known method. Otherwise, a commercially available product may also be used as such a silane compound.

[(11) Carbonate Compound]

As shown in the above formula (B) regarding the outline of the polymerization reaction, the carbonate compound is used to introduce the carbonyl group (—CO— group) of the polycarbonate constituent unit into the polycarbonate copolymer. That is to say, two —OR groups of the carbonate compound represented by the general formula RO—CO—OR (wherein R is each independently selected from an aryl group, an alkyl group, and an aralkyl group), for example, two aryloxy groups (ArO— groups) when the carbonate compound is diaryl carbonate represented by the general formula ArO—CO—OAr, are not introduced into the polymer chain of the polycarbonate copolymer. These —OR groups generate, as a by-product, alcohol derived from the carbonate compound, and for example, a carbonate compound having an aryloxy group (ArO— group) (i.e., monoaryl carbonate or diaryl carbonate) generates, as a by-product, aryl alcohol such as phenol (ArOH).

Accordingly, the types of the aryl group, alkyl group and aralkyl group of the carbonate compound are not particularly limited. However, in order to remove by-products generated in the polymerization step from the reaction system as easily as possible, the —OR group of the above general formula representing the carbonate compound is preferably an aryloxy group (or the —R group of the above general formula RO—CO—OR is an aryl group), and more preferably, the carbonate compound has a low polarity and a low molecular weight, and further preferably, the —OR group of the above general formula is, for example, a phenoxy group.

As stated above, in the carbonate compound, either one of the aforementioned Ar groups, or both of the Ar groups, is/are preferably an aryl group(s) having a total carbon number of 10 or less, such as, for example, a phenyl group(s) or a benzyl group(s). That is, specific examples of the preferred carbonate compound may include diaryl carbonates such as diphenyl carbonate, dibenzyl carbonate, ditolyl carbonate, bis(chlorophenyl) carbonate, and m-cresyl carbonate. However, the carbonate compound may also be dialkyl carbonate such as dimethyl carbonate, diethyl carbonate, dibutyl carbonate or dicyclohexyl carbonate, or monoaryl monoalkyl carbonate.

Besides, the aforementioned carbonate compound can be synthesized by a known method. Otherwise, a commercially available product may also be used as such a carbonate compound.

[(III-1) Aromatic Diol Compound]

As shown in the above formulae (A) and (B) regarding the outline of the polymerization reaction, the aromatic diol compound used in the polymerization step is used to constitute the main chain of the polycarbonate copolymer.

Therefore, the aromatic diol compound used in the polymerization step is preferably a monomer that can become a material for polycarbonate resins. Examples of the aromatic diol compound used in the polymerization step may include bis(4-hydroxyphenyl)methane, 1,1-bis(4-hydroxyphenyl)ethane, 1,2-bis(4-hydroxyphenyl)ethane, 2,2-bis(4-hydroxyphenyl)propane, 2,2-bis(4-hydroxyphenyl)butane, 2,2-bis(4-hydroxyphenyl)octane, bis(4-hydroxyphenyl)phenylmethane, 1,1-bis(4-hydroxyphenyl)-1-phenylethane, bis(4-hydroxyphenyl)diphenylmethane, 2,2-bis(4-hydroxy-3-methylphenyl)propane, 1,1-bis(4-hydroxy-3-tert-butylphenyl)propane, 2,2-bis(3,5-dimethyl-4-hydroxyphenyl)propane, 2,2-bis(4-hydroxy-3-phenylphenyl)propane, 2,2-bis(3-cyclohexyl-4-hydroxyphenyl)propane, 2,2-bis(4-hydroxy-3-bromophenyl)propane, 2,2-bis(3,5-dibromo-4-hydroxyphenyl)propane, 1,1-bis(4-hydroxyphenyl)cyclopentane, 1,1-bis(4-hydroxyphenyl)cyclohexane, 2,2-bis(4-hydroxy-3-methoxyphenyl)propane, 4,4'-dihydroxydiphenyl ether, 4,4'-dihydroxy-3,3'-dimethylphenyl ether, 4,4'-dihydroxyphenyl sulfide, 4,4'-dihydroxy-3,3'-dimethyldiphenyl sulfide, 4,4'-dihydroxydiphenylsulfoxide, 4,4'-dihydroxy-3,3'-dimethyldiphenylsulfoxide, 4,4'-dihydroxydiphenyl sulfone, 4,4'-dihydroxy-3,3'-dimethyldiphenyl sulfone, 2,2-bis(3-t-butyl-4-hydroxyphenyl)propane, 2,2-bis(3-bromo-4-hydroxyphenyl)propane, 1,1-bis(3-cyclohexyl-4-hydroxyphenyl)cyclohexane, 1,1-bis(4-hydroxyphenyl)-3,3,5-trimethylcyclohexane, 4,4'-dihydroxybiphenyl, 9,9-bis(4-hydroxyphenyl)fluorene, 9,9-bis(4-hydroxy-3-methylphenyl)fluorene, 4,4'-sulfonyldiphenol, 2,2'-diphenyl-4,4'-sulfonyldiphenol, 2,2'-dimethyl-4,4'-sulfonyldiphenol, 1,3-bis{2-(4-hydroxyphenyl)propyl}benzene, 1,4-bis{2-(4-hydroxyphenyl)propyl}benzene, 1,4-bis(4-hydroxyphenyl)cyclohexane, 1,3-bis(4-hydroxyphenyl)cyclohexane, 4,8-bis(4-hydroxyphenyl)tricyclo[5.2.1.02,6]decane, 4,4'-(1,3-adamantanediyl)diphenol, 1,3-bis(4-hydroxyphenyl)-5,7-dimethyladamantane, 9,9-bis(4-(2-hydroxyethoxy)phenyl)fluorene (BPEF), 9,9-bis(4-(2-hydroxyphenyl)fluorene, 9,9-bis(4-hydroxy-3-methylphenyl)fluorene, 9,9-bis(4-hydroxy-3-tert-butylphenyl)fluorene, 9,9-bis(4-hydroxy-3-isopropylphenyl)fluorene, 9,9-bis(4-hydroxy-3-cyclohexylphenyl)fluorene, 9,9-bis(4-hydroxy-3-phenylphenyl)fluorene, 9,9-bis(4-(2-hydroxyethoxy)phenyl)fluorene, 9,9-bis(4-(2-hydroxyethoxy)-3-methylphenyl)fluorene, 9,9-bis(4-(2-hydroxyethoxy)-3-tert-butylphenyl)fluorene, 9,9-bis(4-(2-hydroxyethoxy)-3-isopropylphenyl)fluorene, 9,9-bis(4-(2-hydroxyethoxy)-3-cyclohexylphenyl)fluorene, 9,9-bis(4-(2-hydroxyethoxy)-3-phenylphenyl)fluorene, 2,2'-bis(2-hydroxyethoxy)-1,1'-binaphthalene (BNE), 9,9-bis(6-(2-hydroxyethoxy)naphthalen-2-yl)fluorene (BNEF), 2,2'-bis(2-hydroxyethoxy)-6,6'-diphenyl-1,1'-binaphthalene, and 2,2'-bis(2-hydroxyethoxy)-6,6'-di(phenanthren-9-yl)-1,1'-binaphthalene.

Among these compounds, 9,9-bis(4-(2-hydroxyethoxy)phenyl)fluorene (BPEF), 9,9-bis(4-(2-hydroxyethoxy)-3-phenylphenyl)fluorene (BPPEF) and 9,9-bis(4-(2-hydroxyethoxy)-3-methylphenyl)fluorene (BPMEF) are preferable, and 9,9-bis(4-(2-hydroxyethoxy)phenyl)fluorene (BPEF) and 9,9-bis(4-(2-hydroxyethoxy)-3-phenylphenyl)fluorene (BPPEF) are more preferable.

[(III-2) Alicyclic diol compound]

The alicyclic diol compounds used in the polymerization step are the following.

Specifically,

Isosorbide represented by the following formula (i.e., a compound represented by the above formula (1-3), wherein $L_1$ and $L_2$ represent 1, $A_1$ and $A_2$ represent an oxygen atom, and $J_1$, $K_1$, $J_2$ and $K_2$ are 0):

[Formula 39]

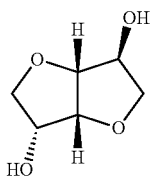

Spiroglycol (SPG) represented by the following formula:

[Formula 40]

Decahydro-1,4:5,8-dimethanonaphthalenediol represented by the following formula (D-NDM, wherein R is hydrogen in the following formula):

[Formula 41]

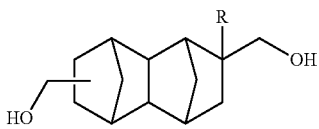

wherein R represents a hydrogen atom or an alkyl group containing 1 to 4 carbon atoms, and R is preferably hydrogen;

Cyclohexane dimethanol represented by the following formula:

[Formula 42]

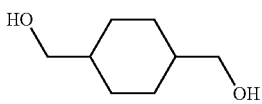

Pentacyclopentadecane dimethanol (PCPMD) represented by the following formula:

[Formula 43]

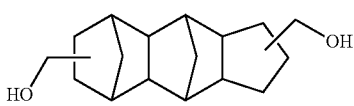

Tricyclodecane dimethanol (TCDDM) represented by the following formula:

[Formula 44]

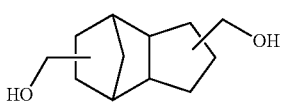

adamantane dimethanol represented by the following formula, such as 1,3-adamantane dimethanol:

[Formula 45]

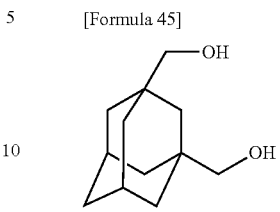

and the like.

A constituent unit derived from such alicyclic diol is preferably comprised in the main chain of the polycarbonate copolymer.

The aforementioned polycarbonate copolymer has high fluidity and is suitable for formation of a molded body, and the polycarbonate copolymer is preferably used also in, for example, the molding of a thin sheet, a thin film, etc.

[(IV) Transesterification catalyst]

The transesterification catalyst used in the polymerization step is preferably a catalyst comprising a basic compound. Examples of such a basic compound catalyst may include catalysts comprising an alkali metal compound or an alkaline-earth metal compound. Examples of such a compound may include organic acid salts such as alkali metal and alkaline-earth metal compounds, inorganic salts such as a carbonate, oxides, hydroxides, hydrides, and alkoxides. Otherwise, as such basic compound catalysts, a quaternary ammonium hydroxide and a salt thereof, amines, and the like are used. These compounds can be used alone or in combination of multiple types.

The transesterification catalyst more preferably comprises an alkali metal carbonate or an alkali metal hydroxide among the aforementioned basic compound catalysts. Specific examples of a more preferred transesterification catalyst may include transesterification catalysts comprising cesium carbonate, potassium carbonate, sodium carbonate, sodium hydrogen carbonate, cesium hydroxide, potassium hydroxide, sodium hydroxide, etc.

Besides, the aforementioned transesterification catalyst can be prepared according to a known method, or a commercially available product may be used as such a transesterification catalyst.

[(V) Polymerization Step]

In the polymerization step, at least, the aforementioned (I) silane compound, (II) carbonate compound, and (III) aromatic diol compound are polymerized in the presence of (IV) the transesterification catalyst. In this polymerization reaction, a mixture of the above-described individual components is melted, and carbonate compound-derived alcohol generated as a by-product, such as, for example, aryl alcohol is removed from the reaction mixture, in a molten state and under reduced pressure. By setting the above-described reaction conditions, the polymerization reaction can be efficiently promoted.

In the polymerization step, the polymerization reaction is preferably carried out under a pressure of 400 Pa or less. That is to say, the pressure applied in the polymerization reaction is preferably within a range of 400 Pa or less.

In the polymerization step, it is preferable that a normal pressure condition without pressure reduction or a moderately reduced pressure condition is maintained for a certain period of time, and that the pressure in the reaction system is then reduced and the polymerization reaction is further carried out. For example, it is preferable that, in the polymerization step, the reaction pressure is gradually reduced from the initial atmospheric pressure to 27,000 Pa, 24,000 Pa, 20,000 Pa, 16,000 Pa, 8,000 Pa, 4,000 Pa, 2,000 Pa, 400 Pa, and finally, 400 Pa or less. Thus, by performing a pressure reduction step, in which the pressure in the reaction system is gradually reduced and the degree of pressure reduction is improved from the middle of the step, while distillation of the raw materials is suppressed, alcohol generated as a by-product can be efficiently removed. Thus, this pressure reduction step is preferable.

The time required for the polymerization step is appropriately determined, while taking into consideration the type of a polycarbonate copolymer of interest and conditions such as pressure and temperature. The total time required for the polymerization step is, for example, within 5 to 10 hours. More specifically, the reaction time before the pressure reduction in the reaction system is 0.5 to 3 hours, and preferably 1 to 2 hours. The reaction time after the pressure reduction is 1 to 5 hours, and preferably 2 to 4 hours.

In the polymerization step, the temperature applied in the aforementioned polymerization reaction is preferably within a range of 150° C. to 300° C. The temperature applied in the polymerization reaction is more preferably 180° C. to 290° C., and further preferably 200° C. to 280° C.

Moreover, the compatibility of individual components, namely, the compatibility of the aforementioned silane compound, diaryl carbonate and aromatic diol compound is favorable, and thus, in the polymerization step, a polycarbonate copolymer can be produced without using solvents. Accordingly, the polymerization step can be simplified.

In the polymerization step, the ratio of the molar amount of the transesterification catalyst to the molar amount of the aromatic diol compound (molar ratio: namely, the value of the molar amount of the transesterification catalyst/the molar amount of the aromatic diol compound) is preferably $1.0 \times 10^{-1}$ to $1.0 \times 10^{-2}$ (mol/mol: 0.1 to 10000 μmol/mol, or $1.0 \times 10^{-4}$ to 10 mmol/mol). The above-described molar ratio is more preferably $1.0 \times 10^{-7}$ to $2.0 \times 10^{-5}$ mol/mol (or 0.5 to 20 μmol/mol).

In the polymerization step, the molar ratio of the aromatic diol compound to the silane compound (namely, the value of the number of moles of the silane compound/the number of moles of the aromatic diol compound) is, for example, 0.8 to 1.3, preferably 0.9 or more and 1.25 or less, and more preferably 0.95 or more and 1.2 or less.

Moreover, in the polymerization step, the molar ratio of the number of moles of the aromatic diol compound to the total number of moles of the diaryl carbonate and the silane compound (namely, the value of (the total number of moles of the diaryl carbonate and the silane compound)/the number of moles of the aromatic diol compound) is preferably 0.9 or more and 1.2 or less, and more preferably 0.95 or more and 1.15 or less.

Next, the polycarbonate copolymer according to the present invention will be described in details.

<2. Polycarbonate Copolymer>

[(I) Constituent Units]

The polycarbonate copolymer produced by the production method of the present invention is a polymer having a siloxane constituent unit, as mentioned above, and specific siloxane constituent units are the following.

That is to say, the polycarbonate copolymer is a polymer having, at least, a siloxane constituent unit represented by any one of the following formulae (1-1) to (1-4) and a polycarbonate constituent unit that will be described in detail later:

[Formula 46]

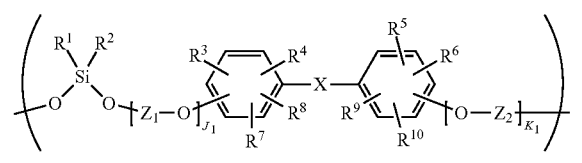

(1-1)

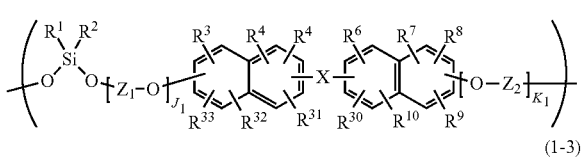

(1-2)

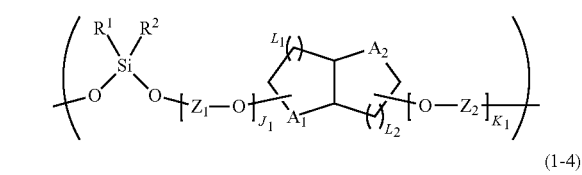

(1-3)

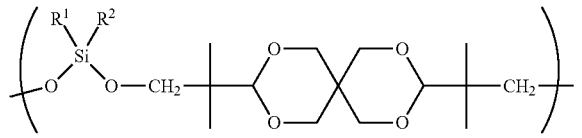

(1-4)

The siloxane structure comprising $R^1$ and $R^2$ in each of the formulae (1-1) to (1-4) is introduced from the aforementioned diaryloxy silane compound, dialkyldialkoxy silane, or silicon compound (siloxane compound).

In the formulae (1-1) to (1-4), $R^1$ and $R^2$ each independently represent an alkyl group containing 1 to 20 carbon atoms and optionally having a substituent, or an aryl group containing 6 to 30 carbon atoms and optionally having a substituent.

When $R^1$ and $R^2$ each represent an alkyl group optionally having a substituent, the total carbon number is preferably 1 to 10, more preferably 1 to 4, and particularly preferably 1 or 2.

On the other hand, when $R^1$ and $R^2$ each represent an aryl group optionally having a substituent, the total carbon number is preferably 6 to 20, more preferably 6 to 12, and particularly preferably 6 to 8.

In the formulae (1-1) and (1-2), $R^3$ to $R^{10}$ and $R^{30}$ to $R^{33}$ each independently represent hydrogen, halogen, alkoxy, an alkyl group containing 1 to 20 carbon atoms and optionally having a substituent, an alkenyl group containing 2 to 20 carbon atoms and optionally having a substituent, or an aryl group containing 6 to 30 carbon atoms and optionally having a substituent.

When $R^3$ to $R^{10}$ and $R^{30}$ to $R^{33}$ each represent an alkyl group optionally having a substituent, the total carbon number is preferably 1 to 10, more preferably 1 to 4, and particularly preferably 1 or 2.

When $R^3$ to $R^{10}$ and $R^{30}$ to $R^{33}$ each represent an alkenyl group optionally having a substituent, the total carbon number is preferably 2 to 10, more preferably 2 to 6, and particularly preferably 2 to 4.

On the other hand, when $R^3$ to $R^{10}$ and $R^{30}$ to $R^{33}$ each represent an aryl group optionally having a substituent, the total carbon number is preferably 6 to 20, more preferably 6 to 12, and particularly preferably 6 to 8.

In the formulae (1-1) to (1-3), $Z_1$ and $Z_2$ each independently represent an alkylene group optionally having a substituent and containing 1 to 5 carbon atoms, preferably containing 1 to 3 carbon atoms, and more preferably containing 1 or 2 carbon atoms.

In the formulae (1-1) to (1-3), $J_1$ and $K_1$ each independently represent an integer of 0 or more and 5 or less, preferably an integer of 0 or more and 3 or less, more preferably an integer of 0 or more and 2 or less, and for example, 1 or 2.

In the formula (1-3), $A_1$ and $A_2$ each independently represent either —O— or —CH—, and $L_1$ and $L_2$ each independently represent an integer of 0 or more and 3 or less, and $L_1$ and $L_2$ are preferably 1 or 2.

In the formulae (1-1) and (1-2), X each independently represents a single bond or any one of structural formulae represented by the following formula (2):

[Formula 47]

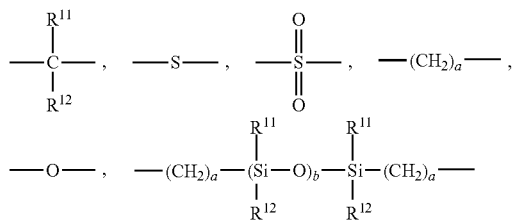

(2)

In the formula (2), $R^{11}$ and $R^{12}$ each independently represent hydrogen, halogen, an alkyl group containing 1 to 20 carbon atoms and optionally having a substituent, or an aryl group containing 6 to 30 carbon atoms and optionally having a substituent, or $R^{11}$ and $R^{12}$ bind to each other to form a carbocyclic or heterocyclic ring containing 1 to 20 carbon atoms and optionally having a substituent, and a and b each independently represent an integer of 0 or 1 or more and 5000 or less.

$R^{11}$ and $R^{12}$ preferably each independently represent hydrogen, an alkyl group containing 1 to 10 carbon atoms and optionally having a substituent, or an aryl group containing 6 to 16 carbon atoms and optionally having a substituent.

In the formula (2), a and b each independently represent an integer of 0 or 1 or more and 5000 or less, and a and b preferably represent an integer of 1000 or less, more preferably an integer of 500 or less, and further preferably an integer of 100 or less.

Furthermore, in the siloxane constituent unit, X preferably represents a fluorene ring structure formed by the binding of $R^{11}$ and $R^{12}$.

Further, the siloxane constituent unit preferably comprises, at least, a structure represented by the following formula (1):

[Formula 48]

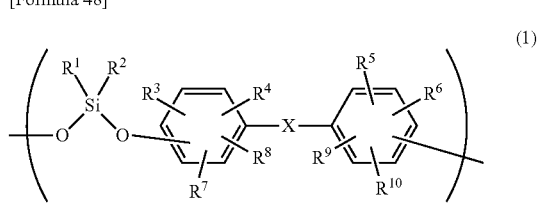

(1)

The siloxane structure comprising $R^1$ and $R^2$ in the formula (1) is introduced from the aforementioned diaryloxy silane compound, dialkoxy silane compound, or silicon compound (siloxane compound).

In the formula (1), $R^1$ and $R^2$ each independently represent an alkyl group, an alkenyl group, or an aryl group, each optionally having a substituent. $R^1$ and $R^2$ in the formula (1) each represent an alkyl group having a total carbon number of 1 to 20 and optionally having a substituent, or an aryl group having a total carbon number of 6 to 30 and optionally having a substituent.

Preferred options for $R^1$ and $R^2$ are the same as those for $R^1$ and $R^2$ in the above formulae (1-1) to (1-4).

The substituents for the aforementioned $R^1$ and $R^2$ may include a hydroxyl group, halogen, an amino group, a vinyl group, a carboxyl group, a cyano group, a (meth)acryloxy group, a glycidyloxy group, and a mercapto group.

Specific examples of the preferred $R^1$ and $R^2$ in the formula (1) may include a methyl group, a phenyl group, a vinyl group, and a propyl group.

In the formula (1), preferred options for $R^3$ to $R^{10}$ are the same as those for $R^3$ to $R^{10}$ in the above formulae (1-1) to (1-4).

The substituents for the aforementioned $R^3$ to $R^{10}$ may include a hydroxyl group, halogen, an amino group, a vinyl group, a carboxyl group, a cyano group, a (meth)acryloxy group, a glycidyloxy group, and a mercapto group.

In the formula (1), X is the same as that in the above formulae (1-1) and (1-2).

The polycarbonate constituent unit comprised in the polycarbonate copolymer is represented by any one of the following formulae (3-1) to (3-4):

[Formula 49]

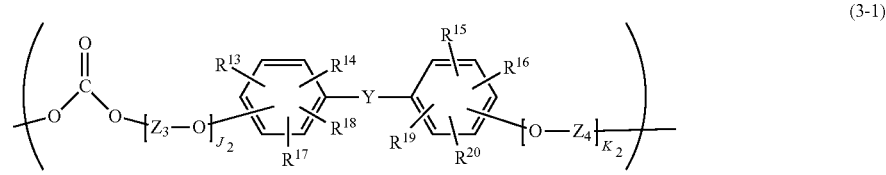

(3-1)

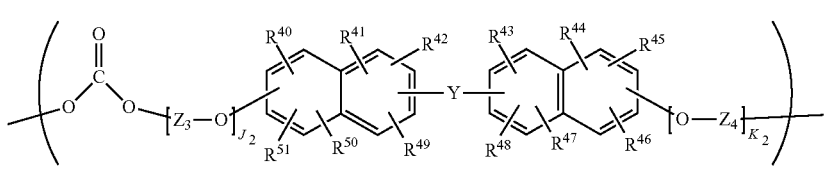

(3-2)

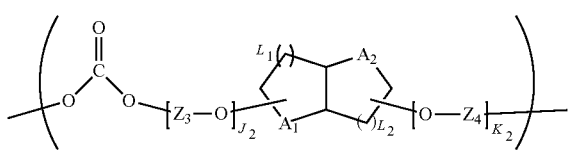

(3-3)

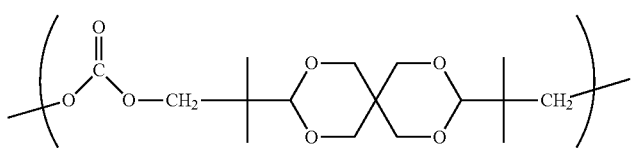

(3-4)

In the formulae (3-1) and (3-2), $R^{13}$ to $R^{20}$ and $R^{40}$ to $R^{51}$ each independently represent hydrogen, halogen, alkoxy, an alkyl group containing 1 to 20 carbon atoms and optionally having a substituent, an alkenyl group containing 2 to 20 carbon atoms and optionally having a substituent, or an aryl group containing 6 to 30 carbon atoms and optionally having a substituent.

When $R^{13}$ to $R^{20}$ and $R^{40}$ to $R^{51}$ each represent an alkyl group optionally having a substituent, the total carbon number is preferably 1 to 10, more preferably 1 to 4, and particularly preferably 1 or 2.

When $R^{13}$ to $R^{20}$ and $R^{40}$ to $R^{51}$ each represent an alkenyl group optionally having a substituent, the total carbon number is preferably 2 to 10, more preferably 2 to 6, and particularly preferably 2 to 4.

On the other hand, when $R^{13}$ to $R^{20}$ and $R^{40}$ to $R^{51}$ each represent an aryl group optionally having a substituent, the total carbon number is preferably 6 to 20, more preferably 6 to 12, and particularly preferably 6 to 8.

In the formulae (3-1) to (3-3), $Z_3$ and $Z_4$ each independently represent an alkylene group optionally having a substituent optionally having a substituent and containing 1 to 5 carbon atoms, preferably 1 to 3 carbon atoms, and more preferably 1 or 2 carbon atoms.

In the formulae (3-1) to (3-3), $J_2$ and $K_2$ each independently represent an integer of 0 or more and 5 or less, preferably an integer of 0 or more and 3 or less, and more preferably 1 or 2.

In the formula (3-3), $A_1$ and $A_2$ each independently represent either —O— or —CH—, and $L_1$ and $L_2$ each independently represent an integer of 0 or more and 3 or less, and $L_1$ and $L_2$ are preferably an integer of 0 or more and 2 or less.

In the formulae (3-1) and (3-2), Y each independently represents a single bond or any one of structural formulae represented by the following formula (4):

[Formula 50]

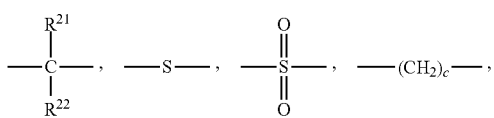

(4)

-continued

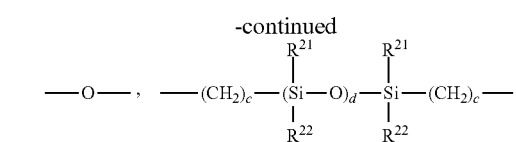

wherein $R^{21}$ and $R^{22}$ each independently represent hydrogen, halogen, an alkyl group containing 1 to 20 carbon atoms and optionally having a substituent, or an aryl group containing 6 to 30 carbon atoms and optionally having a substituent, or $R^{21}$ and $R^{22}$ bind to each other to form a carbocyclic or heterocyclic ring containing 1 to 20 carbon atoms and optionally having a substituent, and c and d each independently represent an integer of 0 or 1 or more and 5000 or less.

$R^{21}$ and $R^{22}$ preferably each independently represent hydrogen, an alkyl group containing 1 to 10 carbon atoms and optionally having a substituent, or an aryl group containing 6 to 16 carbon atoms and optionally having a substituent.

In the formula (4), c and d each independently represent an integer of 0 or 1 or more and 5000 or less, preferably an integer of 1000 or less, more preferably an integer of 500 or less, and further preferably an integer of 100 or less.

Moreover, in the polycarbonate constituent unit, Y preferably represents a fluorene ring structure formed by the binding of $R^{11}$ and $R^{12}$.

The polycarbonate constituent unit preferably comprises, at least, a structure represented by the following formula (3):

[Formula 51]

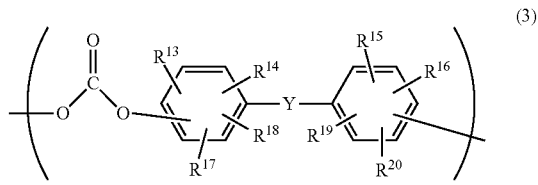

(3)

In the formula (3), preferred options for $R^{13}$ to $R^{20}$ are the same as those for $R^3$ to $R^{10}$ in the above formulae (3-1) and (3-2).

The substituents for the aforementioned $R^{13}$ to $R^{20}$ may include a hydroxyl group, halogen, an amino group, a vinyl group, a carboxyl group, a cyano group, a (meth)acryloxy group, a glycidyloxy group, and a mercapto group.

In the formula (3), Y is the same as that in the above formulae (3-1) and (3-2).

[(II) Properties of Polycarbonate Copolymer]

The weight average molecular weight of the polycarbonate copolymer is preferably 10,000 to 300,000, more preferably 10,000 to 200,000, further preferably 10,000 to 100,000, and it is, for example, still further preferably 20,000 to 80,000, still further preferably 30,000 to 70,000, and particularly preferably 40,000 to 65,000.

In the polycarbonate copolymer, the number of moles of the siloxane constituent unit is preferably 1 to 1000. In addition, the number of moles of the polycarbonate constituent unit is preferably 1 to 1000. It is to be noted that the number of moles indicates the number of constituent units contained in a single molecule of the polycarbonate copolymer, and the number of moles of each of the above constituent units is more preferably 10 to 800, and further preferably 100 to 600.

The percentage of the siloxane constituent unit in the total number of moles of the siloxane constituent unit and the polycarbonate constituent unit in the polycarbonate copolymer is preferably 2.0% or more and 90% or less. The aforementioned percentage of the siloxane constituent unit is more preferably 3.0% or more, and is, for example, higher than 3.1% and 90% or less, further preferably 5% or more and 90% or less, and particularly preferably 8% or more and 90% or less.

Moreover, in a case where, for example, the polycarbonate copolymer is not directly used alone but is used as a composition obtained by being mixed with another resin, it is favorable if the percentage of the aforementioned siloxane constituent unit is significantly increased in some cases. For instance, when a polycarbonate copolymer, in which the percentage of the siloxane constituent unit is 30% or more, 50% or more, or 70% or more, and the content of Si is high, is mixed with a polymer containing neither Si nor a siloxane constituent unit, a resin having excellent performance, for example, high impact resistance and fluidity, can be realized, the details of which will be described later. Furthermore, as described above, when the percentage of the siloxane constituent unit is preferably increased for certain intended use, the upper limit value of the percentage of the siloxane constituent unit is not limited to 90%, and may also be, for example, 92%, 95%, 98%, etc.

In the polycarbonate copolymer, the molar ratio between the siloxane constituent unit and the polycarbonate constituent unit (i.e., the ratio of the number of moles of the siloxane constituent unit:the number of moles of the polycarbonate constituent unit) is preferably 0.01:99.99 to 99.99:0.01. The aforementioned molar ratio is more preferably 30:70 to 99.9:0.01, but it may also be in another range, for example, 1:99 to 99:1 or 10:90 to 90:10.

In the polycarbonate copolymer, the Q value (a melt flow volume per unit time measured at 280° C. and at a load of 160 kg; $\times 10^{-2}$ cm$^3$ s$^{-1}$) is preferably 8 ($\times 10^{-2}$ cm$^3$ s$^{-1}$) or more. The Q value is more preferably 20 ($\times 10^{-2}$ cm$^3$ s$^{-1}$) or more, further preferably 40 ($\times 10^{-2}$ cm$^3$ s$^{-1}$) or more, and particularly preferably 60 ($\times 10^{-2}$ cm$^3$ s$^{-1}$) or more.

In the polycarbonate copolymer, the glass transition temperature (Tg) measured in accordance with JIS K 7121 is, for example, 40° C. to 200° C., and is preferably 45° C. to 180° C., and more preferably 50° C. to 160° C.

The aforementioned polycarbonate copolymer, namely, the polycarbonate copolymer having the siloxane constituent unit represented by any one of the formula (1-1) to the formula (1-4) and the polycarbonate constituent unit represented by any one of the formula (3-1) to the formula (3-4), comprises a low molecular weight compound having a weight average molecular weight of 1,000 or less, in an amount of preferably 30% by weight or less, more preferably 20% by weight or less, further preferably 10% by weight or less, still further preferably 5.0% by weight or less, particularly preferably 1.5% by weight or less, and further particularly preferably less than 1.0% by weight. When a polycarbonate copolymer comprising a large amount of low molecular weight compound having a weight average molecular weight of 1,000 or less is subjected to continuous injection molding for producing a disk or a complicated and thinned product, a metallic mold (mold) tends to be contaminated with a trace amount of mold deposit at a relatively early stage. Regarding this point, if the amount of the low molecular weight compound having a weight average molecular weight of 1,000 or less is less than 1.5% by mass in the polycarbonate copolymer, the contamination of the metallic mold is effectively prevented.

The lower limit value of the content percentage of the low molecular weight compound having a weight average molecular weight of 1,000 or less in the polycarbonate copolymer is not particularly important, and it is approximately 0.7% by weight. However, even if the polycarbonate copolymer comprises approximately 0.001% by weight, 0.01% by weight, or 0.1% by weight of the above-described low molecular weight compound, there are no problems regarding the properties of the polycarbonate copolymer especially when the polycarbonate copolymer is used for an optical purpose, and further, the effect of improving fluidity was also confirmed. Hence, the lower limit value of the content percentage of the low molecular weight compound having a weight average molecular weight of 1,000 or less in the polycarbonate copolymer may also be 0.001% by weight, 0.01% by weight, or 0.1% by weight.

The content percentage of the aforementioned low molecular weight compound in the polycarbonate copolymer is a value calculated by adding together the contents of several types of low molecular weight compounds as impurities based on the ratio of the peak areas of individual components obtained by GPC analysis, the details of which will be described later. Specifically, as the details are described later, the percentage of the low molecular weight compound having a molecular weight of 1,000 or less in the polycarbonate copolymer is a value calculated from the ratio of the area from the retention time 20.5 min to 21.5 min/the area from the retention time 0 min to 21.5 min under predetermined conditions for GPC analysis.

In the aforementioned polycarbonate copolymer, namely, in the polycarbonate copolymer having the siloxane constituent unit represented by any one of the formula (1-1) to the formula (1-4) and the polycarbonate constituent unit represented by any one of the formula (3-1) to the formula (3-4), the total content of ring forms represented by the following formulae (5-1) to (5-3) is preferably 4.0% by weight or less, more preferably 3.0% by weight or less, further preferably 2.0% by weight or less, and particularly preferably 1.0% by weight or less, with respect to the total weight of the polycarbonate copolymer.

When the content of these cyclic dimers is within the aforementioned range, it is said that there are no problems regarding the properties of the polycarbonate copolymer, especially when the polycarbonate copolymer is used for an optical purpose.

[Formula 52]

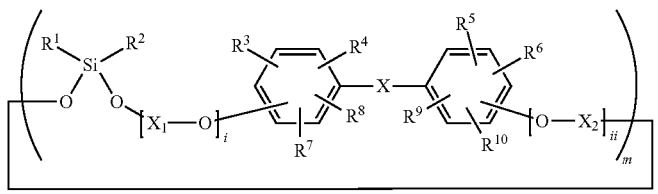

(5-1)

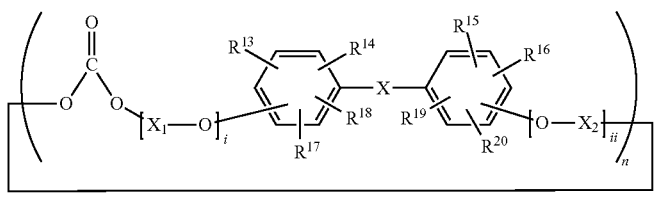

(5-2)

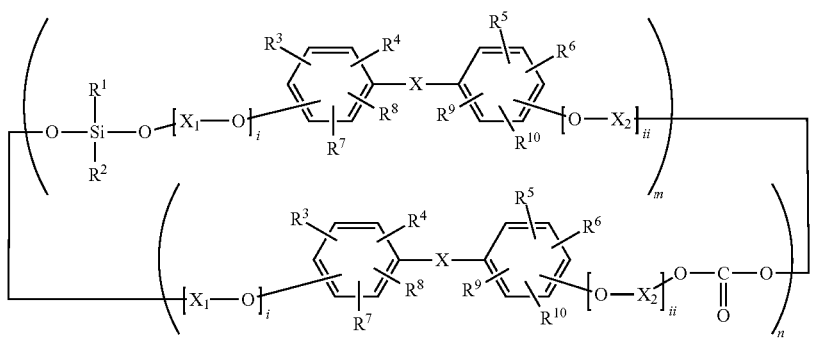

(5-3)

In the formulae (5-1) to (5-3), m and n represent the total number of constituent units comprising an (—OSi($R_1R_2$)O—) site in each ring form, and the total number of constituent units comprising an (—OC(=O)O—) site in each ring form, respectively. That is to say, when constituent units other than the constituent units comprising an (—OSi($R_1R_2$)O—) site are comprised in the ring form of the formula (5-1), or when constituent units other than the constituent units comprising an (—OC(=O)O—) site are comprised in the ring form of the formula (5-2), m and n each represent the total number of the constituent units represented by the formulae in each ring form. In particular, the formula (5-3) comprises both the constituent unit comprising the (—OSi($R_1R_2$)O—) site and the constituent unit comprising the (—OC(=O)O—) site, and includes, a ring form in which these constituent units are alternately arranged. Even in this case, m and n each represent the total number of the constituent units represented by the formulae in each ring form.

In the formula (5-1), m represents an integer of 2 to 10, preferably 2 to 5, more preferably 2 or 3, and further preferably 2.

In the formula (5-2), n represents an integer of 2 to 10, preferably 2 to 5, more preferably 2 or 3, and further preferably 2.

In the formula (5-3), the total value of m is 1 to 10, and the total value of n is 1 to 10. In addition, m and n each represent preferably 1 to 5, more preferably 1 or 2, and further preferably 1.

As mentioned above, in the ring form of the formula (5-3), the arrangement of the constituent unit comprising the (—OSi($R_1R_2$)O—) site and the constituent unit comprising the (—OC(=O)O—) site is arbitrarily arranged.

In the formulae (5-1) to (5-3), $X_1$ and $X_2$ each independently represent an alkylene group optionally having a substituent and containing 1 to 5 carbon atoms, preferably 1 to 3 carbon atoms, and more preferably 1 or 2 carbon atoms.

i and ii each independently represent an integer of 0 or more and 5 or less, preferably an integer of 0 or more and 3 or less, and more preferably 1 or 2.

Moreover, in the formulae (5-1) to (5-3), $R^1$, $R^2$, $R^3$ to $R^{10}$, $R^{13}$ to $R^{20}$ and X are the same as $R^1$, $R^2$, $R^3$ to $R^{10}$, $R^{13}$ to $R^{20}$ and X in the formulae (1-1) and (1-2).

Specific examples of the compounds represented by the formulae (5-1) to (5-3) may include ring forms represented by the following formulae (5-1') to (5-3'), respectively.

[Formula 53]

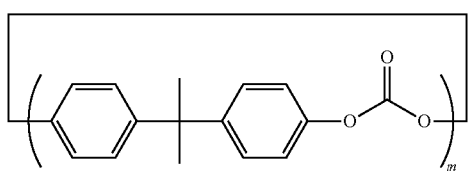

(5-1')

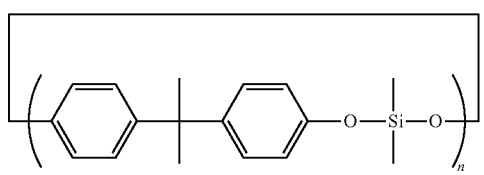

(5-2')

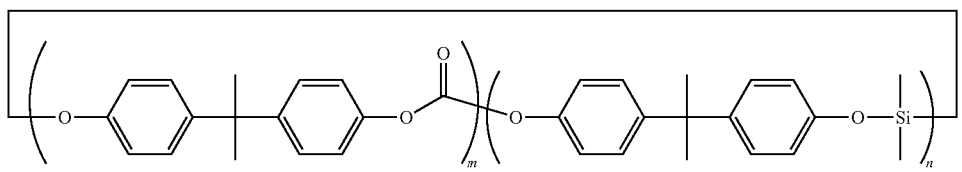
(5-3')

In the formula (5-1'), m=2 or 3, and preferably m=2. In the formula (5-2'), n=2 or 3, and preferably n=2. In the formula (5-3'), m=any one of 1 to 3, n=any one of 1 to 3, and both m and n are preferably 1 or 2, and more preferably 1.

Furthermore, the polycarbonate copolymer may comprise the total content of ring forms represented by the following formulae (6-1) and (6-2). These ring forms are considered to be cyclic dimers that are generated as a result of the side reaction of the polymerization reaction for production of the polycarbonate copolymer. The total content percentage of these cyclic dimers in the polycarbonate copolymer is preferably 2.0% by weight or less, more preferably 1.5% by weight or less, further preferably 1.0% by weight or less, and particularly preferably 0.5% by weight or less, with respect to the total weight of the polycarbonate copolymer.

[Formula 54]

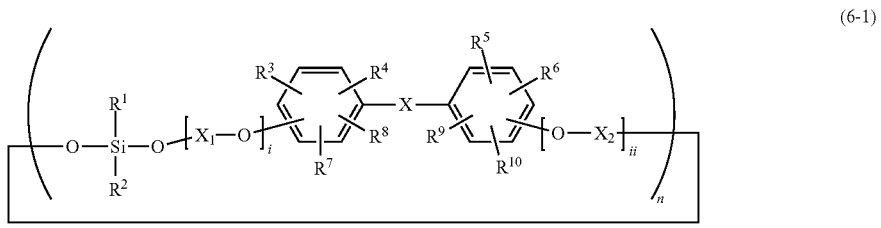
(6-1)

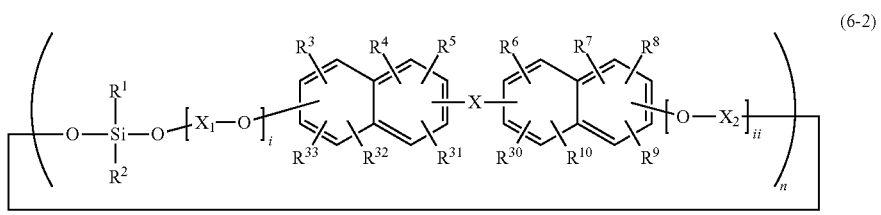
(6-2)

In the formulae (6-1) and (6-2), $R^1$, $R^2$, $R^3$ to $R^{10}$, $R^{30}$ to $R^{33}$ and X are the same as those in the formulae (1-1) and (1-2).

In the formulae (6-1) and (6-2), $X_1$ and $X_2$ each independently represent an alkylene group optionally having a substituent and containing 1 to 5 carbon atoms, preferably 1 to 3 carbon atoms, and more preferably 1 or 2 carbon atoms, i and ii each independently represent an integer of 0 or more and 5 or less, preferably an integer of 0 or more and 3 or less, and more preferably 1 or 2, and n represents an integer of 2 to 10, preferably an integer of 2 to 5, more preferably 2 or 3, and for example, 2.

The lower limit value of the total content percentage of the cyclic dimers represented by the formulae (6-1) and (6-2) in the polycarbonate copolymer is not particularly limited, and it may be, for example, 0.001% by weight, 0.01% by weight, or 0.1% by weight. The presence of some amount of cyclic dimers can contribute to the improvement of fluidity upon the molding of the polycarbonate copolymer.

Specific examples of the compounds represented by the formulae (6-1) and (6-2) may include ring forms represented by the following formulae (6-1') and (6-2'), respectively.

[Formula 55]

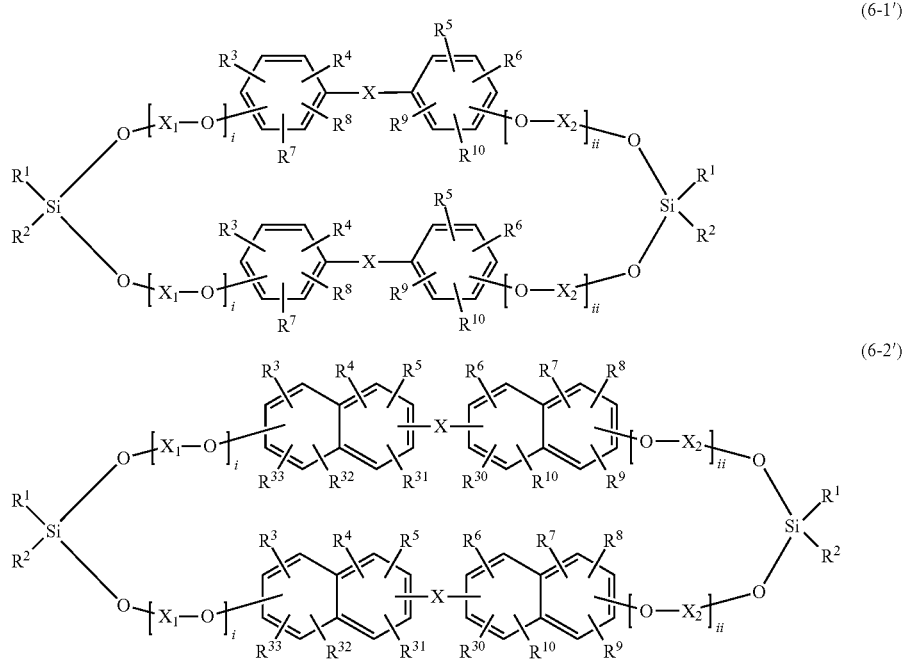

In the formulae (6-1') and (6-2'),
$R^1$ and $R^2$, $R^3$ to $R^{10}$ and $R^{30}$ to $R^{33}$, $Z_1$ and $Z_2$, $J_1$, $K_1$, and X are as mentioned above.

In the polycarbonate copolymer, the pyrolysis temperature necessary for a loss of 1% mass is preferably 415° C. or lower, more preferably 400° C. or lower, further preferably 385° C. or lower, and particularly preferably 370° C. or lower.

In the polycarbonate copolymer, the percentage of the total weight of silicon atoms (the total amount of Si) is preferably 0.1% to 20% by mass, more preferably 1.0% to 15% by mass, further preferably 2.0% to 12% by mass, and particularly preferably 3.0% to 10% by mass (for example, 3.1% by mass or more, or more than 3.1% by mass and 9.8% by mass or less), with respect to the total weight of the polycarbonate copolymer.

Next, the composition according to the present invention, namely, a composition comprising the aforementioned polycarbonate copolymer and the like, will be described in detail.

<3. Composition>

The composition of the present invention comprises the aforementioned polycarbonate copolymer and a polycarbonate resin that does not correspond to the aforementioned polycarbonate copolymer. The polycarbonate resin that does not correspond to the aforementioned polycarbonate copolymer may be, for example, a polycarbonate resin that does not completely contain or does not substantially contain a siloxane structure.

The type of such a polycarbonate resin that does not correspond to the aforementioned polycarbonate copolymer is not particularly limited, as long as the polycarbonate resin comprises an —[O—R—OCO]— unit containing a carbonate ester bond in the molecular backbone thereof (wherein R includes an aliphatic group, an aromatic group, or both an aliphatic group and an aromatic group, and further has a linear structure or a branched structure). In addition, the polycarbonate resin that does not correspond to the aforementioned polycarbonate copolymer may also comprise polyester carbonate. The type of the polyester carbonate is not particularly limited either, as long as it comprises an —[O—R—OC]— unit containing a carbonate ester bond in the molecular backbone thereof (wherein R is as mentioned above).

The weight average molecular weight of the polycarbonate resin is preferably 10,000 to 100,000, more preferably 13,000 to 80,000, and further preferably 15,000 to 60,000.

The composition of the present invention may also comprise a resin other than the polycarbonate resin, and preferably a thermoplastic resin. The type of the thermoplastic resin is not particularly limited. Examples of the thermoplastic resin may include acrylic resins such as polymethyl methacrylate (PMMA), and various resins such as polyethylene terephthalate (PET), triacetyl cellulose (TAC), polyethylene naphthalate (PEN), polyimide (PI), a cycloolefin copolymer (COC), a norbornene-containing resin, polyether sulfone, cellophane and aromatic polyamide, as well as a polycarbonate resin and a polyester carbonate resin.

In the composition, the percentage of the total weight of silicon atoms (the total amount of Si) is preferably 0.1% to 20% by mass, more preferably 0.2% to 15% by mass, and particularly preferably 0.3% to 10% by mass, with respect to the total weight of the composition. The percentage of the total amount of Si in the composition can be adjusted based on the percentage of the siloxane constituent unit in all of the constituent units of the aforementioned polycarbonate resin, or the amount of a resin mixed with the polycarbonate resin or the Si amount.

For example, $Q_1$ that is the Q value of the composition comprising the polycarbonate copolymer measured under conditions of 280° C. and 160 kgf is preferably a value that is 120% or more (i.e., 20% or more higher), compared with $Q_2$ that is the Q value of only the polycarbonate resin comprised in the composition measured under the same conditions as those for $Q_1$. The $Q_1$ value of the entire composition is more preferably 130% or more, further preferably 140% or more, particularly preferably 150% or more, and for example, 160% or more, compared with the $Q_2$ value of only the polycarbonate resin.

Moreover, for example, in the case of a composition comprising 5% by mass of the polycarbonate copolymer, $Q_1$ that is the Q value of the composition comprising the polycarbonate copolymer measured under conditions of 280° C. and 160 kgf is preferably a value that is 140% or more (i.e., 40% or more higher), compared with $Q_2$ that is the Q value of only the polycarbonate resin comprised in the composition measured under the same conditions as those for $Q_1$. The $Q_1$ value of the entire composition is more preferably 150% or more, further preferably 160% or more, particularly preferably 170% or more, and for example, 180% or more, compared with the $Q_2$ value of only the polycarbonate resin.

Using a polycarbonate copolymer having a high content of Si, a composition having excellent characteristics can be produced. A polycarbonate copolymer or the like containing, for example, 0.1% by mass or more of Si is mixed with a resin that does not substantially contain a siloxane constituent unit, preferably with a polycarbonate resin, so that a good balance can be achieved between excellent impact resistance and excellent fluidity of the obtained composition.

Besides, a composition comprising a polycarbonate copolymer may contain a phenolic compound possibly generated as a by-product from the polymerization reaction, or a silane compound, a carbonate compound and a diol compound that have not reacted and have remained. Since such a phenolic compound and DPC as impurities may cause a reduction in the strength when the composition is processed into a molded body, or generation of odor, the contents of these compounds are preferably as small as possible. Thus, the contents of such a phenolic compound, a silane compound, a carbonate compound and a diol compound may be reduced to such an extent that these compounds are not detectable. However, from the viewpoint of productivity, these compounds may be contained in the composition to such an extent that they do not impair the effects of the composition. A predetermined residual amount of monomer is contained in the composition, in an amount of, for example, 1 to 1000 weight ppm, preferably 10 to 900 ppm, and more preferably 20 to 800 ppm, with respect to the total weight of the composition, so that the effect of improving fluidity upon molding can be obtained, and plasticity can become favorable upon the melting of the resin.

Next, the molded body according to the present invention comprising a polycarbonate copolymer will be described.

<4. Molded Body>

The molded body according to the present invention is obtained by molding the aforementioned polycarbonate copolymer or a composition or the like comprising the polycarbonate copolymer. The method of molding the molded body is not particularly limited, and examples of the molded body may include an injection molded product, a press molded product, a blow molded product, an extrusion molded product, a vacuum molded product, and a pressure molded product.

In addition, the optical lens and molded body according to the present invention are obtained by molding the polycarbonate copolymer of the present invention, or a composition or the like comprising the polycarbonate copolymer. The polycarbonate copolymer of the present invention is suitable for an optical purpose, and the optical lens of the present invention has a refractive index, an Abbe number and the like, which are in the range suitable as a lens.

[II. Polysiloxane Compound]

The method for producing a polysiloxane compound such as polyarylene siloxane according to the present invention has a polymerization step of polymerizing, in the presence of a transesterification catalyst, a predetermined oxy silane compound such as a diaryloxy silane compound, and a diol compound such as an aromatic diol compound, each of which will be described in detail later. Hereafter, the method for producing a polysiloxane compound will be described.

Besides, in the method for producing a polysiloxane compound, the raw materials, reaction conditions and the like, which are described regarding the aforementioned polycarbonate copolymer, may be adopted. Likewise, in the aforementioned method for producing a polycarbonate copolymer, raw materials, reaction conditions and the like, which will be described in the following method for producing a polysiloxane compound, may be adopted.

An outline of the aforementioned polymerization reaction is as follows. For example, if a diphenoxy silane compound $(Si(CH_3)_2(OPh)_2)$ having two methyl groups and two phenoxy groups as one example of the diaryloxy silane compound and bisphenol A as one example of the aromatic diol compound are allowed to react with each other, the following polyarylene siloxane compound can be produced.

That is to say, a polyarylene siloxane compound having a siloxane structure generated as a result of the reaction of the following formula (A) can be obtained.

In this polymerization reaction, as described below, aryl alcohol such as phenol (PhOH) is generated as a by-product. Thus, in the polymerization step, the polymerization reaction is promoted, while removing aryl alcohol as a by-product, such as phenol, in a state in which the aforementioned mixture of individual components is melted and under reduced pressure.

[Formula 56]

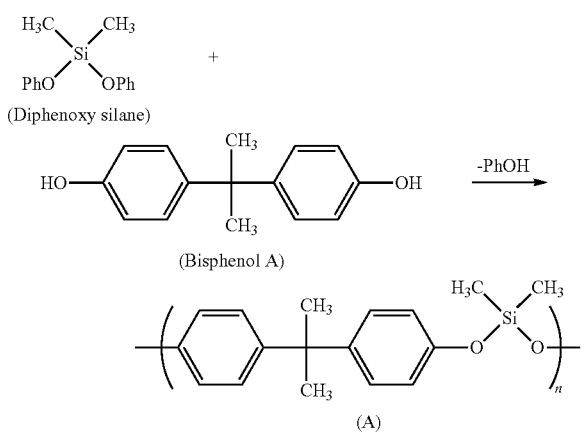

Hereafter, the method for producing a polysiloxane compound according to the present invention will be described in detail. Besides, the polysiloxane compound includes a polyarylene siloxane compound, a polyalkylene siloxane compound, a mixture thereof, and a polysiloxane compound comprising both a diaryloxy silane compound-derived constituent unit and a dialkoxy silane compound-derived constituent unit, the details of which will be described later, in the polymer chain thereof.

<1. Method for Producing Polysiloxane Compound>
[(I) Oxy Silane Compound]

The oxy silane compound used in the production of a polysiloxane compound includes a diaryloxy silane compound and a dialkoxy silane compound.

(A-1) Diaryloxy Silane Compound

The diaryloxy silane compound used in the polymerization step is used to form a siloxane constituent unit in a polyarylene siloxane compound, for example, as shown in the above formula (A).

The diaryloxy silane compound includes dialkyldiaryloxy silane, diaryldiaryloxy silane, and monoalkylmonoaryldiaryloxy silane. That is, in the polymerization step, any one of these compounds, or a plurality of these compounds may be used as a silane compound(s).

When the diaryloxy silane compound is represented by the general formula $Si(R^aR^b)(OAr)_2$, $R^a$ and $R^b$ are each independently selected from an alkyl group and an aryl group. It is preferable that $R^a$ and $R^b$ each independently represent an alkyl group having a total carbon number of 1 to 20 and optionally having a substituent, or an aryl group having a total carbon number of 6 to 30 and optionally having a substituent. More preferably, when $R^a$ and $R^b$ are each an alkyl group optionally having a substituent, the total carbon number is preferably 1 to 10, more preferably 1 to 6, and particularly preferably 1 or 2.

On the other hand, when $R^a$ and $R^b$ are each an aryl group optionally having a substituent, the total carbon number is preferably 6 to 20, more preferably 6 to 12, and particularly preferably 6 to 8.

The aforementioned substituent includes a hydroxyl group, halogen, an amino group, a vinyl group, a carboxyl group, a cyano group, a (meth)acryloxy group, a glycidyloxy group, and a mercapto group.

Specific examples of preferred $R_a$ and $R^b$ in the formula (1) may include a methyl group, a phenyl group, a vinyl group, and a propyl group.

Besides, as is clear from the above formula (A), the aryloxy group (OAr group) of the diaryloxy silane compound is not introduced into the polymer chain of the polyarylene siloxane compound, and it generates a by-product such as phenol (ArOH). Thus, the type of the aryloxy group is not particularly limited. However, in order to remove by-products generated in the polymerization step from the reaction system as easily as possible, an aryloxy group having a low polarity and a low molecular weight is preferable, and it is, for example, a phenoxy group.

Specific examples of the dialkyldiaryloxy silane may include dimethyldiphenoxy silane, methylethyldiphenoxy silane, and diethyldiphenoxy silane. A specific example of the diaryldiaryloxy silane may be diphenyldiphenoxy silane. In addition, a specific example of the monoalkylmonoaryldiaryloxy silane may be methylphenylphenoxy silane.

Besides, these diaryloxy silane compounds can be synthesized by a known method. Otherwise, commercially available products may also be used as such diaryloxy silane compounds.

(A-2) Dialkoxy Silane Compound

The dialkoxy silane compound includes dialkyldialoxy silane, diaryldialkoxy silane, and monoalkylmonoaryldialkoxy silane. That is, in the polymerization step, any one of these compounds, or a plurality of these compounds may be used as a silane compound (s).

When the dialkoxy silane compound is represented by the general formula $Si(R^aR^b)(OR^c)_2$, $R^a$ and $R^b$ each independently selected from the same alkyl group and aryl group as those for the $R^a$ and $R^b$ described in (A-1) Diaryloxy silane compound.

Besides, as is clear from the above formula (A), the alkoxy group ($OR^c$ group) of the silane compound is not introduced into the polymer chain of the polycarbonate copolymer, and it generates a by-product such as methanol (MeOH). Thus, the type of the alkoxy group is not particularly limited. However, in order to remove by-products generated in the polymerization step from the reaction system as easily as possible, the alkoxy group ($OR^c$ group) is, for example, a methoxy group.

Specific examples of the dialkyldialkoxy silane may include dimethyldimethoxy silane, methylethyldimethoxy silane, and diethyldimethoxy silane. A specific example of the diaryldialkoxy silane may be diphenyldimethoxy silane. In addition, a specific example of the monoalkylmonoaryldialkoxy silane may be methylphenyldimethoxy silane.

[(II) Diol Compound]

Examples of the diol compound used in the production of a polysiloxane compound may include an aromatic diol compound and an alicyclic diol compound. A mixture of the aromatic diol compound and the alicyclic diol compound may also be used as such a diol compound.

(A-1) Aromatic Diol Compound

As shown in the above formula (A) regarding the outline of the polymerization reaction, the aromatic diol compound used in the polymerization step is used to constitute the main chain of a polysiloxane compound such as a polyarylene siloxane compound.

Therefore, the aromatic diol compound used in the polymerization step is preferably a monomer that can become a material for polycarbonate resins. Examples of the aromatic diol compound used in the polymerization step may include bis(4-hydroxyphenyl)methane, 1,1-bis(4-hydroxyphenyl)ethane, 1,2-bis(4-hydroxyphenyl)ethane, 2,2-bis(4-hydroxyphenyl)propane, 2,2-bis(4-hydroxyphenyl)butane, 2,2-bis(4-hydroxyphenyl)octane, bis(4-hydroxyphenyl)phenylmethane, 1,1-bis(4-hydroxyphenyl)-1-phenylethane, bis(4-hydroxyphenyl)diphenylmethane, 2,2-bis(4-hydroxy-3-methylphenyl)propane, 1,1-bis(4-hydroxy-3-tert-butylphenyl)propane, 2,2-bis(3,5-dimethyl-4-hydroxyphenyl)propane, 2,2-bis(4-hydroxy-3-phenylphenyl)propane, 2,2-bis(3-cyclohexyl-4-hydroxyphenyl)propane, 2,2-bis(4-hydroxy-3-bromophenyl)propane, 2,2-bis(3,5-dibromo-4-hydroxyphenyl)propane, 1,1-bis(4-hydroxyphenyl)cyclopentane, 1,1-bis(4-hydroxyphenyl)cyclohexane, 2,2-bis(4-hydroxy-3-methoxyphenyl)propane, 4,4'-dihydroxydiphenyl ether, 4,4'-dihydroxy-3,3'-dimethylphenyl ether, 4,4'-dihydroxyphenyl sulfide, 4,4'-dihydroxy-3,3'-dimethyldiphenyl sulfide, 4,4'-dihydroxydiphenylsulfoxide, 4,4'-dihydroxy-3,3'-dimethyldiphenylsulfoxide, 4,4'-dihydroxydiphenyl sulfone, 4,4'-dihydroxy-3,3'-dimethyldiphenyl sulfone, 2,2-bis(3-t-butyl-4-hydroxyphenyl)propane, 2,2-bis(3-bromo-4-hydroxyphenyl)propane, 1,1-bis(3-cyclohexyl-4-hydroxyphenyl)cyclohexane, 1,1-bis(4-hydroxyphenyl)-3,3,5-trimethylcyclohexane, 4,4'-dihydroxybiphenyl, 9,9-bis(4-hydroxyphenyl)fluorene, 9,9-bis(4-hydroxy-3-methylphenyl)fluorene, 4,4'-sulfonyldiphenol, 2,2'-diphenyl-4,4'-sulfonyldiphenol, 2,2'-dimethyl-4,4'-sulfonyldiphenol, 1,3-bis{2-(4-hydroxyphenyl)propyl}benzene, 1,4-bis{2-(4-hydroxyphenyl)propyl}benzene, 1,4-bis(4-hydroxyphenyl)cyclohexane, 1,3-bis(4-hydroxyphenyl)cyclohexane, 4,8-bis(4-hydroxyphenyl)tricyclo[5.2.1.02,6]decane, 4,4'-(1,3-adamantanediyl)diphenol, and 1,3-bis(4-hydroxyphenyl)-5,7-dimethyladamantane.

Other than the aforementioned compounds, the aromatic diol compounds described in the above [(III-1) Aromatic diol compound] section regarding the polycarbonate copolymer can also be used in the polymerization step for producing a polysiloxane compound.

(A-2) Alicyclic Diol Compound

The alicyclic diol compound used in the polymerization step is also used to constitute the main chain of the polysiloxane compound.

Specific examples of the alicyclic diol compound may include spiroglycol, cyclohexane dimethanol, PCPDM, and TCDDM.

Other than the aforementioned compounds, the alicyclic diol compounds described in the above [(III-2) Alicyclic diol compound] section regarding the polycarbonate copolymer can also be used in the polymerization step for producing a polysiloxane compound.

[(III) Transesterification Catalyst]

The transesterification catalyst used in the polymerization step is preferably a catalyst comprising a basic compound. Examples of such a basic compound catalyst may include catalysts comprising an alkali metal compound or an alkaline-earth metal compound. Examples of such a compound may include organic acid salts such as alkali metal and alkaline-earth metal compounds, inorganic salts such as a carbonate, oxides, hydroxides, hydrides, and alkoxides. Otherwise, as such basic compound catalysts, a quaternary ammonium hydroxide and a salt thereof, amines, and the like are used. These compounds can be used alone or in combination of multiple types.

The transesterification catalyst more preferably comprises an alkali metal carbonate or an alkali metal hydroxide among the aforementioned basic compound catalysts. Specific examples of a more preferred transesterification catalyst may include transesterification catalysts comprising cesium carbonate, potassium carbonate, sodium carbonate, sodium hydrogen carbonate, cesium hydroxide, potassium hydroxide, sodium hydroxide, etc.

Besides, the transesterification catalyst can be prepared according to a known method, or a commercially available product may be used as such a transesterification catalyst.

[(IV) Polymerization Step]

In the polymerization step, at least, the aforementioned (I) dioxy silane compound such as a diaryloxy silane compound, and the aforementioned (II) diol compound such as an aromatic diol compound, are polymerized in the presence of (III) the transesterification catalyst. In this polymerization reaction, a mixture of the above-described individual components is melted, and aryl alcohol and/or alkyl alcohol generated as a by-product(s) are removed from the reaction mixture, in a molten state and under reduced pressure. By setting the above-described reaction conditions, the polymerization reaction can be efficiently promoted.

In the polymerization step, the pressure applied in the aforementioned polymerization reaction is preferably within a range of 101,300 Pa or less. The pressure applied in the polymerization reaction is more preferably 27,000 Pa or less, and further preferably 400 Pa or less.

In the polymerization step, it is preferable that a normal pressure condition without pressure reduction or a moderately reduced pressure condition is maintained for a certain period of time, and that the pressure in the reaction system is then gradually reduced and the polymerization reaction is further carried out. Hence, by gradually improving the degree of pressure reduction in the reaction system from the middle of the step, operations necessary for initiation of the reaction can be initiated under normal pressure, and aryl alcohol or alkyl alcohol generated as a by-product can be easily removed to the outside of the reaction system. Specifically, the pressure reduction step is preferably carried out at a pace of approximately 100 to 10,000 Pa/min, and the pressure is reduced at a pace of more preferably 500 to 7,000 Pa/min, and further preferably 1,000 to 4,000 Pa/min.

As is apparent from the above description, in the polymerization step, the polymerization reaction does not need to be carried out always under reduced pressure. After at least the raw materials have become a molten state, preferably after the polymerization reaction has been promoted to a certain extent, the pressure in the reaction system is preferably reduced. For example, as described later, in the polymerization step, it is preferable that the reaction temperature is gradually increased. Thus, the pressure reduction step is preferably initiated after the temperature in the reaction system has been increased to a certain extent, for example, in a state in which the temperature is increased to, for example, 150° C. or higher, and more preferably 180° C. or higher.

In the polymerization step, the temperature applied in the aforementioned polymerization reaction is preferably within a range of 150° C. to 300° C. The temperature applied in the polymerization reaction is more preferably 180° C. to 290° C., and further preferably 200° C. to 280° C.

As such, in the polymerization step, an oxy silane compound or a diaryloxy silane compound is preferably polymerized with a diol compound or an aromatic diol compound at a reaction temperature of higher than 200° C. In addition, the polymerization step is preferably carried out under reduced pressure.

Moreover, in order to gradually generate aryl alcohol or alkyl alcohol as a by-product and then to remove such a by-product, it is preferable that the temperature is gradually increased from room temperature up to the reaction temperature that is determined, for example, within the aforementioned range. The temperature rise is promoted at a pace of preferably approximately 1° C. to 10° C./min, more preferably 2° C. to 8° C./min, and further preferably 3° C. to 7° C./min.

The time required for the polymerization step is appropriately determined, while taking into consideration the type of a polysiloxane compound of interest and reaction conditions such as pressure and temperature. The total time required for the polymerization step is, for example, within 1 to 10 hours. More specifically, the reaction time before the aforementioned pressure reduction in the reaction system is 0.1 to 3 hours, and preferably 0.5 to 2 hours. The reaction time after the pressure reduction is 0.5 to 8 hours, and preferably 1 to 6 hours.

Moreover, the compatibility of individual components of the aforementioned oxy silane compound and diol compound is favorable, and thus, in the polymerization step, a polycarbonate copolymer can be produced without using solvents. Thus, since a solvent such as, for example, a halogen-based solvent is unnecessary, environmental load caused by the polymerization reaction can be reduced, and at the same time, the polymerization step can be simplified.

Furthermore, the by-products generated in the polymerization step are the aforementioned aryl alcohol, alkyl alcohol and the like. These substances are easily removed from the reaction system, and it is not necessary to perform a special treatment for considering safety. Thus, environmental load can be reduced by the method for producing a polysiloxane compound according to the present invention, compared with conventional production methods involving, for example, generation of an acid as a by-product or the use of an acid.

In the polymerization step, the ratio of the molar amount of the transesterification catalyst to the molar amount of the aromatic diol compound (molar ratio: namely, the value of the molar amount of the transesterification catalyst/the molar amount of the aromatic diol compound) is preferably 0.01 µmol/mol to 16,000 µmol/mol ($1.0 \times 10^{-8}$ to $1.6 \times 10^{-2}$). The present molar ratio is preferably 0.05 to 10,000 µmol/mol ($5.0 \times 10^{-8}$ to $1.0 \times 10^{-2}$), more preferably 0.5 to 5000 µmol/mol ($5.0 \times 10^{-7}$ to $5.0 \times 10^{-3}$), further preferably 0.80 to 1000 µmol/mol ($8.0 \times 10^{-7}$ to $1.0 \times 10^{-3}$), and particularly preferably 1.0 to 100 µmol/mol ($1.0 \times 10^{-6}$ to $1.0 \times 10^{-4}$).

In the polymerization step, the molar ratio of the diol compound such as an aromatic diol compound to the oxy silane compound such as a diaryloxy silane compound (namely, the value of the number of moles of the oxy silane compound/the number of moles of the diol compound) is, for example, 0.8 to 1.3, preferably 0.9 or more and 1.2 or less, more preferably 0.95 or more and 1.18 or less, and further preferably 1.00 or more and 1.16 or less.

Next, the polysiloxane compound according to the present invention will be described in details.

[(V) Polysiloxane Compound]

The polysiloxane compound produced by the production method of the present invention is a polymer having a siloxane constituent unit, as mentioned above, and specific siloxane constituent units are the following.

That is to say, the polyarylene siloxane compound is a polymer having, at least, a siloxane constituent unit represented by any one of the following formulae (1-1') to (1-4'):

[Formula 57]

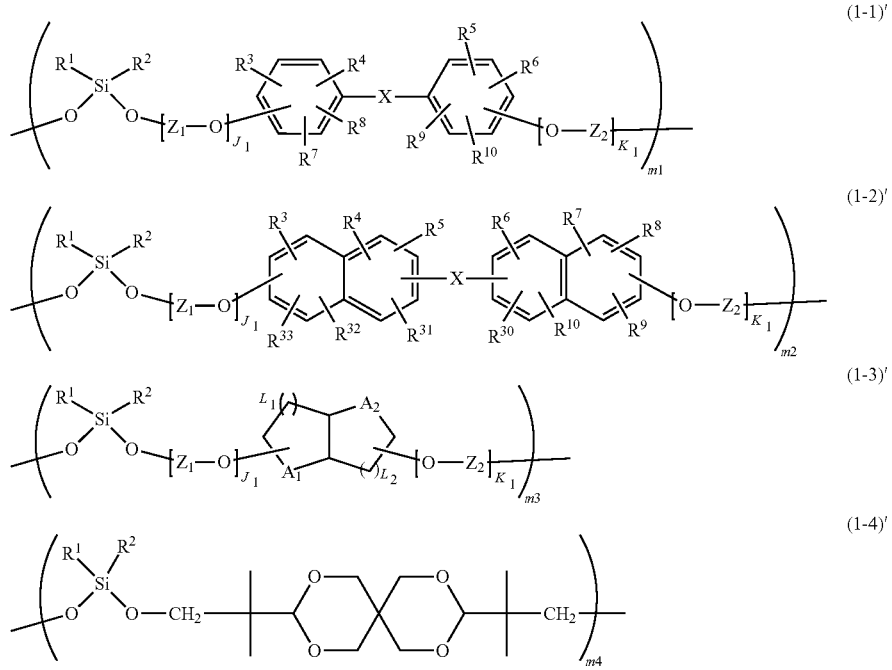

In the formulae (1-1') to (1-4'), $R^1$ and $R^2$ each independently represent an alkyl group containing 1 to 20 carbon atoms and optionally having a substituent, or an aryl group containing 6 to 30 carbon atoms and optionally having a substituent.

When $R^1$ and $R^2$ each represent an alkyl group optionally having a substituent, the total carbon number is preferably 1 to 10, more preferably 1 to 4, and particularly preferably 1 or 2.

On the other hand, when $R^1$ and $R^2$ each represent an aryl group optionally having a substituent, the total carbon number is preferably 6 to 20, more preferably 6 to 12, and particularly preferably 6 to 8.

In the formulae (1-1') and (1-2'), $R^3$ to $R^{10}$ each independently represent hydrogen, halogen, alkoxy, an alkyl group containing 1 to 20 carbon atoms and optionally having a substituent, an alkenyl group containing 2 to 20 carbon atoms and optionally having a substituent, or an aryl group containing 6 to 30 carbon atoms and optionally having a substituent.

When $R^3$ to $R^{10}$ each represent an alkyl group optionally having a substituent, the total carbon number is preferably 1 to 10, more preferably 1 to 4, and particularly preferably 1 or 2.

When $R^3$ to $R^{10}$ each represent an alkenyl group optionally having a substituent, the total carbon number is preferably 2 to 10, more preferably 2 to 6, and particularly preferably 2 to 4.

On the other hand, when $R^3$ to $R^{10}$ each represent an aryl group optionally having a substituent, the total carbon number is preferably 6 to 20, more preferably 6 to 12, and particularly preferably 6 to 8.

In the formulae (1-1') to (1-3'), $Z_1$ each independently represent an alkylene group optionally having a substituent and containing 1 to 5 carbon atoms, preferably containing 1 to 3 carbon atoms, and more preferably containing 1 or 2 carbon atoms.

In the formulae (1-1') to (1-3'), $J_1$ and $K_1$ each independently represent an integer of 0 or more and 5 or less, preferably an integer of 0 or more and 3 or less, more preferably an integer of 0 or more and 2 or less, and for example, 1 or 2.

In the formula (1-3'), $A_1$ and $A_2$ each independently represent either —O— or —CH—, and $L_1$ and $L_2$ each independently represent an integer of 0 or more and 3 or less, and $L_1$ and $L_2$ are preferably 1 or 2.

In the formulae (1-1') and (1-2'), X each independently represents a single bond or any one of structural formulae represented by the following formula (2):

[Formula 58]

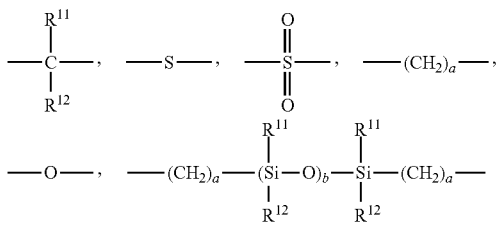

(2)

In the formula (2), $R^{11}$ and $R^{12}$ each independently represent hydrogen, halogen, an alkyl group containing 1 to 20 carbon atoms and optionally having a substituent, or an aryl group containing 6 to 30 carbon atoms and optionally having a substituent, or $R^{11}$ and $R^{12}$ bind to each other to form a carbocyclic or heterocyclic ring containing 1 to 20 carbon atoms and optionally having a substituent, and a and b each independently represent an integer of 0 or 1 or more and 5000 or less.

$R^{11}$ and $R^{12}$ preferably each independently represent hydrogen, an alkyl group containing 1 to 10 carbon atoms and optionally having a substituent, or an aryl group containing 6 to 16 carbon atoms and optionally having a substituent.

In the formula (2), a and b each independently represent an integer of 0 or 1 or more and 5000 or less, and a and b preferably represent an integer of 1000 or less, more preferably an integer of 500 or less, and further preferably an integer of 100 or less.

Furthermore, in the siloxane constituent unit, X preferably represents a fluorene ring structure formed by the binding of $R^{11}$ and $R^{12}$.

Further, the siloxane constituent unit preferably comprises, at least, a structure represented by the following formula (1'):

[Formula 59]

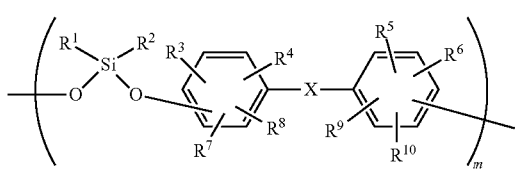

(1)

The siloxane structure comprising $R^1$ and $R^2$ in the formula (1') is introduced from the aforementioned oxy silane compound.

In the formula (1'), preferred options for $R^1$ and $R^2$ are the same as those for $R^1$ and $R^2$ in the above formulae (1-1') to (1-4').

The substituents for the aforementioned $R^1$ and $R^2$ may include a hydroxyl group, halogen, an amino group, a vinyl group, a carboxyl group, a cyano group, a (meth)acryloxy group, a glycidyloxy group, and a mercapto group.

Specific examples of the preferred $R^1$ and $R^2$ in the formula (1') may include a methyl group, a phenyl group, a vinyl group, and a propyl group.

In the formula (1'), preferred options for $R^3$ to $R^{10}$ are the same as those for $R^1$ and $R^2$ in the above formulae (1-1') to (1-4').

The substituents for the aforementioned $R^3$ to $R^{10}$ may include a hydroxyl group, halogen, an amino group, a vinyl group, a carboxyl group, a cyano group, a (meth)acryloxy group, a glycidyloxy group, and a mercapto group.

In the formula (1'), m represents an integer of 10 or more and 1,000 or less. The m value in the formula (1') is preferably 20 or more and 800 or less, and more preferably 30 or more and 500 or less.

In the formula (1), X is the same as $R^1$ and $R^2$ in the above formulae (1-1') and (1-2').

The weight average molecular weight of a polysiloxane compound such as a polyarylene siloxane compound is preferably 5,000 to 300,000, more preferably 10,000 to 300,000, further preferably 10,000 to 200,000, and particularly preferably 10,000 to 100,000. For example, it is 20,000 to 90,000, further preferably 30,000 to 80,000, and particularly preferably 40,000 to 70,000.

The glass transition temperature (Tg) of a polysiloxane compound such as a polyarylene siloxane compound, which is measured in accordance with JIS K 7121, is for example, 40° C. to 200° C., and preferably 45° C. to 160° C.

The aforementioned polysiloxane compound, namely, a polysiloxane compound having a siloxane constituent unit represented by any one of the formula (1-1) to the formula (1-4) and the formula (1-1') to the formula (1-4') has a weight average molecular weight of 5,000 to 300,000, and at the same time, the polysiloxane compound comprises a ring form represented by the following formula (5-4) in a total content of preferably 4.0% by weight or less, more preferably 3.0% by weight or less, further preferably 2.0% by weight or less, and particularly preferably 1.0% by weight or less, with respect to the total weight of the polysiloxane compound.

When the total content of such a ring form having a low molecular weight, for example, the total content of a cyclic dimer is within the aforementioned range, it is said that the properties of the polysiloxane compound are favorable, especially when the polysiloxane compound is used for an optical purpose.

[Formula 60]

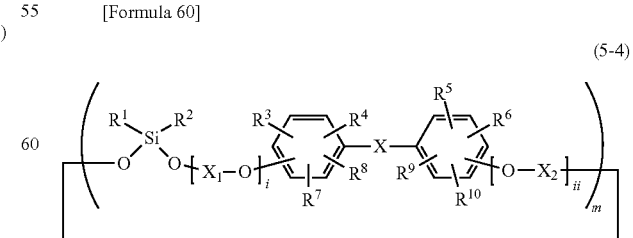

(5-4)

Regarding the formula (5-4), the constituent unit represented by the formula (5-4) and other constituent units are arbitrarily arranged. That is to say, constituent units other than the constituent unit whose configuration is clearly specified with the formula (5-4) may be comprised, but in all cases, the total value of m is 2 to 10, preferably 2 to 5, and more preferably 2 or 3, and it is, for example, 2.

$R^1$, $R^2$, $R^3$ to $R^0$, and X are the same as those in the formula (1-1) and the formula (1-2).

In the formula (5-4), $X_1$ and $X_2$ each independently represent an alkylene group optionally having a substituent and containing 1 to 5 carbon atoms, preferably 1 to 3 carbon atoms, and more preferably 1 or 2 carbon atoms.

In the formula (5-4), i and ii each independently represent an integer of 0 or more and 5 or less, preferably an integer of 0 or more and 3 or less, more preferably an integer of 0 or more and 2 or less, and for example, 1 or 2.

As in the case of the content percentage of the aforementioned low molecular weight compound having a weight average molecular weight of 1,000 or less in the polycarbonate copolymer, the lower limit value of the content percentage of the ring form having a low molecular weight in the polysiloxane compound is not particularly important, and it is approximately 0.7% by weight. However, even if the polysiloxane compound comprises approximately 0.001% by weight, 0.01% by weight, or 0.1% by weight of the above-described low molecular weight compound, there are no problems regarding the properties of the polysiloxane compound especially when the polysiloxane compound is used for an optical purpose, and further, fluidity can be improved. Hence, the lower limit value of the content percentage of the low molecular weight compound having a weight average molecular weight of 1,000 or less in the polysiloxane compound may also be 0.001% by weight, 0.01% by weight, or 0.1% by weight.

The content percentage of the aforementioned low molecular weight ring form in the polysiloxane compound is a value calculated by adding together the contents of several types of low molecular weight compounds as impurities from the ratio of the peak areas of individual components obtained by GPC analysis, the details of which will be described later. Specifically, as the details are described later, as with the measurement of the percentage of the low molecular weight compound having a molecular weight of 1,000 or less in the polycarbonate copolymer, the content percentage of the aforementioned low molecular weight ring form in the polysiloxane compound can be calculated from a predetermined GPC area ratio.

Besides, a specific example of the ring form represented by the formula (5-4) may be the cyclic dimer represented by the following formula (5-4'). The molecular structure of the cyclic dimer of the following formula (5-4') and the fact that such a cyclic dimer can be comprised in the polysiloxane compound were confirmed.

[Formula 61]

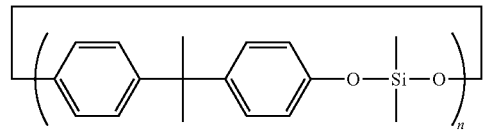

(5-4')

Furthermore, the polysiloxane compound may comprise the total content of ring forms represented by the following formulae (6-1) and (6-2). These ring forms are considered to be cyclic dimers that are generated as a result of the side reaction of the polymerization reaction for production of the polysiloxane compound. The content percentage of these cyclic dimers in the polysiloxane compound is preferably 2.0% by weight or less, more preferably 1.5% by weight or less, further preferably 1.0% by weight or less, and particularly preferably 0.5% by weight or less, with respect to the total weight of the polysiloxane compound.

[Formula 62]

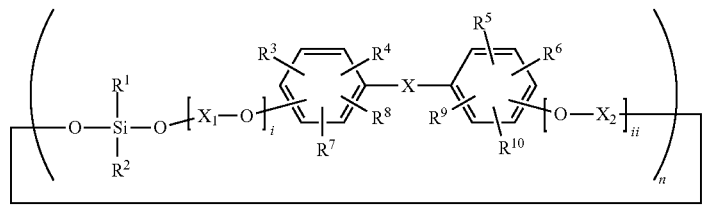

(6-1)

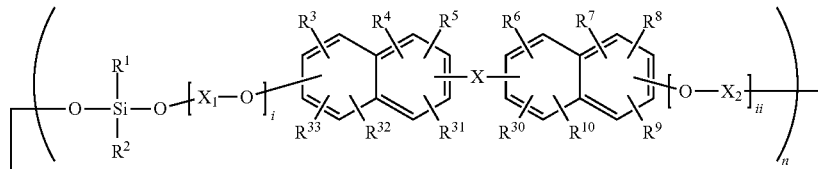

(6-2)

Regarding the formulae (6-1) and (6-2), the constituent units represented by these formulae and other constituent units are arbitrarily arranged. That is to say, constituent units other than the constituent units whose configurations are clearly specified with the formulae (6-1) and (6-2) may be comprised, but in all cases, the total value of n is 2 to 10, preferably 2 to 5, and more preferably 2 or 3, and it is, for example, 2.

In the formulae (6-1) and (6-2), $X_1$ and $X_2$ each independently represent an alkylene group optionally having a substituent and containing 1 to 5 carbon atoms, preferably 1 to 3 carbon atoms, and more preferably 1 or 2 carbon atoms.

In the formulae (6-1) and (6-2), i and ii each independently represent an integer of 0 or more and 5 or less, preferably an integer of 0 or more and 3 or less, more preferably an integer of 0 or more and 2 or less, and for example, 1 or 2.

Besides, in the formulae (6-1) and (6-2),
$R^1$ and $R^2$, $R^3$ to $R^{10}$, $Z_1$ and $Z_2$, $J_1$, $K_1$, and X are the same as those described above.

The lower limit value of the total content percentage of the cyclic dimers represented by the formulae (6-1) and (6-2) in the polysiloxane compound is not particularly limited, and it may be, for example, 0.001% by weight, 0.01% by weight, or 0.1% by weight. The presence of some amount of cyclic dimers can contribute to the improvement of fluidity upon the molding of the polysiloxane compound.

Specific examples of the compounds represented by the formulae (6-1) and (6-2) may include ring forms represented by the following formulae (6-1') and (6-2'), respectively.

[Formula 63]

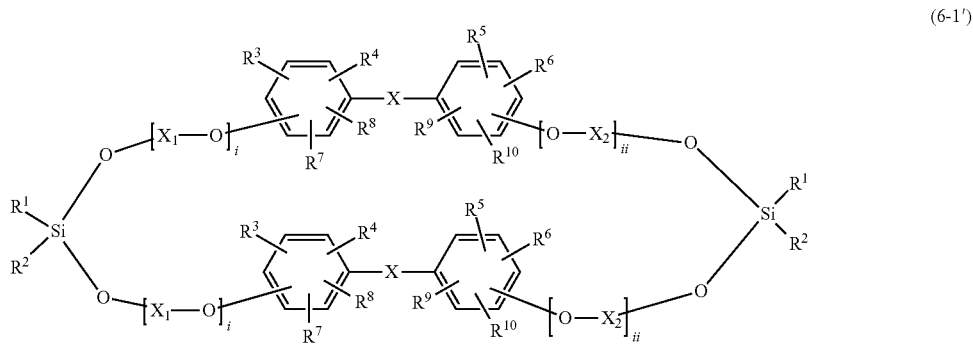

(6-1')

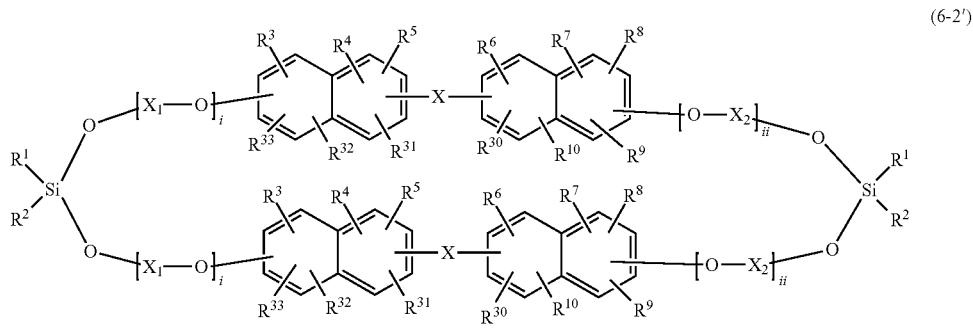

(6-2')

In the formulae (6-1') and (6-2'),
$R^1$ and $R^2$, $R^3$ to $R^{10}$ and $R^{30}$ to $R^{33}$, $Z_1$ and $Z_2$, $J_1$, $K_1$, and X are as mentioned above.

In the polysiloxane compound, the pyrolysis temperature necessary for a loss of 1% mass is preferably 415° C. or lower, more preferably 400° C. or lower, further preferably 385° C. or lower, and particularly preferably 370° C. or lower.

In the polysiloxane compound, the percentage of the total weight of silicon atoms (the total amount of Si) is preferably 0.1% to 20% by mass, more preferably 1.0% to 15% by mass, further preferably 2.0% to 12% by mass, and particularly preferably 3.0% to 10% by mass (for example, 3.1% by mass or more, or more than 3.1% by mass and 9.8% by mass or less), with respect to the total weight of the polysiloxane compound.

Next, the composition according to the present invention, namely, a composition comprising the aforementioned polysiloxane compound and the like, will be described in detail.

<3. Composition>

The composition of the present invention comprises the aforementioned polysiloxane compound and a polycarbonate resin. The polycarbonate resin may be, for example, a polycarbonate resin that does not completely contain or does not substantially contain a siloxane structure.

The type of the polycarbonate resin that is comprised together with the aforementioned polysiloxane compound in the composition is not particularly limited, as long as the polycarbonate resin comprises an —[O—R—OCO]— unit containing a carbonate ester bond in the molecular backbone thereof (wherein R includes an aliphatic group, an aromatic group, or both an aliphatic group and an aromatic group, and further has a linear structure or a branched structure). In addition, the polycarbonate resin that does not correspond to the aforementioned polysiloxane compound may also comprise polyester carbonate. The type of the polyester carbonate is not particularly limited either, as long as it comprises an —[O—R—OC]— unit containing a carbonate ester bond in the molecular backbone thereof (wherein R is as mentioned above).

The weight average molecular weight of the polycarbonate resin comprised together with the polysiloxane compound in the composition is preferably 10,000 to 100,000, more preferably 13,000 to 80,000, and further preferably 15,000 to 60,000.

The composition of the present invention may also comprise a resin other than the polycarbonate resin, and preferably a thermoplastic resin. The type of the thermoplastic resin is not particularly limited. Examples of the thermoplastic resin may include acrylic resins such as polymethyl methacrylate (PMMA), and various resins such as polyethylene terephthalate (PET), triacetyl cellulose (TAC), polyethylene naphthalate (PEN), polyimide (PI), a cycloolefin copolymer (COC), a norbornene-containing resin, polyether sulfone, cellophane and aromatic polyamide, as well as a polycarbonate resin and a polyester carbonate resin.

In the composition, the percentage of the total weight of silicon atoms (the total amount of Si) is preferably 0.1% to 20% by mass, more preferably 0.2% to 15% by mass, and particularly preferably 0.3% to 10% by mass, with respect to the total weight of the composition. The percentage of the total amount of Si in the composition can be adjusted based on the percentage of the siloxane constituent unit in all of the constituent units of the aforementioned polycarbonate resin, or the amount of a resin mixed with the polycarbonate resin or the Si amount.

For example, $Q_1$ that is the Q value of the composition comprising the polysiloxane compound measured under conditions of 280° C. and 160 kgf is preferably a value that is 120% or more (i.e., 20% or more higher), compared with $Q_2$ that is the Q value of only the polycarbonate resin comprised in the composition measured under the same conditions as those for $Q_1$. The $Q_1$ value of the entire composition is more preferably 130% or more, further preferably 140% or more, particularly preferably 150% or more, and for example, 160% or more, compared with the $Q_2$ value of only the polycarbonate resin.

Moreover, for example, in the case of a composition comprising 5% by mass of the polysiloxane compound, $Q_1$ that is the Q value of the composition comprising the polysiloxane compound measured under conditions of 280° C. and 160 kgf is preferably a value that is 140% or more (i.e., 40% or more higher), compared with $Q_2$ that is the Q value of only the polycarbonate resin comprised in the composition measured under the same conditions as those for $Q_1$. The $Q_1$ value of the entire composition is more preferably 150% or more, further preferably 160% or more, particularly preferably 170% or more, and for example, 180% or more, compared with the $Q_2$ value of only the polycarbonate resin.

Using a polysiloxane compound having a high content of Si, a composition having excellent characteristics can be produced. A polysiloxane compound or the like containing, for example, 0.1% by mass or more of Si is mixed with a resin that does not substantially contain a siloxane constituent unit, preferably with a polycarbonate resin, so that a good balance can be achieved between excellent impact resistance and excellent fluidity of the obtained composition.

Besides, a composition comprising a polysiloxane compound may contain a phenolic compound possibly generated as a by-product from the polymerization reaction, or an oxy silane compound and a diol compound that have not reacted and have remained. Since such a phenolic compound and DPC as impurities may cause a reduction in the strength when the composition is processed into a molded body, or generation of odor, the contents of these compounds are preferably as small as possible. Thus, the contents of such a phenolic compound, an oxy silane compound and a diol compound may be reduced to such an extent that these compounds are not detectable. However, from the viewpoint of productivity, these compounds may be contained in the composition to such an extent that they do not impair the effects of the composition. A predetermined residual amount of monomer is contained in the composition, in an amount of, for example, 1 to 1000 weight ppm, preferably 10 to 900 ppm, and more preferably 20 to 800 ppm, with respect to the total weight of the composition, so that the effect of improving fluidity upon molding can be obtained, and plasticity can become favorable upon the melting of the resin.

<4. Molded Body>

Next, a molded body comprising the aforementioned polysiloxane compound such as a polyarylene siloxane compound will be described.

The molded body of the present invention is obtained by molding the aforementioned polysiloxane compound such as a polyarylene siloxane compound. The method of molding the molded body is not particularly limited, and examples of the molded body may include an injection molded product, a press molded product, a blow molded product, an extrusion molded product, a vacuum molded product, and a pressure molded product.

In addition, the optical lens according to the present invention is obtained by molding the polysiloxane compound of the present invention, or a composition or the like comprising the polysiloxane compound. The polysiloxane compound of the present invention is suitable for an optical purpose, and is preferably used in an optical film, an optical lens, etc. In addition, the optical lens of the present invention has a refractive index, an Abbe number and the like, which are in the range suitable as a lens.

(Concerning Secondary Components)

Deactivating Agent

With regard to the polycarbonate copolymer and the polysiloxane compound of the present invention, after completion of the polymerization reaction, in order to maintain thermal stability and hydrolytic stability, the catalyst may be removed or deactivated. A method for deactivating the catalyst by addition of a known acidic substance can be preferably carried out. Specific examples of the acidic substance that is preferably used herein may include: esters such as butyl benzoate; aromatic sulfonic acids such as p-toluenesulfonic acid; aromatic sulfonic acid esters, such as butyl p-toluenesulfonate and hexyl p-toluenesulfonate; phosphoric acids, such as phosphorous acid, phosphoric acid, and phosphonic acid; phosphorous acid esters, such as triphenyl phosphite, monophenyl phosphite, diphenyl phosphite, diethyl phosphite, di-n-propyl phosphite, di-n-butyl phosphite, di-n-hexyl phosphite, dioctyl phosphite, and monooctyl phosphite; phosphoric acid esters, such as triphenyl phosphate, diphenyl phosphate, monophenyl phosphate, dibutyl phosphate, dioctyl phosphate, and monooctyl phosphate; phosphonic acids, such as diphenyl phosphonate, dioctyl phosphonate, and dibutyl phosphonate; phosphonic acid esters such as diethyl phenyl phosphonate; phosphines, such as triphenylphosphine and bis(diphenylphosphino)ethane; boric acids, such as boric acid and phenyl borate; aromatic sulfonates such as tetrabutylphosphonium dodecylbenzenesulfonate; organic halides, such as chloride stearate, benzoyl chloride, and p-toluenesulfonyl chloride; alkyl sulfates such as dimethyl sulfonate; and organic halogenates such as benzyl chloride. Such a deactivating agent is used in an amount of 0.001 to 50 times moles, and preferably 0.01 to 30 times moles, with respect to the amount of the catalyst.

Additives

<Stabilizer>

To the polycarbonate copolymer and the polysiloxane compound of the present invention, a stabilizer may be added. Examples of the stabilizer may include a thermal stabilizer and an antioxidant. When such a stabilizer is mixed into the present polycarbonate copolymer or polysiloxane compound, the additive ratio of the stabilizer is preferably 0.001 part by mass or more, more preferably 0.01 part by mass or more, and further preferably 0.02 parts by mass or more, with respect to 100 parts by mass of the polycarbonate copolymer or the polysiloxane compound. On the other hand, the additive ratio of the stabilizer is preferably 2 parts by mass or less, more preferably 1.4 parts by mass or less, and further preferably 1.0 parts by mass or less, with respect to 100 parts by mass of the polycarbonate copolymer or the polysiloxane compound. The present polycarbonate copolymer or polysiloxane compound may comprise only one type of stabilizer, or two or more types of stabilizers. When the present polycarbonate copolymer or polysiloxane compound comprises two or more types of stabilizers, the total amount of the stabilizers is preferably within the above-described range.

<<Thermal Stabilizer>>

Examples of the thermal stabilizer may include phenolic, phosphorus-based, and sulfur-based thermal stabilizers. Specific examples may include: phosphinic acids, such as phosphoric acid, phosphonic acid, phosphorous acid, phosphinic acid, and polyphosphoric acid; acidic pyrophosphate metal salts, such as acidic sodium pyrophosphate, acidic potassium pyrophosphate, and acidic calcium pyrophosphate; phosphates of Group 1 or Group 10 metals, such as potassium phosphate, sodium phosphate, cesium phosphate, and zinc phosphate; and organic phosphate compounds, organic phosphite compounds, and organic phosphonite compounds. In addition, the thermal stabilizer may also be at least one selected from the group consisting of: a phosphite ester compound (a) in which at least one ester in the molecule thereof is esterified with phenol and/or phenol having at least one alkyl group containing 1 to 25 carbon atoms; phosphorus acid (b); and tetrakis(2,4-di-tert-butylphenyl)-4,4'-biphenylene-di-phophonite (c). Specific examples of the phosphite ester compound (a) may include trioctyl phosphite, trioctadecyl phosphite, tridecylphosphite, trilauryl phosphite, tristearyl phosphite, triphenyl phosphite, tris(monononylphenyl) phosphite, tris(mononyl/dinonylphenyl) phosphite, trisnonylphenyl phosphite, tris(octylphenyl) phosphite, tris(2,4-di-tert-butylphenyl)phosphite, trinonylphosphite, didecylmonophenyl phosphite, dioctylmonophenyl phosphite, diisopropylmonophenyl phosphite, monobutyldiphenyl phosphite, monodecyldiphenyl phosphite, bis(2,4-di-tert-butylphenyl)pentaerythritol phosphite, bis(2,6-di-tert-butyl-4-methylphenyl)pentaerythritol phosphite, monooctyldiphenyl phosphite, distearyl pentaerythritol diphosphite, tricyclohexyl phosphite, diphenylpentaerythritol diphosphite, bis(2,6-di-tert-butyl-4-methylphenyl)pentaerythritol diphosphite, 2,2-methylenebis(4,6-di-tert-butylphenyl)octyl phosphite, bis(nonylphenyl) pentaerythritol diphosphite, bis(2,4-di-tert-butylphenyl) pentaerythritol diphosphite, and bis(2,6-di-tert-butyl-4-ethylphenyl)pentaerythritol diphosphite. These compounds may be used alone or in combination of two or more types.

Examples of the organic phosphite compound may include: "ADEKASTABU 1178 (product name, same applies hereafter)," "ADEKASTABU 2112," and "ADEKASTABU HP-10," which are manufactured by ADEKA; "JP-351," "JP-360," and "JP-3CP," which are manufactured by Johoku Chemical CO., LTD.; and "Irgafos 168" manufactured by BASF.

Examples of the phosphoric acid ester may include trimethyl phosphate, triethyl phosphate, tributyl phosphate, trioctyl phosphate, triphenyl phosphate, tricresyl phosphate, tris(nonylphenyl) phosphate, and 2-ethylphenyldiphenyl phosphate.

When such a thermal stabilizer is mixed into the present polycarbonate copolymer or polysiloxane compound, the additive ratio of the thermal stabilizer is preferably 0.001 part by mass or more, more preferably 0.01 part by mass or more, and further preferably 0.03 parts by mass or more, with respect to 100 parts by mass of the polycarbonate copolymer or the polysiloxane compound. On the other hand, the additive ratio of the thermal stabilizer is preferably 1 part by mass or less, more preferably 0.7 parts by mass or less, and further preferably 0.5 parts by mass or less, with respect to 100 parts by mass of the polycarbonate copolymer or the polysiloxane compound.

The present polycarbonate copolymer or polysiloxane compound may comprise only one type of thermal stabilizer, or two or more types of thermal stabilizers. When the present polycarbonate copolymer or polysiloxane compound comprises two or more types of thermal stabilizers, the total amount of the thermal stabilizers is preferably within the above-described range.

<<Antioxidant>>

Examples of the antioxidant may include a phenolic antioxidant, a hindered phenolic antioxidant, a bisphenolic antioxidant, and a polyphenolic antioxidant. Specific examples may include 2,6-di-tert-butyl-4-methylphenol, tris (3,5-di-tert-butyl-4-hydroxybenzyl) isocyanurate, n-octadecyl-3-(3',5'-di-tert-butyl-4'-hydroxyphenyl)propionate, tetrakis[methylene-3-(3,5-di-tert-butyl-4-hydroxyphenyl) propionate]methane, 4,4'-butylidenebis-(3-methyl-6-tert-butylphenol), triethylene glycol-bis[3-(3-tert-butyl-4-hydroxy-5-methylphenyl)propionate], 3,9-bis{2-[3-(3-tert-butyl-4-hydroxy-5-methylphenyl)propionyloxy]-1,1-dimethylethyl}-2,4,8,10-tetraoxaspiro[5,5]undecane, pentaerythritol tetrakis[3-(3,5-di-tert-butyl-4-hydroxyphenyl)propionate], thiodiethylenebis[3-(3,5-di-tert-butyl-4-hydroxyphenyl)propionate], N,N'-hexane-1,6-diylbis[3-(3,5-di-tert-butyl-4-hydroxyphenylpropionamide)], 2,4-dimethyl-6-(1-methylpentadecyl)phenol, diethyl[[3,5-bis(1,1-dimethylethyl)-4-hydroxyphenyl]methyl]phosphate, 3,3',3'',5,5',5''-hexa-tert-butyl-a,a',a''-(mesitylene-2,4,6-triyl)tri-p-cresol, 4,6-bis(octylthiomethyl)-o-cresol, ethylenebis (oxyethylene)bis[3-(5-tert-butyl-4-hydroxy-m-tolyl) propionate], hexamethylenebis[3-(3,5-di-tert-butyl-4-hydroxyphenyl)propionate], 1,3,5-tris(3,5-di-tert-butyl-4-hydroxybenzyl)-1,3,5-triazine-2,4,6(1H,3H,5H)-trione, and 2,6-di-tert-butyl-4-(4,6-bis(octylthio)-1,3,5-triazin-2-ylamino)phenol.

Examples of the phenolic antioxidant may include: "Irganox 1010" (registered trademark, same applies hereafter) and "Irganox 1076," which are manufactured by BASF; and "ADEKASTABU AO-50" and "ADEKASTABU AO-60," which are manufactured by ADEKA.

When such an antioxidant is mixed into the present polycarbonate copolymer or polysiloxane compound, the additive ratio of the antioxidant is preferably 0.001 part by mass or more, and more preferably 0.01 part by mass or more, with respect to 100 parts by mass of the polycarbonate copolymer or the polysiloxane compound. On the other hand, the additive ratio of the antioxidant is preferably 1 part by mass or less, and more preferably 0.5 parts by mass or less, with respect to 100 parts by mass of the polycarbonate copolymer or the polysiloxane compound.

The present polycarbonate copolymer or polysiloxane compound may comprise only one type of antioxidant, or two or more types of antioxidants. When the present polycarbonate copolymer or polysiloxane compound comprises two or more types of antioxidants, the total amount of the antioxidants is preferably within the above-described range.

The polycarbonate copolymer and the polysiloxane compound of the present invention may comprise various types of additives within a range that is not deviated from the spirit of the present invention. Such an additive may be, for example, at least one additive selected from a flame retardant, a flame retardant aid, an ultraviolet absorber, a mold release agent, and a coloring agent. The present polycarbonate copolymer or polysiloxane compound preferably comprises at least one of a flame retardant and a mold release agent.

Moreover, to the present polycarbonate copolymer or polysiloxane compound, an antistatic agent, a fluorescent brightener, an antifog agent, a fluidity improver, a plasticizer, a disperser, an antibacterial agent, and the like may also be added, unless these additives significantly impair various desired properties.

<Flame Retardant>

Various types of additives may be mixed into the polycarbonate copolymer and the polysiloxane compound of the present invention, within a range that is not deviated from the spirit of the present invention. Examples of the flame retardant that may be mixed into the polycarbonate copolymer or the polysiloxane compound may include an organic metal salt-based flame retardant, a phosphorus-based flame retardant, and a silicone-based flame retardant. The flame retardants used in the present invention may be, for example, the flame retardants (flame retardant compositions) described in paragraphs 0085 to 0093 of JP Patent Publication (Kokai) No. 2016-183422 A, and these contents are incorporated into the present description.

<Ultraviolet Absorber>

Examples of the ultraviolet absorber may include: inorganic ultraviolet absorbers, such as cerium oxide and zinc oxide; and organic ultraviolet absorbers, such as a benzotriazole compound, a benzophenone compound, a salicylate compound, a cyanoacrylate compound, a triazine compound, an oxanilide compound, a malonic acid ester compound, a hindered amine compound, and a phenyl salicylate compound. Among these, organic ultraviolet absorbers, such as benzotriazole-based and benzophenone-based ultraviolet absorbers, are preferable. In particular, specific examples of the benzotriazole compound may include 2-(2'-hydroxy-5'-methylphenyl)benzotriazole, 2-[2'-hydroxy-3',5'-bis(α,α-dimethylbenzyl)phenyl]-benzotriazole, 2-(2'-hydroxy-3',5'-di-tert-butyl-phenyl)-benzotriazole, 2-(2'-hydroxy-3'-tert-butyl-5'-methylphenyl)-5-chlorobenzotriazole, 2-(2'-hydroxy-3',5'-di-tert-butyl-phenyl)-5-chlorobenzotriazole, 2-(2'-hydroxy-3',5'-di-tert-amyl)-benzotriazole, 2-(2'-hydroxy-5'-tert-octylphenyl)benzotriazole, 2,2'-methylenebis[4-(1,1,3,3-tetramethylbutyl)-6-(2N-benzotriazol-2-yl)phenol], 2-(4,6-diphenyl-1,3,5-triazin-2-yl)-5-[(hexyl)oxy]-phenol, 2-[4,6-bis(2,4-dimethylphenyl)-1,3,5-triazin-2-yl]-5-(octyloxy)phenol, 2,2'-(1,4-phenylene)bis[4H-3,1-benzooxazin-4-one], [(4-methoxyphenyl)-methylene]-propanedioic acid-dimethyl ester, 2-(2H-benzotriazol-2-yl)-p-cresol, 2-(2H-benzotriazol-2-yl)-4,6-bis(1-methyl-1-phenylmethyl)phenol, 2-[5-chloro(2H)-benzotriazol-2-yl]-4-methyl-6-(tert-butyl)phenol, 2,4-di-tert-butyl-6-(5-chlorobenzotriazol-2-yl)phenol, 2-(2H-benzotriazol-2-yl)-4-(1,1,3,3-tetrabutyl)phenol, 2,2'-methylenebis[6-(2H-benzotriazol-2-yl)-4-(1,1,3,3-tetrabutyl)phenol], and [methyl-3-[3-tert-butyl-5-(2H-benzotriazol-2-yl)-4-hydroxyphenyl]propionate-polyethylene glycol] condensate. Among the above-described benzotriazole compounds, preferred examples may include 2-(2'-hydroxy-5'-tert-octylphenyl)benzotriazole and 2,2'-methylene-bis[4-(1,1,3,3-tetramethylbutyl)-6-(2N-benzotriazol-2-yl)phenol]. Specific examples of the benzophenone-based ultraviolet absorber may include 2,4-dihydroxy-benzophenone, 2-hydroxy-4-methoxy-benzophenone, 2-hydroxy-4-n-octoxy-benzophenone, 2-hydroxy-4-dodecyloxy-benzophenone, 2-hydroxy-4-octadecyloxy-benzophenone, 2,2'-dihydroxy-4-methoxybenzophenone, 2,2'-dihydroxy-4,4'-dimethoxybenzophenone, and 2,2',4,4'-tetrahydroxy-benzophenone. Specific examples of the phenyl salicylate-based ultraviolet absorber may include phenyl salicylate and 4-tert-butylphenyl salicylate. Specific examples of the triazine-based ultraviolet absorber may include 2-(4,6-diphenyl-1,3,5-triazin-2-yl)-5-[(hexyl)oxy]-phenol and 2-[4,6-bis(2,4-dimethylphenyl)-1,3,5-triazin-2-yl]-5-(octyloxy)phenol. A specific example of the hindered amine-based ultraviolet absorber may be bis(2,2,6,6-tetramethylpiperidin-4-yl)sebacate.

When such an ultraviolet absorber is mixed into the present polycarbonate copolymer or polysiloxane compound, the additive ratio of the ultraviolet absorber is preferably 0.01 part by mass or more, and more preferably 0.1 part by mass or more, with respect to 100 parts by mass of the polycarbonate copolymer or the polysiloxane compound. On the other hand, the additive ratio of the ultraviolet absorber is preferably 3 parts by mass or less, and more preferably 1 part by mass or less, with respect to 100 parts by mass of the polycarbonate copolymer or the polysiloxane compound.

The ultraviolet absorber may be used alone as only one type, or in combination of two or more types. When two or more types of ultraviolet absorbers are used, the total amount of the ultraviolet absorbers is preferably within the above-described range.

<Mold Release Agent>

Examples of the mold release agent may include carboxylic acid ester, polysiloxane compound, and paraffin wax (polyolefin-based). A specific example of the mold release agent may be at least one compound selected from the group consisting of aliphatic carboxylic acid, an ester of aliphatic carboxylic acid and alcohol, an aliphatic hydrocarbon compound having a number average molecular weight of 200 to 15000, and polysiloxane-based silicone oil. The aliphatic carboxylic acid may be saturated or unsaturated, aliphatic, monovalent, divalent or trivalent carboxylic acid. Herein, the aliphatic carboxylic acid also includes alicyclic carboxylic acid. Among these, the aliphatic carboxylic acid is preferably aliphatic, monovalent or divalent carboxylic acid containing 6 to 36 carbon atoms, and more preferably aliphatic saturated monovalent carboxylic acid containing 6 to 36 carbon atoms. Specific examples of the aliphatic carboxylic acid may include palmitic acid, stearic acid, valeric acid, caproic acid, capric acid, lauric acid, alaquinic acid, behenic acid, lignoceric acid, cerotic acid, melissic acid, tetrariacontanoic acid, montanic acid, glutaric acid, adipic acid, and azelaic acid. As aliphatic carboxylic acid in the ester of aliphatic carboxylic acid and alcohol, the same aliphatic carboxylic acid as that described above can be used. On the other hand, as alcohol, saturated or unsaturated monohydric or polyhydric alcohol can be used. Such alcohol may have a substituent such as a fluorine atom or an aryl group. Among these, monohydric or polyhydric saturated alcohol containing 30 or less carbon atoms is preferable, and aliphatic saturated monohydric or polyhydric alcohol containing 30 or less carbon atoms is more preferable. Herein, the aliphatic compound also includes an alicyclic compound. Specific examples of the alcohol may include octanol, decanol, dodecanol, stearyl alcohol, behenyl alcohol, ethylene glycol, diethylene glycol, glycerin, pentaerythritol, 2,2-dihydroxyperfluoropropanol, neopentylene glycol, ditrimethylolpropane, and dipentaerythritol. Besides, the above-described ester compound may contain, as impurities, aliphatic carboxylic acid and/or alcohol, or may also be a mixture of multiple compounds. Specific examples of the ester of aliphatic carboxylic acid and alcohol may include bee wax (a mixture comprising melissyl palmitate as a main component), stearyl stearate, behenyl behenate, stearyl behenate, glycerin monopalmitate, glycerin monostearate, glycerin distearate, glycerin tristearate, pentaerythritol monopalmitate, pentaerythritol monostearate, pentaerythritol distearate, pentaerythritol tristearate, and pentaerythritol tetra stearate. Examples of the aliphatic hydrocarbon having a number average molecular weight of 200 to 15000 may include liquid paraffin, paraffin wax, microcrystalline wax, polyethylene wax, Fischer-Tropsch wax, and an α-olefin oligomer containing 3 to 12 carbon atoms. Herein, the aliphatic hydrocarbon also includes alicyclic hydrocarbon. In addition, these hydrocarbon compounds may be partially oxidized. Among these, paraffin wax, polyethylene wax, or a partial oxide of polyethylene wax is preferable, and paraffin wax or polyethylene wax is more preferable. The number average molecular weight is preferably 200 to 5000. The aliphatic hydrocarbon may be a single substance, or may also be a mixture consisting of aliphatic hydrocarbons having various constituents or molecular weights. It may be adequate if the main component thereof is within the above-described range. Examples of the polysiloxane-based silicone oil may include dimethyl silicone oil, phenylmethyl silicone oil, diphenyl silicone oil, and fluorinated alkyl silicone. Two or more types of these substances may be used in combination.

When such a mold release agent is mixed into the present polycarbonate copolymer or polysiloxane compound, the additive ratio of the mold release agent is preferably 0.001 part by mass or more, and more preferably 0.01 part by mass or more, with respect to 100 parts by mass of the polycarbonate copolymer or the polysiloxane compound. On the other hand, the additive ratio of the mold release agent is preferably 2 parts by mass or less, and more preferably 1 part by mass or less, with respect to 100 parts by mass of the polycarbonate copolymer or the polysiloxane compound.

The mold release agent may be used alone as only one type, or in combination of two or more types. When two or more types of mold release agents are used, the total amount of the mold release agents is preferably within the above-described range.

<Coloring Agent>

The coloring agent may be either a dye or a pigment, and examples of the coloring agent may include an inorganic pigment, an organic pigment, and an organic dye. Examples of the inorganic pigment may include: sulfide pigments, such as carbon black, cadmium red, and cadmium yellow; silicate pigments, such as ultramarine blue; oxide pigments, such as titanium oxide, zinc oxide, red iron oxide, chromium oxide, iron black, titanium yellow, zinc-iron brown, titanium cobalt green, cobalt green, cobalt blue, copper-chromium black, and copper-iron black, chromic acid pigments, such as chrome yellow and molybdate orange; and ferrocyanide pigments, such as iron blue. Moreover, examples of the organic pigment and the organic dye used as coloring agents may include: phthalocyanine dye pigments (wherein a dye or a pigment is referred to as a dye pigment; same applies hereafter), such as copper phthalocyanine blue and copper phthalocyanine green; azo dye pigments, such as nickel azo yellow; condensed polycyclic dye pigments, such as thioindigo, perinone, perylene, quinacridone, dioxazine, isoindolinone, and quinophthalone dye pigments; and quinoline, anthraquinone, heterocyclic, and methyl dye pigments. Among these, titanium oxide, carbon black, and cyanine, quinoline, anthraquinone and phthalocyanine dye pigments, etc. are preferable in terms of thermal stability.

Furthermore, for the purpose of improving handling ability upon extrusion and improving dispersibility into a resin composition, a coloring agent, which is master-batched with a polystyrene resin, a polycarbonate resin or an acrylic resin, may also be used.

When such a coloring agent is mixed into the present polycarbonate copolymer or polysiloxane compound, the additive ratio of the coloring agent is preferably 5 parts by mass or less, more preferably 3 parts by mass or less, and further preferably 2 parts by mass or less, with respect to 100 parts by mass of the polycarbonate copolymer or the polysiloxane compound. On the other hand, the additive ratio of the coloring agent is 0.1 part by mass or more, with respect to 100 parts by mass of the polycarbonate copolymer or the polysiloxane compound. The coloring agent may be used alone as only one type, or in combination of two or more types. When two or more types of coloring agents are used, the total amount of the coloring agents is preferably within the above-described range.

Molded Bodies Other than Lens

The molded body obtained using the polycarbonate copolymer or the polysiloxane compound is not particularly limited in terms of shape, pattern, color, size, etc. These conditions may be arbitrarily determined, depending on the intended use thereof. Specific examples of the molded body may include electrical and electronic equipment, OA (Office Automation) equipment, information terminal equipment, mechanical parts, home appliances, vehicle parts, building materials, various types of vessels, leisure goods and/or miscellaneous goods, parts for lighting equipment, parts for various household appliances, etc., the housing, vessel, cover, storage and case of electric appliances, and the cover and case of lighting equipment. Examples of the electrical and electronic equipment may include personal computers, game players, television receivers, display devices such as liquid crystal display devices and plasma display devices, printers, copy machines, scanners, facsimile machines, digital notebook or personal digital assistant (PDA), electronic desk calculators, electronic dictionaries, cameras, video cameras, mobile phones, battery packs, drives and readers of recording media, mice, numeric keypads, CD (Compact Disc) players, MD (MiniDisc) players, and portable radios/audio players. In addition, other examples of the molded product may include illuminated signboards, LCD backlights, lighting displays, traffic signs, signboards, screens, automobile parts (vehicle parts) such as reflector and meter parts, toys, and ornaments.

Since the polycarbonate copolymer and the polysiloxane compound of the present application can be processed into a molded body having excellent impact resistance, high fluidity upon melting, and a fine structure, the present polycarbonate copolymer and polysiloxane compound can be preferably used as automotive electrical and electronic components, mechanical parts, and vehicle parts. Examples of such parts may include car interior panels, car lamp lenses, car inner lenses, automotive lens protective covers, and automotive light guides.

Method of Molding Molded Body

The method for producing a molded body of the present invention is not particularly limited, and a molding method generally adopted for resins such as polycarbonate resins can be arbitrarily adopted. Examples of the method for producing a molded body may include an injection molding method, an ultrahigh-speed injection molding method, an injection compression molding method, a two-color molding method, a hollow molding method such as gas assist, a molding method using an insulation mold, a molding method using a rapid heating mold, a foam molding (including supercritical fluid), an insert molding, an IMC (in-mold coating molding) molding method, an extrusion molding method, a sheet molding method, a thermoforming method, a rotary molding method, a laminated molding method, and a press molding method. Further, a molding method involving a hot-runner system can also be applied.

Other Resins

The polycarbonate copolymer and the polysiloxane compound of the present invention may also comprise resins other than the polycarbonate copolymer of the present invention and resins other than the polysiloxane compound, as necessary, unless such other resins significantly impair various desired properties. Examples of such other resins may include: thermoplastic polyester resins, such as a polycarbonate resin other than the polycarbonate copolymer and the polysiloxane compound of the present invention, a polyethylene terephthalate resin (PET resin), a polytrimethylene terephthalate resin (PTT resin), and a polybutylene terephthalate resin; styrene resins, such as a polystyrene resin (PS resin), a high impact polystyrene resin (HIPS), an acrylonitrile-styrene copolymer (AS resin), and a methyl methacrylate-styrene copolymer (MS resin); core/shell type elastomers such as a methyl methacrylate-acrylic rubber-styrene copolymer (MAS), and elastomers such as a polyester elastomer; polyolefin resins, such as a cyclic cycloolefin resin (COP resin) or a cyclic cycloolefin (COP) copolymer resin; a polyamide resin (PA resin); a polyimide resin (PI resin); a polyether imide resin (PEI resin); a polyurethane resin (PU resin); a polyphenylene ether resin (PPE resin); a polyphenylene sulfide resin (PPS resin); a polysulfone resin (PSU resin); a polymethacrylate resin (PMMA resin); and polycaprolactone.

EXAMPLES

Examples of Polycarbonate Resin

<Measurement of Weight Average Molecular Weight (Mw) in Terms of Polystyrene>

Applying GPC (gel permeation chromatography), and using chloroform as a developing solvent, a calibration curve was produced using standard polystyrene (Shodex STANDARD, SM-105) with a known molecular weight (molecular weight distribution=1). From the measured standard polystyrene, the elution time and the molecular weight value of each peak were plotted, and an approximation was made using an expression of the third order to prepare a calibration curve.

Thereafter, based on the obtained calibration curve, the weight average molecular weight (Mw) was obtained as a value in terms of polystyrene according to the following equation.

$$Mw = \Sigma(W_i \times M_i) / \Sigma(W_i) \qquad \text{[Equation]}$$

wherein i represents an $i^{th}$ division point upon division of the molecular weight M; $W_i$ represents an $i^{th}$ weight; $M_i$ represents an $i^{th}$ molecular weight; and the molecular weight M represents a molecular weight in terms of polystyrene at the same elution time in the calibration curve.

[Measurement Conditions]

Apparatus: LabSolutions, manufactured by Shimadzu Corporation
Columns: Guard column (Shodex GPC K-G 4A)×1, Analysis column (Shodex GPC K-805L)×2
Solvent: chloroform (HPLC grade)
Injected amount: 10 μL
Sample concentration: 2000 ppm
Flow rate of solvent: 1 mL/min
Measurement temperature: 40° C.
Detector: RI <Measurement of Content Percentage of Low Molecular Weight Compound with Weight Average Molecular Weight (Mw) of 1,000 or Less>

The percentage of a low molecular weight compound with Mw of 1,000 or less in the polycarbonate resin was calculated from the ratio between the area of a retention time from 20.5 min to 21.5 min/the area of a retention time from 0 min to 21.5 min (GPC area ratio), based on the data obtained by a GPC analysis performed under the aforementioned conditions.

Specifically, the GPC analysis was carried out under the conditions described in the section <Measurement of weight average molecular weight (Mw) in terms of polystyrene>. Thereafter, the content percentage (B/A×100(%)) of the low molecular weight compound was measured, based on the ratio between the GPC area (A) of a peak confirmed at a retention time of 21.5 min or less considered to correspond to the amount of all compounds comprised in the sample of the polycarbonate resin, and the GPC area (B) of a peak confirmed at a retention time between 20.5 min and 21.5 min considered to correspond to the amount of the low molecular weight compound with a weight average molecular weight of 1,000 or less.

<Measurement of Glass Transition Temperature (Tg)>

As a measurement sample, a test piece with a size of 5 to 12 mg was weighed into a sample container for AI autosampler (an RDC aluminum pan, a cylindrical container having a diameter of 6.8 mm and a height of 2.5 mm), and the upper portion of the sample container was sealed with a cover for AI autosampler.

The measurement of Tg was carried out using a differential scanning calorimeter (DSC) in a nitrogen atmosphere (nitrogen flow rate: 50 ml/min), and for a reference cell, 10.0 mg of sapphire was used as a standard substance. The measurement sample adjusted to 30° C. was heated to 280° C. at a rate of 20° C./min, and was then cooled to 30° C. at a rate of 20° C./min. Thereafter, the temperature was increased to 280° C. at a rate of 10° C./min, and the Tg of the measurement sample was measured.

Measurement apparatus: Differential scanning calorimeter (DSC) (product name: "DSC-7020," manufactured by Hitachi High-Tech Science Corporation)

<Measurement of Low Molecular Weight Compounds (Phenol(PhOH), Bisphenol A (BPA), Dimethyldiphenoxy Silane (DMDPS), and Diphenyl Carbonate (DPC))>

A sample (10 g) was dissolved in 60 g of dichloromethane to prepare a resin solution, and thereafter, 150 g of ethanol was added dropwise into the resin solution during stirring over 30 minutes. The precipitate was filtrated through a NoA5 filter, and the filtrate was then concentrated using an evaporator to obtain an oligomer component a.

The obtained precipitate was dissolved in 60 g of dichloromethane to prepare a resin solution, and thereafter, 150 g of ethanol was added dropwise to the resin solution, so as to obtain a precipitate and an oligomer component b.

The obtained oligomer components a and b were each dissolved in dichloromethane to prepare a 1000 μg/mL solution, which was then analyzed and quantified by GC/FID.

The quantitative value is a value relative to 2,2-bis(4-hydroxyphenyl)propane, which is obtained from the previously prepared calibration curve of 2,2-bis(4-hydroxyphenyl)propane.

[Measurement Conditions for GC/FID]
- Apparatus: GC2025, manufactured by Shimadzu Corporation
- Column: Capillary column DB-35, 30 mm×0.25 mm×0.25 μm
- Temperature-increasing conditions: 40° C.-300° C. (5 min hold), 10° C./min
- Temperature of injection port: 300° C., injected amount: 1.0 μL (split ratio: 1:20)
- Carrier gas: He
- Air flow rate: 400 mL/min
- H2 flow rate: 40 mL/min
- Makeup gas: 30 mL/min
- Standard substance: 2,2-bis(4-hydroxyphenyl)propane <Measurement of Cyclic Dimer>

The content of the aforementioned cyclic dimer in the polycarbonate copolymer was measured as follows.

A sample (20 g) of the polycarbonate copolymer was dissolved in 120 g of dichloromethane to prepare a resin solution, and thereafter, 200 g of ethanol was added dropwise into the resin solution during stirring over 30 minutes. The precipitate was filtrated through a NoA5 filter, and the filtrate was then concentrated using an evaporator to obtain an oligomer component A and a precipitate A.

Subsequently, the obtained precipitate A was dissolved in 120 g of dichloromethane to prepare a resin solution, and thereafter, 200 g of ethanol was added dropwise into the resin solution during stirring over 30 minutes. The precipitate was filtrated through a NoA5 filter, and the filtrate was then concentrated using an evaporator to obtain an oligomer component B and a precipitate B.

Subsequently, the obtained precipitate B was dissolved in 120 g of dichloromethane to prepare a resin solution, and thereafter, 200 g of ethanol was added dropwise into the resin solution during stirring over 30 minutes. The precipitate was filtrated through a NoA5 filter, and the filtrate was then concentrated using an evaporator to obtain an oligomer component C and a precipitate C.

The thus obtained oligomer components A, B and C were each dissolved in dichloromethane to prepare a 1000 μg/mL solution, and the cyclic dimer was then analyzed by GC/FID. The quantitative value is a value relative to 2,2-bis(4-hydroxyphenyl)propane, which was obtained from the previously prepared calibration curve of 2,2-bis(4-hydroxyphenyl)propane.

[Measurement Conditions for GC-Q-MS/FID]
- Apparatus: Agilent-7890B/Agilent-5975C MSD Inert XL MSD with TAD, manufactured by Agilent Technologies Japan, Ltd.
- Column: DB-5MS, 15 mm×0.25 mm×0.1 μm
- Restrictor (MS): 0.18 mm×1.44 mm
- Restrictor (FID): 0.18 mm×0.53 mm
- Temperature-increasing conditions: 50° C. (2 min hold)-320° C. (15 min hold), 20° C./min
- Temperature of injection port: 300° C.
- Injected amount: 1.0 μL (split ratio: 1:10)
- Carrier gas: He
- FID/MS ratio: 1/1
- Aux temperature: 300° C.
- Scan Range: m/z 33 to 700
- Scan rate: 2.22 scan/s
- FID temperature: 300° C.
- $H_2$ flow rate: 30 mL/min
- Air flow rate: 400 mL/min
- Makeup gas: 25 mL/min
- Standard substance: 2,2-bis(4-hydroxyphenyl)propane
- Quantification of cyclic dimer: Quantified from a peak strength of 16.6 min <Fluidity (Q Value)>

The fluidity (Q value) indicates a melt flow volume ($cm^{-3}$/sec) per unit time, which was measured at 280° C. and at a load of 160 kg (wherein a melt flow volume was measured using CFT-500D type (1 mm (nozzle diameter)×10 mm (nozzle length)), manufactured by Shimadzu Corporation, and a value per unit time was then calculated at a stroke of 7.0 to 10.0 mm).

<Charpy Impact Test>

The Charpy impact strength ($kJ/m^2$) of the molded test piece was measured in accordance with JIS-K7111.

<Method for Measuring Refractive Index (Nd)>

The refractive index (nd) of a right angle piece with a thickness of 3 mm that consisted of the polycarbonate copolymer produced in the Examples was measured using an Abbe's refractometer in accordance with JIS-K-7142.

<Method for Measuring Abbe Number (vd)>

With regard to a right angle piece with a thickness of 3 mm that consisted of the polycarbonate copolymer produced in the Examples, the refractive index at 23° C. and at each of wavelengths of 486 nm, 589 nm and 656 nm was measured using an Abbe's refractometer, and further, an Abbe number was calculated using the following equation.

$$vd=(nd-1)/(nF-nc)$$

nd: Refractive index at a wavelength of 589 nm
nC: Refractive index at a wavelength of 656 nm
nF: Refractive index at a wavelength of 486 nm (Synthesis Example 1) Synthesis of Dimethyldiphenoxy Silane Dimethyldiphenoxy silane was synthesized with reference to the method described in US2012/184702.

Phenol (176.34 g; 1.87 mol) was stirred at 50° C. in an $N_2$ atmosphere, and dimethyldichlorosilane (113.24 g; 0.88 mol) was added dropwise thereto over 30 min. One hour after completion of the dropwise addition, by-products were distilled away at 170° C. under a reduced pressure of 200 hPa. The reaction solution was cooled to room temperature, and a product was dissolved in 300 mL of dichloromethane. The product dissolved in dichloromethane was washed twice with 300 mL of a 10% NaOH solution, and an organic layer was then extracted. The organic layer was washed twice with 300 mL of water, and after completion of the washing, the organic layer was extracted. The residual water was removed with anhydrous magnesium sulfate, and dichloromethane was then distilled away using an evaporator to obtain an oily component.

The obtained oily component was analyzed by 1H-NMR, and as a result, the oily component was confirmed to be dimethyldiphenoxy silane (1H-NMR (CDCl3, 500 MHz, δ; ppm)=0.378 (s; 6H), 6.942, 6.944 (d; 4H), 6.959, 6.961, 6.995 (t; 2H), 7.230, 7.245, 7.257 (t; 4H)). The molar yield was found to be 66%.

Example A-1

2,2-Bis(4-hydroxyphenyl)propane (104.97 g; 0.46 mol), dimethyldiphenoxy silane (4.58 g; 0.02 mol), diphenyl carbonate (101.46 g; 0.47 mol), and 2.0 μmol/mol cesium carbonate used as a catalyst (wherein the amount of the catalyst indicates a relative number of moles to the 2,2-bis (4-hydroxyphenyl)propane) were added into a 300-ml four-neck flask equipped with a stirrer, and the inside of the reaction system was then substituted in a nitrogen atmosphere. The raw materials were melted by heating at 190° C., and were stirred for 20 minutes.

Thereafter, a transesterification reaction was carried out over 1 hour 20 minutes, while phenol distilled from the reaction system was condensed in a cooling tube and was removed. The inside of the system was set at 260° C. and a degree of pressure reduction was set at 2 hPa or less, and the reaction mixture was further retained for 1 hour and 30 minutes, so as to obtain a polycarbonate copolymer having a colorless and transparent arylene siloxane structure. Besides, upon the pressure reduction, the pressure was adjusted such that the atmospheric pressure was gradually changed to 27,000 Pa, 24,000 Pa, 20,000 Pa, 17,000 Pa, 14,000 Pa, 10,000 Pa, 8,000 Pa, 6,000 Pa, 4,000 Pa, 2,000 Pa, 1,000 Pa, and 200 Pa or less.

The Mw of the siloxane-containing polycarbonate copolymer was measured using GPC, and as a result, it was 44,373.

The Tg of the above-described copolymer was measured using DSC, and as a result, it was 136° C. The weight loss of the above-described copolymer was measured using TG-DTA, and as a result, the temperature necessary for a weight loss of 1% was 411° C.

Example A-2

2,2-Bis(4-hydroxyphenyl)propane (72.85 g; 0.32 mol), dimethyldiphenoxy silane (7.9 g; 0.032 mol), diphenyl carbonate (65.86 g; 0.31 mol), and 0.6 μmol/mol cesium carbonate used as a catalyst (wherein the amount of the catalyst indicates a relative number of moles to the 2,2-bis (4-hydroxyphenyl)propane) were added into a 300-ml four-neck flask equipped with a stirrer, and the inside of the reaction system was then substituted in a nitrogen atmosphere. The raw materials were melted by heating at 180° C., and were stirred for 30 minutes.

Thereafter, a transesterification reaction was carried out over 1.5 hours, while phenol distilled from the reaction system was condensed in a cooling tube and was removed. The inside of the system was set at 260° C. and a degree of pressure reduction was set at 4 hPa or less, and the reaction mixture was further retained for 1.5 hours, so as to obtain a polycarbonate copolymer having a colorless and transparent arylene siloxane structure. Besides, upon the pressure reduction, the pressure was adjusted such that the atmospheric pressure was gradually changed to 27,000 Pa, 24,000 Pa, 20,000 Pa, 16,000 Pa, 8,000 Pa, 4,000 Pa, 2,000 Pa, 400 Pa, and 400 Pa or less.

The Mw of the siloxane-containing polycarbonate copolymer was measured using GPC, and as a result, it was 48,035.

The Tg of the above-described copolymer was measured using DSC, and as a result, it was 129° C.

The Q value of the above-described copolymer was measured, and as a result, it was 75 ($\times 10^{-2}$ cm$^3$/sec).

Example A-3

2,2-Bis(4-hydroxyphenyl)propane (21.69 g; 0.10 mol), dimethyldiphenoxy silane (9.52 g; 0.39 mol), diphenyl carbonate (13.5 g; 0.63 mol), and 7.0 μmol/mol cesium carbonate used as a catalyst (wherein the amount of the catalyst indicates a relative number of moles to the 2,2-bis(4-hydroxyphenyl)propane) were added into a 100-ml four-neck flask equipped with a stirrer, and the inside of the reaction system was then substituted in a nitrogen atmosphere. The raw materials were melted by heating at 180° C., and were stirred for 30 minutes.

Thereafter, a transesterification reaction was carried out over 1 hour, while phenol distilled from the reaction system was condensed in a cooling tube and was removed. The inside of the system was set at 260° C. and a degree of pressure reduction was set at 4 hPa or less, and the reaction mixture was further retained for 2 hours, so as to obtain a polycarbonate copolymer having a colorless and transparent arylene siloxane structure. Besides, upon the pressure reduction, the pressure was adjusted such that the atmospheric pressure was gradually changed to 27,000 Pa, 24,000 Pa, 20,000 Pa, 16,000 Pa, 8,000 Pa, 4,000 Pa, 2,000 Pa, 400 Pa, and 400 Pa or less.

The Mw of the siloxane-containing polycarbonate copolymer was measured using GPC, and as a result, it was 54,007.

The Tg of the above-described copolymer was measured using DSC, and as a result, it was 101° C.

The Q value of the above-described copolymer was measured, and as a result, it was 114 ($\times 10^{-2}$ cm$^3$/sec).

Example A-4

2,2-Bis(4-hydroxyphenyl)propane (30.69 g; 0.13 mol), dimethyldiphenoxy silane (25.46 g; 0.10 mol), diphenyl carbonate (9.96 g; 0.046 mol), and 7.0 μmol/mol cesium carbonate used as a catalyst (wherein the amount of the catalyst indicates a relative number of moles to the 2,2-bis (4-hydroxyphenyl)propane) were added into a 100-ml four-neck flask equipped with a stirrer, and the inside of the reaction system was then substituted in a nitrogen atmosphere. The raw materials were melted by heating at 180° C., and were stirred for 30 minutes.

Thereafter, a transesterification reaction was carried out over 1 hour, while phenol distilled from the reaction system was condensed in a cooling tube and was removed. The inside of the system was set at 260° C. and a degree of pressure reduction was set at 4 hPa or less, and the reaction mixture was further retained for 2 hours, so as to obtain a polycarbonate copolymer having a colorless and transparent arylene siloxane structure. Besides, upon the pressure reduction, the pressure was adjusted such that the atmospheric pressure was gradually changed to 27,000 Pa, 24,000 Pa, 20,000 Pa, 16,000 Pa, 8,000 Pa, 4,000 Pa, 2,000 Pa, 400 Pa, and 400 Pa or less.

The Mw of the siloxane-containing polycarbonate copolymer was measured using GPC, and as a result, it was 63,068.

The Tg of the above-described copolymer was measured using DSC, and as a result, it was 75° C.

Example A-5

2,2-Bis(4-hydroxyphenyl)propane (30.63 g; 0.13 mol), dimethyldiphenoxy silane (31.05 g; 0.13 mol), diphenyl carbonate (5.04 g; 0.024 mol), and 7.0 μmol/mol cesium carbonate used as a catalyst (wherein the amount of the catalyst indicates a relative number of moles to the 2,2-bis (4-hydroxyphenyl)propane) were added into a 100-ml four-neck flask equipped with a stirrer, and the inside of the reaction system was then substituted in a nitrogen atmosphere. The raw materials were melted by heating at 180° C., and were stirred for 30 minutes.

Thereafter, a transesterification reaction was carried out over 1 hour, while phenol distilled from the reaction system was condensed in a cooling tube and was removed. The inside of the system was set at 260° C. and a degree of pressure reduction was set at 4 hPa or less, and the reaction mixture was further retained for 2 hours, so as to obtain a polycarbonate copolymer having a colorless and transparent arylene siloxane structure. Besides, upon the pressure reduction, the pressure was adjusted such that the atmospheric pressure was gradually changed to 27,000 Pa, 24,000 Pa, 20,000 Pa, 16,000 Pa, 8,000 Pa, 4,000 Pa, 2,000 Pa, 400 Pa, and 400 Pa or less.

The Mw of the siloxane-containing polycarbonate copolymer was measured using GPC, and as a result, it was 49,161.

The Tg of the above-described copolymer was measured using DSC, and as a result, it was 62° C.

Examples A-6 to A-14

Copolymers were produced in the same manner as that of Example A-1, with the exception that the compounds used as raw materials were changed as shown in the following Table 1. The properties of the obtained copolymers are shown in Table 1.

TABLE 1

| | | | Ex. 1 | Ex. 2 | Ex. 3 | Ex. 4 | Ex. 5 | Ex. 6 | Ex. 7 |
|---|---|---|---|---|---|---|---|---|---|
| Raw materials/ catalysts | Aromatic diol compound (BPA: 2,2-Bis(4-hydroxyphenyl)propane) | g<br>mol<br>(molar amount) | 104.97<br>0.46 | 72.85<br>0.32 | 21.69<br>0.10 | 30.69<br>0.13 | 30.63<br>0.13 | 80.14<br>0.35 | 80.11<br>0.35 |
| | Diol compound (BPEF: 9,9-Bis[4-(2-hydroxyethoxy)phenyl]fluorene) | g<br>mol<br>(molar amount) | 0<br>0 | 0<br>0 | 0<br>0 | 0<br>0 | 0<br>0 | 0<br>0 | 0<br>0 |
| | Diol compound (BCF: 9,9-Bis(4-hydroxy-3-methylphenyl)fluorene) | g<br>mol<br>(molar amount) | 0<br>0 | 0<br>0 | 0<br>0 | 0<br>0 | 0<br>0 | 0<br>0 | 0<br>0 |
| | Diol compound (BPF: 9,9-Bis(4-hydroxyphenyl)fluorene) | g<br>mol<br>(molar amount) | 0<br>0 | 0<br>0 | 0<br>0 | 0<br>0 | 0<br>0 | 0<br>0 | 0<br>0 |
| | Diol compound (ISB: Isosorbide) | g<br>mol<br>(molar amount) | 0<br>0 | 0<br>0 | 0<br>0 | 0<br>0 | 0<br>0 | 0<br>0 | 0<br>0 |
| | Diol compound (SPG: Spiroglycol) | g<br>mol<br>(molar amount) | 0<br>0 | 0<br>0 | 0<br>0 | 0<br>0 | 0<br>0 | 0<br>0 | 0<br>0 |
| | Aromatic diol compound (Bis(4-hydroxyphenyl)sulfone) | g<br>mol<br>(molar amount) | 0<br>0 | 0<br>0 | 0<br>0 | 0<br>0 | 0<br>0 | 0<br>0 | 0<br>0 |
| | Aromatic diol compound (Bis(4-hydroxyphenyl)sulfide) | g<br>mol<br>(molar amount) | 0<br>0 | 0<br>0 | 0<br>0 | 0<br>0 | 0<br>0 | 0<br>0 | 0<br>0 |
| | Diol compound (BNEF: 9,9-Bis[6-(2-hydroxyethoxy)naphthalen-2-yl]fluorene) | g<br>mol<br>(molar amount) | 0<br>0 | 0<br>0 | 0<br>0 | 0<br>0 | 0<br>0 | 0<br>0 | 0<br>0 |

TABLE 1-continued

| | | | | | | | | | |
|---|---|---|---|---|---|---|---|---|---|
| | Aromatic diol compound (Biphenol: 4,4'-Dihydroxy-biphenyl) | g | 0 | 0 | 0 | 0 | 0 | 0 | 0 |
| | | mol (molar amount) | 0 | 0 | 0 | 0 | 0 | 0 | 0 |
| | Aromatic diol compound (2EO-BINOL: 2,2'-Bishydroxyethoxy-1,1'-binaphthyl) | g | 0 | 0 | 0 | 0 | 0 | 0 | 0 |
| | | mol (molar amount) | 0 | 0 | 0 | 0 | 0 | 0 | 0 |
| | Diaryl carbonate (DPC: Diphenyl carbonate) | g | 101.46 | 65.86 | 13.50 | 9.96 | 5.04 | 25.96 | 25.96 |
| | | mol (molar amount) | 0.47 | 0.31 | 0.06 | 0.05 | 0.02 | 0.12 | 0.12 |
| | Diphenoxysilane compound (DMDPS: Dimethyldiphenoxysilane) | g | 4.58 | 7.90 | 9.52 | 25.46 | 31.05 | 0 | 0 |
| | | mol (molar amount) | 0.019 | 0.032 | 0.039 | 0.10 | 0.13 | 0 | 0 |
| | Diphenoxysilane compound (DPDPS: Diphenyldiphenoxysilane) | g | 0 | 0 | 0 | 0 | 0 | 96.94 | 96.94 |
| | | mol (molar amount) | 0 | 0 | 0 | 0 | 0 | 0.26 | 0.26 |
| | Diphenoxysilane compound (DPDMS: Diphenyldimethoxysilane) | g | 0 | 0 | 0 | 0 | 0 | 0 | 0 |
| | | mol (molar amount) | 0 | 0 | 0 | 0 | 0 | 0 | 0 |
| | Molar ratio ((Diphenoxysilane compound + DPC)/BPA) | mol/mol | 1.07 | 1.06 | 1.07 | 1.12 | 1.12 | 1.09 | 1.09 |
| | Catalyst ($Cs_2CO_3$, except for those clearly described) | μmol/mol (Number of moles (μmol) per mol of aromatic diol compound) | 2 | 0.6 | 11 | 11 | 11 | 3 | 15 |
| Reaction conditions | Final reaction temperature | (° C.) | 260 | 260 | 260 | 260 | 260 | 260 | 260 |
| Poly-carbonate copolymer (product) | Weight average molecular weight Mw | (g/mol) | 44373 | 48035 | 54,007 | 49,161 | 63,068 | 15,403 | 18,211 |
| | Percentage of polymer molecules with weight average molecular weight of 1,000 or less | (mass %) | 0.03 | 0.03 | 0.1 | 0.6 | 0.9 | 2.1 | 1.4 |
| | Siloxane constituent unit (Si-containing constituent unit) | (mol %) | 2.92 | 8.17 | 35.07 | 66.49 | 81.47 | 68.35 | 48.36 |
| | Polycarbonate constituent unit (PC-containing constituent unit) | (mol %) | 97.08 | 91.83 | 64.93 | 33.51 | 18.53 | 31.65 | 51.64 |
| | Si mass % | (mass %) | 0.32 | 0.89 | 3.7 | 6.8 | 8.2 | 5.3 | 4.1 |
| | Q value (280° C./160 kgf) | ($\times 10^{-2}$ $cm^3$/sec) | 61 | 75 | 114 | — | — | >121 | >121 |
| | Glass transition temperature (Tg) | (° C.) | 136 | 129 | 101 | 75 | 62 | 85 | 91 |
| | Temperature for weight loss of 1% (DSC) | (° C.) | 411 | 401 | 380 | 365 | 363 | 372 | 334 |
| | Refractive index (nd) | — | 1.583 | 1.582 | 1.581 | 1.579 | 1.578 | 1.615 | 1.612 |
| | Abbe number (vd) | — | 30.0 | 30.0 | 29.6 | 29.2 | 29.0 | 27.0 | 27.7 |

| | | | Ex. 8 | Ex. 9 | Ex. 10 | Ex. 11 | Ex. 12 | Ex. 13 | Ex. 14 |
|---|---|---|---|---|---|---|---|---|---|
| Raw materials/ catalysts | Aromatic diol compound (BPA: 2,2-Bis(4-hydroxyphenyl)propane) | g | 80.11 | 80.12 | 80.13 | 80.11 | 80.13 | 80.13 | 80.13 |
| | | mol (molar amount) | 0.35 | 0.35 | 0.35 | 0.35 | 0.35 | 0.35 | 0.35 |
| | Diol compound (BPEF: 9,9-Bis[4-(2-hydroxyethoxy)phenyl]fluorene) | g | 0 | 0 | 0 | 0 | 0 | 0 | 0 |
| | | mol (molar amount) | 0 | 0 | 0 | 0 | 0 | 0 | 0 |
| | Diol compound (BCF: 9,9-Bis(4-hydroxy-3-methylphenyl)fluorene) | g | 0 | 0 | 0 | 0 | 0 | 0 | 0 |
| | | mol (molar amount) | 0 | 0 | 0 | 0 | 0 | 0 | 0 |
| | Diol compound (BPF: 9,9-Bis(4-hydroxyphenyl)fluorene) | g | 0 | 0 | 0 | 0 | 0 | 0 | 0 |
| | | mol (molar amount) | 0 | 0 | 0 | 0 | 0 | 0 | 0 |
| | Diol compound (ISB: Isosorbide) | g | 0 | 0 | 0 | 0 | 0 | 0 | 0 |
| | | mol (molar amount) | 0 | 0 | 0 | 0 | 0 | 0 | 0 |
| | Diol compound (SPG: Spiroglycol) | g | 0 | 0 | 0 | 0 | 0 | 0 | 0 |
| | | mol (molar amount) | 0 | 0 | 0 | 0 | 0 | 0 | 0 |
| | Aromatic diol compound (Bis(4-hydroxyphenyl)sulfone) | g | 0 | 0 | 0 | 0 | 0 | 0 | 0 |
| | | mol (molar amount) | 0 | 0 | 0 | 0 | 0 | 0 | 0 |
| | Aromatic diol compound (Bis(4-hydroxyphenyl)sulfide) | g | 0 | 0 | 0 | 0 | 0 | 0 | 0 |
| | | mol (molar amount) | 0 | 0 | 0 | 0 | 0 | 0 | 0 |
| | Diol compound (BNEF: 9,9-Bis[6-(2-hydroxyethoxy)naphthalen-2-yl]fluorene) | g | 0 | 0 | 0 | 0 | 0 | 0 | 0 |
| | | mol (molar amount) | 0 | 0 | 0 | 0 | 0 | 0 | 0 |
| | Aromatic diol compound (Biphenol: 4,4'-Dihydroxy-biphenyl) | g | 0 | 0 | 0 | 0 | 0 | 0 | 0 |
| | | mol (molar amount) | 0 | 0 | 0 | 0 | 0 | 0 | 0 |

TABLE 1-continued

| | | | | | | | | | |
|---|---|---|---|---|---|---|---|---|---|
| | Aromatic diol compound (2EO-BINOL: 2,2'-Bishydroxyethoxy-1,1'-binaphthyl) | g<br>mol<br>(molar amount) | 0<br>0 | 0<br>0 | 0<br>0 | 0<br>0 | 0<br>0 | 0<br>0 | 0<br>0 |
| | Diaryl carbonate (DPC: Diphenyl carbonate) | g<br>mol<br>(molar amount) | 25.96<br>0.12 | 25.98<br>0.12 | 25.98<br>0.12 | 25.99<br>0.12 | 25.94<br>0.12 | 25.97<br>0.12 | 25.98<br>0.12 |
| | Diphenoxysilane compound (DMDPS: Dimethyldiphenoxysilane) | g<br>mol<br>(molar amount) | 0<br>0 | 0<br>0 | 64.29<br>0.26 | 64.30<br>0.26 | 64.33<br>0.26 | 64.36<br>0.26 | 64.30<br>0.26 |
| | Diphenoxysilane compound (DPDPS: Diphenyldiphenoxysilane) | g<br>mol<br>(molar amount) | 0<br>0 | 0<br>0 | 0<br>0 | 0<br>0 | 0<br>0 | 0<br>0 | 0<br>0 |
| | Diphenoxysilane compound (DPDMS: Diphenyldimethoxysilane) | g<br>mol<br>(molar amount) | 64.31<br>0.26 | 64.31<br>0.26 | 0<br>0 | 0<br>0 | 0<br>0 | 0<br>0 | 0<br>0 |
| | Molar ratio ((Diphenoxysilane compound + DPC)/BPA) | mol/mol | 1.09 | 1.09 | 1.09 | 1.09 | 1.09 | 1.09 | 1.09 |
| | Catalyst ($Cs_2Co_3$, except for those clearly described) | μmol/mol (Number of moles (μmol) per mol of aromatic diol compound) | 3 | 15 | 3 | 3<br>($Na_2CO_3$) | 3<br>($K_2CO_3$) | 340<br>($Bu_2(OAc)_2Sn$) | 6<br>($NaHCO_3$) |
| Reaction conditions | Final reaction temperature | (° C.) | 260 | 260 | 260 | 260 | 260 | 260 | 260 |
| Poly-carbonate copolymer (product) | Weight average molecular weight Mw | (g/mol) | 2,529 | 4,467 | 51,906 | 33,177 | 32,810 | 3,775 | 29,669 |
| | Percentage of polymer molecules with weight average molecular weight of 1,000 or less | (mass %) | 25.9 | 11.4 | 0.5 | 0.5 | 0.5 | 22.6 | 2.7 |
| | Siloxane constituent unit (Si-containing constituent unit) | (mol %) | 14.06 | 38.14 | 64.58 | 61.81 | 61.36 | 35.63 | 64.32 |
| | Polycarbonate constituent unit (PC-containing constituent unit) | (mol %) | 85.94 | 61.86 | 35.42 | 38.19 | 38.64 | 64.37 | 35.68 |
| | Si mass % | (mass %) | 1.4 | 3.4 | 6.6 | 6.4 | 6.3 | 3.8 | 6.6 |
| | Q value (280° C./160 kgf) | ($\times 10^{-2}$ cm$^3$/sec) | >121 | >121 | 109 | 118 | 121 | >121 | 119 |
| | Glass transition temperature (Tg) | (° C.) | 60 | 74 | 76 | 75 | 75 | 56 | 76 |
| | Temperature for weight loss of 1% (DSC) | (° C.) | 221 | 256 | 332 | 330 | 330 | 235 | 336 |
| | Refractive index (nd) | — | — | 1.615 | 1.616 | 1.578 | 1.578 | 1.578 | 1.579 | 1.578 |
| | Abbe number (vd) | — | — | 26.8 | 26.8 | 30.6 | 30.6 | 30.6 | 30.6 | 30.6 |

Example A-15

2,2-Bis(4-hydroxyphenyl)propane (2310 g; 10.13 mol), dimethyldiphenoxy silane (1849.26 g; 7.58 mol), diphenyl carbonate (753.04 g; 3.52 mol), and 14.0 μmol/mol cesium carbonate used a catalyst (wherein the amount of the catalyst indicates a relative number of moles to the 2,2-bis(4-hydroxyphenyl)propane) were added into a 10 L reactor equipped with a stirrer, and the inside of the reaction system was then substituted in a nitrogen atmosphere. The raw materials were melted by heating at 180° C., and were stirred for 40 minutes.

Thereafter, a transesterification reaction was carried out over 1 hour and 30 minutes, while phenol distilled from the reaction system was condensed in a cooling tube and was removed. The inside of the system was set at 260° C. and a degree of pressure reduction was set at 1 hPa or less, and the reaction mixture was further retained for 1 hour 15 minutes, so as to obtain a polycarbonate copolymer having a colorless and transparent arylene siloxane structure. Besides, upon the pressure reduction, the pressure was adjusted such that the atmospheric pressure was gradually changed to 27,000 Pa, 24,000 Pa, 20,000 Pa, 17,000 Pa, 14,000 Pa, 12,000 Pa, 8,000 Pa, 4,000 Pa, and 100 Pa or less.

The Mw of the siloxane-containing polycarbonate copolymer was measured using GPC, and as a result, it was 208,939.

The Tg of the above-described copolymer was measured using DSC, and as a result, it was 74.2° C. The weight loss of the above-described copolymer was measured using TG-DTA, and as a result, the temperature necessary for a weight loss of 1% was 337.1° C.

Example A-16

2,2-Bis(4-hydroxyphenyl)propane (2497 g; 10.95 mol), dimethyldiphenoxy silane (1997.20 g; 8.19 mol), diphenyl carbonate (813.00 g; 3.80 mol), and 3.0 μmol/mol cesium carbonate used as a catalyst (wherein the amount of the catalyst indicates a relative number of moles to the 2,2-bis (4-hydroxyphenyl)propane) were added into a 10 L reactor equipped with a stirrer, and the inside of the reaction system was then substituted in a nitrogen atmosphere. The raw materials were melted by heating at 180° C., and were stirred for 45 minutes.

Thereafter, a transesterification reaction was carried out over 2 hours 30 minutes, while phenol distilled from the reaction system was condensed in a cooling tube and was removed. The inside of the system was set at 260° C. and a degree of pressure reduction was set at 1 hPa or less, and the reaction mixture was further retained for 1 hour and 30 minutes, so as to obtain a polycarbonate copolymer having a colorless and transparent arylene siloxane structure. Besides, upon the pressure reduction, the pressure was adjusted such that the atmospheric pressure was gradually changed to 27,000 Pa, 24,000 Pa, 20,000 Pa, 17,000 Pa, 14,000 Pa, 10,000 Pa, 6,000 Pa, 4,000 Pa, and 100 Pa or less.

The Mw of the siloxane-containing polycarbonate copolymer was measured using GPC, and as a result, it was 81,885.

The Tg of the above-described copolymer was measured using DSC, and as a result, it was 75.1° C. The weight loss of the above-described copolymer was measured using TG-DTA, and as a result, the temperature necessary for a weight loss of 1% was 380.6° C.

The amount of a low molecular weight contained in the above-described copolymer was quantified using GC. As a result, the copolymer comprised 415 ppm PhOH, 475 ppm BPA, 122 ppm DMDPS, and 44 ppm DPC.

Reference Example

According to the above-mentioned method for measuring a cyclic dimer, 19.99 g of the copolymer obtained in Example A-16 was dissolved in 121.22 g of dichloromethane, and 196 g of ethanol was then added dropwise to the resin solution during stirring over 30 minutes. Thereafter, a precipitate was filtrated through a NoA5 filter, and a filtrate was then concentrated using an evaporator to obtain 0.652 g of an oligomer component A. The precipitate was dissolved in dichloromethane again, and while ethanol was added dropwise thereto, an operation of separating the precipitate from the oligomer component was repeated twice (by which 0.268 g of an oligomer component B, 0.177 g of an oligomer component C, and 18.99 g of a copolymer reprecipitate, namely, a precipitate were obtained). The obtained oligomer components A, B and C were dissolved in dichloromethane to obtain a 1000 μg/mL solution. The obtained solution was analyzed by GC-Q-MS/FID, and as a result, the amount of a cyclic dimer in the copolymer as a reprecipitate product was 0.71 wt %.

Moreover, the Q value of the siloxane-containing polycarbonate copolymer obtained in Example A-16 was 117 (×10$^{-2}$ cm$^3$/sec), and the Q value of the reprecipitate product of the siloxane-containing polycarbonate copolymer obtained in the reference example was 74 (×10$^{-2}$ cm$^3$/sec). It is found that the O value of the siloxane-containing polycarbonate copolymer is increased by allowing the polycarbonate copolymer to comprise a cyclic dimer, and that the fluidity of the polycarbonate copolymer is high.

TABLE 2

|  |  | Unit | Ex. 16 Copolymer | Reference Ex. Reprecipitate of copolymer |
|---|---|---|---|---|
| Content of cyclic dimer | GPC | % | 0.8 | 0.07 |
|  | GC | % | 0.71 | — |
| Q value |  | 0.01 ml/sec | 117 | 74 |
| Fluidity |  | — | Good | Slightly poor |

Example A-17

9,9-Bis[4-(2-hydroxyethoxy)phenyl]fluorene (30.99 g; 0.07 mol), diphenyldimethoxy silane (13.01 g; 0.05 mol), diphenyl carbonate (5.28 g; 0.02 mol), and 15.0 μmol/mol cesium carbonate used as a catalyst (wherein the amount of the catalyst indicates a relative number of moles to the 9,9-bis[4-(2-hydroxyethoxy)phenyl]fluorene) were added into a 100-ml four-neck flask equipped with a stirrer, and the inside of the reaction system was then substituted in a nitrogen atmosphere. The raw materials were melted by heating at 190° C., and were stirred for 30 minutes.

Thereafter, a transesterification reaction was carried out over 1 hour 10 minutes, while phenol and methanol distilled from the reaction system were condensed in a cooling tube and were removed. The inside of the system was set at 260° C. and a degree of pressure reduction was set at 2 hPa or less, and the reaction mixture was further retained for 15 minutes, so as to obtain a polycarbonate copolymer having a colorless and transparent arylene siloxane structure. Besides, upon the pressure reduction, the pressure was adjusted such that the atmospheric pressure was gradually changed to 60,000 Pa, 40,000 Pa, 20,000 Pa, 10,000 Pa, 8,000 Pa, 6,000 Pa, 4,000 Pa, 2,000 Pa, 1,000 Pa, and 200 Pa or less.

The Mw of the siloxane-containing polycarbonate copolymer was measured using GPC, and as a result, it was 115,683.

The Tg of the above-described copolymer was measured using DSC, and as a result, it was 110.9° C. The weight loss of the above-described copolymer was measured using TG-DTA, and as a result, the temperature necessary for a weight loss of 1% was 351.4° C.

Example A-18

9,9-Bis(4-hydroxyphenyl)fluorene (24.71 g; 0.071 mol), diphenyldimethoxy silane (18.00 g; 0.074 mol), diphenyl carbonate (0.831 g; 0.004 mol), and 15.0 μmol/mol cesium carbonate used as a catalyst (wherein the amount of the catalyst indicates a relative number of moles to the 9,9-bis (4-hydroxyphenyl)fluorene) were added into a 100-ml four-neck flask equipped with a stirrer, and the inside of the reaction system was then substituted in a nitrogen atmosphere. The raw materials were melted by heating at 190° C., and were stirred for 15 minutes.

Thereafter, a transesterification reaction was carried out over 1 hour 20 minutes, while phenol and methanol distilled from the reaction system were condensed in a cooling tube and were removed. The inside of the system was set at 260° C. and a degree of pressure reduction was set at 2 hPa or less, and the reaction mixture was further retained for 1 hour and 30 minutes, so as to obtain a polycarbonate copolymer having a yellowed transparent arylene siloxane structure. Besides, upon the pressure reduction, the pressure was adjusted such that the atmospheric pressure was gradually changed to 80,000 Pa, 60,000 Pa, 40,000 Pa, 20,000 Pa, 10,000 Pa, 8,000 Pa, 6,000 Pa, 4,000 Pa, 2,000 Pa, and 200 Pa or less.

The Mw of the siloxane-containing polycarbonate copolymer was measured using GPC, and as a result, it was 12,992.

The Tg of the above-described copolymer was measured using DSC, and as a result, it was 165.5° C. The weight loss of the above-described copolymer was measured using TG-DTA, and as a result, the temperature necessary for a weight loss of 1% was 361.1° C.

Example A-19

9,9-Bis[4-(2-hydroxyethoxy)phenyl]fluorene (17.07 g; 0.04 mol), 9,9-bis(4-hydroxy-3-methylphenyl)fluorene (12.06 g; 0.03 mol), diphenyldimethoxy silane (12.99 g; 0.05 mol), diphenyl carbonate (5.26 g; 0.02 mol), and 15.0 μmol/mol cesium carbonate used as a catalyst (wherein the amount of the catalyst indicates a relative number of moles to the sum of the number of moles of the 9,9-bis[4-(2-hydroxyethoxy)phenyl]fluorene and the 9,9-bis(4-hydroxy-3-methylphenyl)fluorene) were added into a 100-ml four-neck flask equipped with a stirrer, and the inside of the reaction system was then substituted in a nitrogen atmosphere. The raw materials were melted by heating at 200° C., and were stirred for 30 minutes.

Thereafter, a transesterification reaction was carried out over 1 hour 20 minutes, while phenol and methanol distilled from the reaction system were condensed in a cooling tube and were removed. The inside of the system was set at 260° C. and a degree of pressure reduction was set at 2 hPa or less, and the reaction mixture was further retained for 1 hour 20 minutes, so as to obtain a polycarbonate copolymer having a browned transparent arylene siloxane structure. Besides, upon the pressure reduction, the pressure was adjusted such that the atmospheric pressure was gradually changed to 80,000 Pa, 60,000 Pa, 40,000 Pa, 20,000 Pa, 10,000 Pa, 8,000 Pa, 6,000 Pa, 4,000 Pa, 2,000 Pa, 1,000 Pa, and 200 Pa or less.

The Mw of the siloxane-containing polycarbonate copolymer was measured using GPC, and as a result, it was 23,272.

The Tg of the above-described copolymer was measured using DSC, and as a result, it was 140.4° C. The weight loss of the above-described copolymer was measured using TG-DTA, and as a result, the temperature necessary for a weight loss of 1% was 349.4° C.

Example A-20

9,9-Bis(4-hydroxyphenyl)fluorene (24.71 g; 0.071 mol), dimethyldiphenoxy silane (1.80 g; 0.007 mol), diphenyldimethoxy silane (16.21 g; 0.066 mol), diphenyl carbonate (0.83 g; 0.004 mol), and 15.0 μMol/mol cesium carbonate used as a catalyst (wherein the amount of the catalyst indicates a relative number of moles to the 9,9-bis(4-hydroxyphenyl)fluorene) were added into a 100-ml four-neck flask equipped with a stirrer, and the inside of the reaction system was then substituted in a nitrogen atmosphere. The raw materials were melted by heating at 210° C., and were stirred for 25 minutes.

Thereafter, a transesterification reaction was carried out over 1 hour 25 minutes, while phenol and methanol distilled from the reaction system were condensed in a cooling tube and were removed. The inside of the system was set at 260° C. and a degree of pressure reduction was set at 2 hPa or less, and the reaction mixture was further retained for 1 hour, so as to obtain a polycarbonate copolymer having a yellowed transparent arylene siloxane structure. Besides, upon the pressure reduction, the pressure was adjusted such that the atmospheric pressure was gradually changed to 80,000 Pa, 60,000 Pa, 40,000 Pa, 20,000 Pa, 10,000 Pa, 8,000 Pa, 6,000 Pa, 4,000 Pa, 2,000 Pa, and 200 Pa or less.

The Mw of the siloxane-containing polycarbonate copolymer was measured using GPC, and as a result, it was 28,050.

The Tg of the above-described copolymer was measured using DSC, and as a result, it was 171.4° C. The weight loss of the above-described copolymer was measured using TG-DTA, and as a result, the temperature necessary for a weight loss of 1% was 339.1° C.

Example A-21

Isosorbide (10.22 g; 0.07 mol), diphenyldimethoxy silane (17.60 g; 0.07 mol), and 15.0 μmol/mol cesium carbonate used as a catalyst (wherein the amount of the catalyst indicates a relative number of moles to the isosorbide) were added into a 100-ml four-neck flask equipped with a stirrer, and the inside of the reaction system was then substituted in a nitrogen atmosphere. The raw materials were melted by heating at 100° C., and were stirred for 10 minutes.

Thereafter, a transesterification reaction was carried out over 1 hour 55 minutes, while methanol distilled from the reaction system was condensed in a cooling tube and was removed. The inside of the system was set at 200° C. and a degree of pressure reduction was set at 2 hPa or less, and the reaction mixture was further retained for 1 hour and 30 minutes, so as to obtain a yellowed transparent arylene siloxane. Besides, upon the pressure reduction, the pressure was adjusted such that the atmospheric pressure was gradually changed to 90,000 Pa, 80,000 Pa, 70,000 Pa, 60,000 Pa, 50,000 Pa, 30,000 Pa, 10,000 Pa, 6,000 Pa, 2,000 Pa, and 200 Pa or less.

The Mw of the arylene siloxane was measured using GPC, and as a result, it was 9,125.

The Tg of the above-described copolymer was measured using DSC, and as a result, it was 71.1° C. The weight loss of the above-described arylene siloxane was measured using TG-DTA, and as a result, the temperature necessary for a weight loss of 1% was 256.2° C.

Example A-22

Bis(4-hydroxyphenyl)sulfone (17.50 g; 0.07 mol), diphenyldimethoxy silane (17.42 g; 0.07 mol), and 30.0 μmol/mol cesium carbonate used as a catalyst (wherein the amount of the catalyst indicates a relative number of moles to the bis(4-hydroxyphenyl)sulfone) were added into a 100-ml four-neck flask equipped with a stirrer, and the inside of the reaction system was then substituted in a nitrogen atmosphere. The raw materials were melted by heating at 220° C., and were stirred for 25 minutes.

Thereafter, a transesterification reaction was carried out over 1 hour 15 minutes, while methanol distilled from the reaction system was condensed in a cooling tube and was removed. The inside of the system was set at 260° C. and a degree of pressure reduction was set at 2 hPa or less, and the reaction mixture was further retained for 1 hour and 30 minutes, so as to obtain a slightly red-colored transparent arylene siloxane. Besides, upon the pressure reduction, the pressure was adjusted such that the atmospheric pressure was gradually changed to 80,000 Pa, 60,000 Pa, 40,000 Pa, 20,000 Pa, 10,000 Pa, 8,000 Pa, 6,000 Pa, 4,000 Pa, 2,000 Pa, 1,000 Pa, and 200 Pa or less.

The Mw of the arylene siloxane was measured using GPC, and as a result, it was 12,806.

The Tg of the above-described arylene siloxane was measured using DSC, and as a result, it was 123.6° C. The weight loss of the above-described arylene siloxane was measured using TG-DTA, and as a result, the temperature necessary for a weight loss of 1% was 384.7° C.

Example A-23

9,9-Bis[4-(2-hydroxyethoxy)phenyl]fluorene (31.00 g; 0.07 mol), diphenyldimethoxy silane (18.98 g; 0.08 mol), and 15.0 μmol/mol cesium carbonate used as a catalyst (wherein the amount of the catalyst indicates a relative number of moles to the 9,9-bis[4-(2-hydroxyethoxy)phenyl] fluorene) were added into a 100-ml four-neck flask equipped with a stirrer, and the inside of the reaction system was then substituted in a nitrogen atmosphere. The raw materials were melted by heating at 190° C., and were stirred for 30 minutes.

Thereafter, a transesterification reaction was carried out over 1 hour 10 minutes, while methanol distilled from the reaction system was condensed in a cooling tube and was removed. The inside of the system was set at 260° C. and a degree of pressure reduction was set at 2 hPa or less, and the reaction mixture was further retained for 1 hour and 30 minutes, so as to obtain a colorless and transparent arylene siloxane. Besides, upon the pressure reduction, the pressure was adjusted such that the atmospheric pressure was gradually changed to 60,000 Pa, 40,000 Pa, 20,000 Pa, 10,000 Pa, 8,000 Pa, 6,000 Pa, 4,000 Pa, 3,000 Pa, 2,000 Pa, 1,000 Pa, and 200 Pa or less.

The Mw of the arylene siloxane was measured using GPC, and as a result, it was 46,225.

The Tg of the above-described arylene siloxane was measured using DSC, and as a result, it was 97.4° C. The weight loss of the above-described arylene siloxane was measured using TG-DTA, and as a result, the temperature necessary for a weight loss of 1% was 350.6° C.

Example A-24

9,9-Bis(4-hydroxyphenyl)fluorene (24.71 g, 0.07 mol), diphenyldimethoxy silane (18.95 g; 0.08 mol), and 15.0 µmol/mol cesium carbonate used as a catalyst (wherein the amount of the catalyst indicates a relative number of moles to the 9,9-bis(4-hydroxyphenyl)fluorene) were added into a 100-ml four-neck flask equipped with a stirrer, and the inside of the reaction system was then substituted in a nitrogen atmosphere. The raw materials were melted by heating at 190° C., and were stirred for 15 minutes.

Thereafter, a transesterification reaction was carried out over 1 hour and 30 minutes, while methanol distilled from the reaction system was condensed in a cooling tube and was removed. The inside of the system was set at 260° C. and a degree of pressure reduction was set at 2 hPa or less, and the reaction mixture was further retained for 1 hour and 30 minutes, so as to obtain a yellowed transparent arylene siloxane. Besides, upon the pressure reduction, the pressure was adjusted such that the atmospheric pressure was gradually changed to 80,000 Pa, 60,000 Pa, 40,000 Pa, 20,000 Pa, 10,000 Pa, 8,000 Pa, 6,000 Pa, 4,000 Pa, 3,000 Pa, 2,000 Pa, and 200 Pa or less.

The Mw of the arylene siloxane was measured using GPC, and as a result, it was 27,028.

The Tg of the above-described arylene siloxane was measured using DSC, and as a result, it was 169.7° C. The weight loss of the above-described arylene siloxane was measured using TG-DTA, and as a result, the temperature necessary for a weight loss of 1% was 364.8° C.

Example A-25

Bis(4-hydroxyphenyl)sulfide (15.26 g; 0.07 mol), diphenyldimethoxy silane (17.42 g; 0.07 mol), and 30.0 µmol/mol cesium carbonate used as a catalyst (wherein the amount of the catalyst indicates a relative number of moles to the bis(4-hydroxyphenyl)sulfide) were added into a 100-ml four-neck flask equipped with a stirrer, and the inside of the reaction system was then substituted in a nitrogen atmosphere. The raw materials were melted by heating at 190° C., and were stirred for 15 minutes.

Thereafter, a transesterification reaction was carried out over 2 hours 15 minutes, while methanol distilled from the reaction system was condensed in a cooling tube and was removed. The inside of the system was set at 260° C. and a degree of pressure reduction was set at 2 hPa or less, and the reaction mixture was further retained for 1 hour 20 minutes, so as to obtain a colorless and transparent arylene siloxane. Besides, upon the pressure reduction, the pressure was adjusted such that the atmospheric pressure was gradually changed to 90,000 Pa, 80,000 Pa, 70,000 Pa, 60,000 Pa, 50,000 Pa, 40,000 Pa, 20,000 Pa, 10,000 Pa, 8,000 Pa, 6,000 Pa, 4,000 Pa, 2,000 Pa, and 200 Pa or less.

The Mw of the arylene siloxane was measured using GPC, and as a result, it was 56,797.

The Tg of the above-described arylene siloxane was measured using DSC, and as a result, it was 73.2° C. The weight loss of the above-described arylene siloxane was measured using TG-DTA, and as a result, the temperature necessary for a weight loss of 1% was 391.6° C.

The results of the aforementioned Examples A-15 to -25 and the reference example are shown in Table 3.

TABLE 3

| | | | Ex. 15 | Ex. 16 | Ex. 17 | Ex. 18 | Ex. 19 | Ex. 20 |
|---|---|---|---|---|---|---|---|---|
| Raw materials/ catalysts | Aromatic diol compound (BPA: 2,2-Bis(4-hydroxyphenyl)propane) | g mol (molar amount) | 2310.18 10.13 | 2496.50 10.95 | 0 0 | 0 0 | 0 0 | 0 0 |
| | Diol compound (BPEF: 9,9-Bis[4-(2-hydroxyethoxy)phenyl]fluorene) | g mol (molar amount) | 0 0 | 0 0 | 30.99 0.07 | 0 0 | 17.07 0.04 | 0 0 |
| | Diol compound (BCF: 9,9-Bis(4-hydroxy-3-methylphenyl)fluorene) | g mol (molar amount) | 0 0 | 0 0 | 0 0 | 0 0 | 12.06 0.03 | 0 0 |
| | Diol compound (BPF: 9,9-Bis(4-hydroxyphenyl)fluorene) | g mol (molar amount) | 0 0 | 0 0 | 0 0 | 24.71 0.07 | 0 0 | 24.71 0.07 |
| | Diol compound (ISB: Isosorbide) | g mol (molar amount) | 0 0 | 0 0 | 0 0 | 0 0 | 0 0 | 0 0 |
| | Diol compound (SPG: Spiroglycol) | g mol (molar amount) | 0 0 | 0 0 | 0 0 | 0 0 | 0 0 | 0 0 |
| | Aromatic diol compound (Bis(4-hydroxyphenyl)sulfone) | g mol (molar amount) | 0 0 | 0 0 | 0 0 | 0 0 | 0 0 | 0 0 |
| | Aromatic diol compound (Bis(4-hydroxyphenyl)sulfide) | g mol (molar amount) | 0 0 | 0 0 | 0 0 | 0 0 | 0 0 | 0 0 |

TABLE 3-continued

|  |  |  |  |  |  |  |  |  |
|---|---|---|---|---|---|---|---|---|
|  | Diol compound (BNEF: 9,9-Bis[6-(2-hydroxyethoxy)naphthalen-2-yl]fluorene) | g<br>mol (molar amount) | 0<br>0 | 0<br>0 | 0<br>0 | 0<br>0 | 0<br>0 | 0<br>0 |
|  | Aromatic diol compound (Biphenol: 4,4'-Dihydroxy-biphenyl) | g<br>mol (molar amount) | 0<br>0 | 0<br>0 | 0<br>0 | 0<br>0 | 0<br>0 | 0<br>0 |
|  | Aromatic diol compound (2EO-BINOL: 2,2'-Bishydroxyethoxy-1,1'-binaphthyl) | g<br>mol (molar amount) | 0<br>0 | 0<br>0 | 0<br>0 | 0<br>0 | 0<br>0 | 0<br>0 |
|  | Diaryl carbonate (DPC: Diphenyl carbonate) | g<br>mol (molar amount) | 753.04<br>3.52 | 813.00<br>3.80 | 5.28<br>0.02 | 0.83<br>0.004 | 5.26<br>0.02 | 0.83<br>0.004 |
|  | Diphenoxysilane compound (DMDPS: Dimethyldiphenoxysilane) | g<br>mol (molar amount) | 1849.26<br>7.58 | 1997.20<br>8.19 | 0<br>0 | 0<br>0 | 0<br>0 | 1.80<br>0.01 |
|  | Diphenoxysilane compound (DPDPS: Diphenyldiphenoxysilane) | g<br>mol (molar amount) | 0<br>0 | 0<br>0 | 0<br>0 | 0<br>0 | 0<br>0 | 0<br>0 |
|  | Diphenoxysilane compound (DPDMS: Diphenyldimethoxysilane) | g<br>mol (molar amount) | 0<br>0 | 0<br>0 | 13.01<br>0.05 | 18.00<br>0.07 | 12.99<br>0.05 | 16.21<br>0.07 |
|  | Molar ratio ((Diphenoxysilane compound + DPC)/BPA) | mol/mol | 1.10 | 1.09 | 1.11 | 1.10 | 1.10 | 1.10 |
|  | Catalyst ($Cs_2Co_3$, except for those clearly described) | µmol/mol (Number of moles (µmol) per mol of aromatic diol compound) | 14 | 3 | 15 | 15 | 15 | 15 |
| Reaction conditions | Final reaction temperature | (° C.) | 260 | 260 | 260 | 260 | 260 | 260 |
| Poly-carbonate copolymer (product) | Weight average molecular weight | Mw (g/mol) | 208,939 | 81,885 | 115,683 | 12,992 | 23,272 | 28,050 |
|  | Percentage of polymer molecules with weight average molecular weight of 1,000 or less | (mass %) | 0.8 | 0.6 | 0.8 | 2.2 | 1.7 | 1.6 |
|  | Siloxane constituent unit (Si-containing constituent unit) | (mol %) | 67.04 | 65.79 | 58.18 | 91.20 | 58.18 | 91.20 |
|  | Polycarbonate constituent unit (PC-containing constituent unit) | (mol %) | 32.96 | 34.21 | 41.82 | 8.80 | 41.82 | 8.80 |
|  | Si mass % | (mass %) | 6.9 | 6.8 | 2.9 | 4.9 | 3.0 | 5.1 |
|  | Q value (280° C./160 kgf) | ($\times 10^{-2}$ cm$^3$/sec) | — | 117 | 110 | 120 | 120 | 118 |
|  | Glass transition temperature (Tg) | (° C.) | 74 | 75 | 111 | 166 | 140 | 171 |
|  | Temperature for weight loss of 1% (DSC) | (° C.) | 337 | 381 | 351 | 361 | 349 | 339 |
|  | Refractive index (nd) | — | 1.578 | 1.578 | 1.643 | 1.658 | 1.646 | 1.654 |
|  | Abbe number (vd) | — | 30.6 | 30.6 | 23.7 | 22.1 | 23.1 | 22.4 |

|  |  |  | Ex. 21 | Ex. 22 | Ex. 23 | Ex. 24 | Ex. 25 |
|---|---|---|---|---|---|---|---|
| Raw materials/ catalysts | Aromatic diol compound (BPA: 2,2-Bis(4-hydroxyphenyl)propane) | g<br>mol (molar amount) | 0<br>0 | 0<br>0 | 0<br>0 | 0<br>0 | 0<br>0 |
|  | Diol compound (BPEF: 9,9-Bis[4-(2-hydroxyethoxy)phenyl]fluorene) | g<br>mol (molar amount) | 0<br>0 | 0<br>0 | 31.00<br>0.07 | 0<br>0 | 0<br>0 |
|  | Diol compound (BCF: 9,9-Bis(4-hydroxy-3-methylphenyl)fluorene) | g<br>mol (molar amount) | 0<br>0 | 0<br>0 | 0<br>0 | 0<br>0 | 0<br>0 |
|  | Diol compound (BPF: 9,9-Bis(4-hydroxyphenyl)fluorene) | g<br>mol (molar amount) | 0<br>0 | 0<br>0 | 0<br>0 | 24.71<br>0.07 | 0<br>0 |
|  | Diol compound (ISB: Isosorbide) | g<br>mol (molar amount) | 10.22<br>0.07 | 0<br>0 | 0<br>0 | 0<br>0 | 0<br>0 |
|  | Diol compound (SPG: Spiroglycol) | g<br>mol (molar amount) | 0<br>0 | 0<br>0 | 0<br>0 | 0<br>0 | 0<br>0 |
|  | Aromatic diol compound (Bis(4-hydroxyphenyl)sulfone) | g<br>mol (molar amount) | 0<br>0 | 17.50<br>0.07 | 0<br>0 | 0<br>0 | 0<br>0 |
|  | Aromatic diol compound (Bis(4-hydroxyphenyl)sulfide) | g<br>mol (molar amount) | 0<br>0 | 0<br>0 | 0<br>0 | 0<br>0 | 15.26<br>0.07 |
|  | Diol compound (BNEF: 9,9-Bis[6-(2-hydroxyethoxy)naphthalen-2-yl]fluorene) | g<br>mol (molar amount) | 0<br>0 | 0<br>0 | 0<br>0 | 0<br>0 | 0<br>0 |

TABLE 3-continued

|  |  |  |  |  |  |  |  |
|---|---|---|---|---|---|---|---|
|  | Aromatic diol compound (Biphenol: 4,4'-Dihydroxy-biphenyl) | g | 0 | 0 | 0 | 0 | 0 |
|  |  | mol (molar amount) | 0 | 0 | 0 | 0 | 0 |
|  | Aromatic diol compound (2EO-BINOL: 2,2'-Bishydroxyethoxy-1,1'-binaphthyl) | g | 0 | 0 | 0 | 0 | 0 |
|  |  | mol (molar amount) | 0 | 0 | 0 | 0 | 0 |
|  | Diaryl carbonate (DPC: Diphenyl carbonate) | g | 0 | 0 | 0 | 0 | 0 |
|  |  | mol (molar amount) | 0 | 0 | 0 | 0 | 0 |
|  | Diphenoxysilane compound (DMDPS: Dimethyldiphenoxysilane) | g | 0 | 0 | 0 | 0 | 0 |
|  |  | mol (molar amount) | 0 | 0 | 0 | 0 | 0 |
|  | Diphenoxysilane compound (DPDPS: Diphenyldiphenoxysilane) | g | 0 | 0 | 0 | 0 | 0 |
|  |  | mol (molar amount) | 0 | 0 | 0 | 0 | 0 |
|  | Diphenoxysilane compound (DPDMS: Diphenyldimethoxysilane) | g | 17.60 | 17.42 | 18.98 | 18.95 | 17.42 |
|  |  | mol (molar amount) | 0.07 | 0.07 | 0.08 | 0.08 | 0.07 |
|  | Molar ratio ((Diphenoxysilane compound + DPC)/BPA) | mol/mol | 1.03 | 1.02 | 1.10 | 1.10 | 1.02 |
|  | Catalyst ($Cs_2Co_3$, except for those clearly described) | μmol/mol (Number of moles (μmol) per mol of aromatic diol compound) | 15 | 30 | 15 | 15 | 30 |
| Reaction conditions | Final reaction temperature | (° C.) | 200 | 260 | 260 | 260 | 260 |
| Poly-carbonate copolymer (product) | Weight average molecular weight | Mw (g/mol) | 9,125 | 12,806 | 46,225 | 27,028 | 56,797 |
|  | Percentage of polymer molecules with weight average molecular weight of 1,000 or less | (mass %) | 1.0 | 5.3 | 1.1 | 1.9 | 3.2 |
|  | Siloxane constituent unit (Si-containing constituent unit) | (mol %) | 100.00 | 100.00 | 100.00 | 100.00 | 100.00 |
|  | Polycarbonate constituent unit (PC-containing constituent unit) | (mol %) | 0.00 | 0.00 | 0.00 | 0.00 | 0.00 |
|  | Si mass % | (mass %) | 8.6 | 6.5 | 4.5 | 5.3 | 7.1 |
|  | Q value (280° C./160 kgf) | ($\times 10^{-2}$ cm$^3$/sec) | >121 | >121 | 118 | 119 | 120 |
|  | Glass transition temperature (Tg) | (° C.) | 71 | 124 | 97 | 170 | 73 |
|  | Temperature for weight loss of 1% (DSC) | (° C.) | 256 | 385 | 351 | 365 | 392 |
|  | Refractive index (nd) | — | — | — | 1.631 | 1.643 | 1.656 | 1.659 |
|  | Abbe number (vd) | — | — | — | 24.5 | 23.9 | 22.3 | 22.9 |

Example A-26

9,9-Bis[6-(2-hydroxyethoxy)naphthalen-2-yl]fluorene (37.73 g; 0.07 mol), dimethyldiphenoxy silane (19.47 g; 0.07 mol), and 30.0 μmol/mol sodium hydrogen carbonate used as a catalyst (wherein the amount of the catalyst indicates a relative number of moles to the 9,9-bis(6-hydroxynaphthyl)fluorene) were added into a 100-ml four-neck flask equipped with a stirrer, and the inside of the reaction system was then substituted in a nitrogen atmosphere. The raw materials were melted by heating at 210° C., and were stirred for 30 minutes.

Thereafter, a transesterification reaction was carried out over 1 hour and 30 minutes, while phenol distilled from the reaction system was condensed in a cooling tube and was removed. The inside of the system was set at 280° C. and a degree of pressure reduction was set at 2 hPa or less, and the reaction mixture was further retained for 1 hour 50 minutes, so as to obtain a yellowed transparent arylene siloxane. Besides, upon the pressure reduction, the pressure was adjusted such that the atmospheric pressure was gradually changed to 30,000 Pa, 27,500 Pa, 25,000 Pa, 22,500 Pa, 20,000 Pa, 17,500 Pa, 15,000 Pa, 12,500 Pa, 10,000 Pa, 8,000 Pa, 6,000 Pa, 4,000 Pa, 2,000, 1,000, and 200 Pa or less.

The Mw of the arylene siloxane was measured using GPC, and as a result, it was 39,353.

The Tg of the above-described arylene siloxane was measured using DSC, and as a result, it was 138° C. The weight loss of the above-described arylene siloxane was measured using TG-DTA, and as a result, the temperature necessary for a weight loss of 1% was 369.3° C.

Example A-27

4,4'-Dihydroxy-biphenyl (61.04 g; 0.33 mol), dimethyldiphenoxy silane (89.64 g; 0.37 mol), and 3.0 μmol/mol cesium carbonate used as a catalyst (wherein the amount of the catalyst indicates a relative number of moles to the 4,4'-dihydroxy-biphenyl) were added into a 200-ml four-neck flask equipped with a stirrer, and the inside of the reaction system was then substituted in a nitrogen atmosphere. The raw materials were melted by heating at 220° C., and were stirred for 60 minutes.

Thereafter, a transesterification reaction was carried out over 1 hour, while phenol distilled from the reaction system was condensed in a cooling tube and was removed. The inside of the system was set at 260° C. and a degree of pressure reduction was set at 1 hPa or less, and the reaction mixture was further retained for 2 hours, so as to obtain a colorless and transparent arylene siloxane. Besides, upon the pressure reduction, the pressure was adjusted such that the atmospheric pressure was gradually changed to 27,000 Pa, 24,000 Pa, 20,000 Pa, 17,000 Pa, 14,000 Pa, 10,000 Pa, 6,000 Pa, 4,000 Pa, and 100 Pa or less.

The Mw of the arylene siloxane was measured using GPC, and as a result, it was 46,000.

The Tg of the above-described arylene siloxane was measured using DSC, and as a result, it was 70.4° C. The weight loss of the above-described arylene siloxane was measured using TG-DTA, and as a result, the temperature necessary for a weight loss of 1% was 378° C.

Example A-28

4,4'-Dihydroxy-biphenyl (79.71 g; 0.43 mol), diphenyldimethoxy silane (107.42 g; 0.44 mol), and 3.0 μmol/mol cesium carbonate used as a catalyst (wherein the amount of the catalyst indicates a relative number of moles to the 4,4'-dihydroxy-biphenyl) were added into a 200-ml four-neck flask equipped with a stirrer, and the inside of the reaction system was then substituted in a nitrogen atmosphere. The raw materials were melted by heating at 220° C., and were stirred for 30 minutes.

Thereafter, a transesterification reaction was carried out over 2 hours, while methanol distilled from the reaction system was condensed in a cooling tube and was removed. The inside of the system was set at 260° C. and a degree of pressure reduction was set at 1 hPa or less, and the reaction mixture was further retained for 2 hours, so as to obtain a colorless and transparent arylene siloxane. Besides, upon the pressure reduction, the pressure was adjusted such that the atmospheric pressure was gradually changed to 90,000 Pa, 80,000 Pa, 70,000 Pa, 60,000 Pa, 50,000 Pa, 40,000 Pa, 20,000 Pa, 10,000 Pa, 8,000 Pa, 6,000 Pa, 4,000 Pa, 2,000 Pa, and 200 Pa or less.

The Mw of the arylene siloxane was measured using GPC, and as a result, it was 17,000.

The Tg of the above-described arylene siloxane was measured using DSC, and as a result, it was 110° C. The weight loss of the above-described arylene siloxane was measured using TG-DTA, and as a result, the temperature necessary for a weight loss of 1% was 345° C.

Example A-29

4,4'-Dihydroxy-biphenyl (39.06 g; 0.21 mol), dimethyldiphenoxy silane (38.58 g; 0.16 mol), diphenyl carbonate (15.60 g; 0.07 mol), and 15.0 μmol/mol cesium carbonate used as a catalyst (wherein the amount of the catalyst indicates a relative number of moles to the 4,4'-dihydroxy-biphenyl) were added into a 300-ml four-neck flask equipped with a stirrer, and the inside of the reaction system was then substituted in a nitrogen atmosphere. The raw materials were melted by heating at 220° C., and were stirred for 20 minutes.

Thereafter, a transesterification reaction was carried out over 1 hour and 30 minutes, while phenol distilled from the reaction system was condensed in a cooling tube and was removed. The inside of the system was set at 260° C. and a degree of pressure reduction was set at 1 hPa or less, and the reaction mixture was further retained for 10 minutes, so as to obtain a polycarbonate copolymer having a colorless and transparent arylene siloxane structure. Besides, upon the pressure reduction, the pressure was adjusted such that the atmospheric pressure was gradually changed to 30,000 Pa, 25,000 Pa, 20,000 Pa, 15,000 Pa, 10,000 Pa, 8,000 Pa, 6,000 Pa, 4,000 Pa, 2,000 Pa, 1,000 Pa, and 100 Pa or less.

The Mw of the siloxane-containing polycarbonate copolymer was measured using GPC, and as a result, it was 33,710.

The Tg of the above-described copolymer was measured using DSC, and as a result, it was 78.8° C. The weight loss of the above-described copolymer was measured using TG-DTA, and as a result, the temperature necessary for a weight loss of 1% was 357° C.

Example A-30

4,4'-Dihydroxy-biphenyl (39.06 g; 0.21 mol), diphenyldimethoxy silane (35.00 g; 0.14 mol), diphenyl carbonate (15.60 g; 0.07 mol), and 15.0 μmol/mol cesium carbonate used as a catalyst (wherein the amount of the catalyst indicates a relative number of moles to the 4,4'-dihydroxy-biphenyl) were added into a 300-ml four-neck flask equipped with a stirrer, and the inside of the reaction system was then substituted in a nitrogen atmosphere. The raw materials were melted by heating at 220° C., and were stirred for 20 minutes.

Thereafter, a transesterification reaction was carried out over 1 hour and 30 minutes, while methanol distilled from the reaction system was condensed in a cooling tube and was removed. The inside of the system was set at 260° C. and a degree of pressure reduction was set at 1 hPa or less, and the reaction mixture was further retained for 10 minutes, so as to obtain a polycarbonate copolymer having a colorless and transparent arylene siloxane structure. Besides, upon the pressure reduction, the pressure was adjusted such that the atmospheric pressure was gradually changed to 30,000 Pa, 25,000 Pa, 20,000 Pa, 15,000 Pa, 10,000 Pa, 8,000 Pa, 6,000 Pa, 4,000 Pa, 2,000 Pa, 1,000 Pa, and 100 Pa or less.

The Mw of the siloxane-containing polycarbonate copolymer was measured using GPC, and as a result, it was 11,845.

The Tg of the above-described copolymer was measured using DSC, and as a result, it was 120° C. The weight loss of the above-described copolymer was measured using TG-DTA, and as a result, the temperature necessary for a weight loss of 1% was 363° C.

Example A-31

2,2'-Bishydroxyethoxy-1,1'-binaphthyl (26.18 g; 0.07 mol), dimethyldiphenoxy silane (19.82 g; 0.08 mol), and 30 μmol/mol sodium hydrogen carbonate used as a catalyst (wherein the amount of the catalyst indicates a relative number of moles to the 2,2'-bishydroxyethoxy-1,1'-binaphthyl) were added into a 100-ml four-neck flask equipped with a stirrer, and the inside of the reaction system was then substituted in a nitrogen atmosphere. The raw materials were melted by heating at 210° C., and were stirred for 35 minutes.

Thereafter, a transesterification reaction was carried out over 1 hour and 30 minutes, while phenol distilled from the reaction system was condensed in a cooling tube and was removed. The inside of the system was set at 260° C. and a degree of pressure reduction was set at 1 hPa or less, and the reaction mixture was further retained for 1 hour and 30 minutes, so as to obtain a colorless and transparent arylene siloxane. Besides, upon the pressure reduction, the pressure was adjusted such that the atmospheric pressure was gradually changed to 27,500 Pa, 25,000 Pa, 22,500 Pa, 20,000 Pa, 17,500 Pa, 15,000 Pa, 12,500 Pa, 10,000 Pa, 8,000 Pa, 6,000 Pa, 4,000 Pa, 2,000 Pa, 1,000 Pa, and 100 Pa or less.

The Mw of the arylene siloxane was measured using GPC, and as a result, it was 19,975.

The Tg of the above-described arylene siloxane was measured using DSC, and as a result, it was 54° C. The weight loss of the above-described arylene siloxane was measured using TG-DTA, and as a result, the temperature necessary for a weight loss of 1% was 296° C.

Example A-32

2,2'-Bishydroxyethoxy-1,1'-binaphthyl (26.18 g; 0.07 mol), diphenyl carbonate (5.40 g; 0.03 mol), dimethyldiphenoxy silane (12.65 g; 0.05 mol), and 30 μmol/mol sodium hydrogen carbonate used as a catalyst (wherein the amount of the catalyst indicates a relative number of moles to the 2,2'-bishydroxyethoxy-1,1'-binaphthyl) were added into a 100-ml four-neck flask equipped with a stirrer, and the inside of the reaction system was then substituted in a nitrogen atmosphere. The raw materials were melted by heating at 220° C., and were stirred for 1 hour.

Thereafter, a transesterification reaction was carried out over 1 hour 10 minutes, while phenol distilled from the reaction system was condensed in a cooling tube and was removed. The inside of the system was set at 260° C. and a degree of pressure reduction was set at 1 hPa or less, and the reaction mixture was further retained for 1 hour 20 minutes, so as to obtain a polycarbonate copolymer having a colorless and transparent arylene siloxane structure. Besides, upon the pressure reduction, the pressure was adjusted such that the atmospheric pressure was gradually changed to 27,500 Pa, 25,000 Pa, 22,500 Pa, 20,000 Pa, 17,500 Pa, 15,000 Pa, 12,500 Pa, 10,000 Pa, 8,000 Pa, 6,000 Pa, 4,000 Pa, 2,000 Pa, 1,000 Pa, and 100 Pa or less.

The Mw of the siloxane-containing polycarbonate copolymer was measured using GPC, and as a result, it was 32,178.

The Tg of the above-described copolymer was measured using DSC, and as a result, it was 74° C. The weight loss of the above-described copolymer was measured using TG-DTA, and as a result, the temperature necessary for a weight loss of 1% was 317° C.

Example A-33

Isosorbide (10.22 g; 0.07 mol), diphenyl carbonate (5.20 g; 0.02 mol), dimethyldiphenoxy silane (12.86 g; 0.05 mol), and 15.0 μmol/mol cesium carbonate used as a catalyst (wherein the amount of the catalyst indicates a relative number of moles to the isosorbide) were added into a 100-ml four-neck flask equipped with a stirrer, and the inside of the reaction system was then substituted in a nitrogen atmosphere. The raw materials were melted by heating at 200° C., and were stirred for 30 minutes.

Thereafter, a transesterification reaction was carried out over 1 hour 20 minutes, while phenol distilled from the reaction system was condensed in a cooling tube and was removed. The inside of the system was set at 260° C. and a degree of pressure reduction was set at 2 hPa or less, and the reaction mixture was further retained for 1 hour and 30 minutes, so as to obtain a polycarbonate copolymer having a yellowed transparent arylene siloxane structure. Besides, upon the pressure reduction, the pressure was adjusted such that the atmospheric pressure was gradually changed to 30,000 Pa, 25,000 Pa, 20,000 Pa, 15,000 Pa, 10,000 Pa, 8,000 Pa, 6,000 Pa, 4,000 Pa, 2,000 Pa, 1,000 Pa, and 200 Pa or less.

The Mw of the siloxane-containing polycarbonate copolymer was measured using GPC, and as a result, it was 39,378.

The Tg of the above-described copolymer was measured using DSC, and as a result, it was 55° C. The weight loss of the above-described copolymer was measured using TG-DTA, and as a result, the temperature necessary for a weight loss of 1% was 242° C.

Example A-34

3,9-Bis(1,1-dimethyl-2-hydroxyethyl)-2,4,8,10-tetraoxaspiro[5.5]undecane (21.28 g; 0.07 mol), dimethyldiphenoxy silane (19.82 g; 0.08 mol), and 30.0 μmol/mol sodium hydrogen carbonate used as a catalyst (wherein the amount of the catalyst indicates a relative number of moles to the 3,9-bis(1,1-dimethyl-2-hydroxyethyl)-2,4,8,10-tetraoxaspiro[5.5]undecane) were added into a 100-ml four-neck flask equipped with a stirrer, and the inside of the reaction system was then substituted in a nitrogen atmosphere. The raw materials were melted by heating at 210° C., and were stirred for 30 minutes.

Thereafter, a transesterification reaction was carried out over 1 hour 50 minutes, while phenol distilled from the reaction system was condensed in a cooling tube and was removed. The inside of the system was set at 260° C. and a degree of pressure reduction was set at 2 hPa or less, and the reaction mixture was further retained for 1 hour, so as to obtain a colorless and transparent arylene siloxane. Besides, upon the pressure reduction, the pressure was adjusted such that the atmospheric pressure was gradually changed to 30,000 Pa, 25,000 Pa, 20,000 Pa, 17,500 Pa, 15,000 Pa, 12,500 Pa, 10,000 Pa, 8,000 Pa, 6,000 Pa, 4,000 Pa, 2,000 Pa, 1,000 Pa, and 200 Pa or less.

The Mw of the arylene siloxane was measured using GPC, and as a result, it was 15,708.

The Tg of the above-described arylene siloxane was measured using DSC, and as a result, it was 51° C. The weight loss of the above-described arylene siloxane was measured using TG-DTA, and as a result, the temperature necessary for a weight loss of 1% was 236° C.

Example A-35

3,9-Bis(1,1-dimethyl-2-hydroxyethyl)-2,4,8,10-tetraoxaspiro[5.5]undecane (21.28 g; 0.07 mol), diphenyl carbonate (5.20 g; 0.02 mol), dimethyldiphenoxy silane (12.86 g; 0.05 mol), and 30.0 μmol/mol sodium hydrogen carbonate used as a catalyst (wherein the amount of the catalyst indicates a relative number of moles to the 3,9-bis(1,1-dimethyl-2-hydroxyethyl)-2,4,8,10-tetraoxaspiro[5.5]undecane) were added into a 100-ml four-neck flask equipped with a stirrer, and the inside of the reaction system was then substituted in a nitrogen atmosphere. The raw materials were melted by heating at 210° C., and were stirred for 30 minutes.

Thereafter, a transesterification reaction was carried out over 1 hour and 30 minutes, while phenol distilled from the reaction system was condensed in a cooling tube and was removed. The inside of the system was set at 260° C. and a degree of pressure reduction was set at 2 hPa or less, and the reaction mixture was further retained for 1 hour, so as to obtain a polycarbonate copolymer having a transparent arylene siloxane structure. Besides, upon the pressure reduction, the pressure was adjusted such that the atmospheric pressure was gradually changed to 30,000 Pa, 25,000 Pa, 20,000 Pa, 17,500 Pa, 15,000 Pa, 12,500 Pa, 10,000 Pa, 8,000 Pa, 6,000 Pa, 4,000 Pa, 2,000 Pa, 1,000 Pa, and 200 Pa or less.

The Mw of the siloxane-containing polycarbonate copolymer was measured using GPC, and as a result, it was 68,693.

The Tg of the above-described copolymer was measured using DSC, and as a result, it was 63° C. The weight loss of the above-described copolymer was measured using TG-DTA, and as a result, the temperature necessary for a weight loss of 1% was 252° C.

Comparative Example A-1

2,2-Bis(4-hydroxyphenyl)propane (17.51 g; 0.08 mmol), dimethyldiphenoxy silane (20.93 g; 0.09 mol), and 7 μmol/mol cesium carbonate used as a catalyst (wherein the amount of the catalyst indicates a relative number of moles to the 2,2-bis(4-hydroxyphenyl)propane) were added into a 100-ml four-neck flask equipped with a stirrer, and the inside of the reaction system was then substituted in a nitrogen atmosphere. The raw materials were melted by heating at 180° C., and were stirred for 30 minutes.

Thereafter, a transesterification reaction was carried out over 1 hour, while phenol distilled from the reaction system was condensed in a cooling tube and was removed. The inside of the system was set at 260° C. and a degree of pressure reduction was set at 4 hPa or less, and the reaction mixture was further retained for 2 hours, so as to obtain a colorless and transparent polyarylene siloxane.

The Mw of the polyarylene siloxane was measured using GPC, and as a result, it was 63,257.

The Tg of the above-described copolymer was measured using DSC, and as a result, it was 54° C.

Comparative Example A-2

The Mw of a polycarbonate (manufactured by Mitsubishi Gas Chemical Company, Inc.; Iupilon S-3000) was measured using GPC, and as a result, it was 51,252.

The Tg of the above-described polycarbonate was measured using DSC, and as a result, it was 149° C.

Comparative Example A-3

Iupizeta EP6000 manufactured by Mitsubishi Gas Chemical Company, Inc., namely, a polycarbonate resin comprising BPEF: 9,9-bis[4-(2-hydroxyethoxy)phenyl]fluorene) as a diol compound, was used in Comparative Example A-3. The Mw of the polycarbonate resin of Comparative Example A-3 was 30000, the Q value thereof was $97 \times 10^{-2}$ cm$^3$/sec, and the Tg thereof was 142° C., the refractive index (nd) thereof was 1.638, and the Abbe number (vd) thereof was 23.5.

It was confirmed that, in Examples A-17, -19, and -23, in which a similar diol compound was used, fluidity could be improved (i.e., the Q value could be increased) without largely changing the optical properties, compared with Comparative Example A-3.

The results of the aforementioned Examples A-26 to A-35 and Comparative Example A-1 and -2 are shown in Table 4.

TABLE 4

| | | | Ex. 26 | Ex. 27 | Ex. 28 | Ex. 29 | Ex. 30 | Ex. 31 |
|---|---|---|---|---|---|---|---|---|
| Raw materials/ catalysts | Aromatic diol compound (BPA: 2,2-Bis(4-hydroxyphenyl)propane) | g<br>mol<br>(molar amount) | 0<br>0 | 0<br>0 | 0<br>0 | 0<br>0 | 0<br>0 | 0<br>0 |
| | Diol compound (BPEF: 9,9-Bis[4-(2-hydroxyethoxy)phenyl]fluorene) | g<br>mol<br>(molar amount) | 0<br>0 | 0<br>0 | 0<br>0 | 0<br>0 | 0<br>0 | 0<br>0 |
| | Diol compound (BCF: 9,9-Bis(4-hydroxy-3-methylphenyl)fluorene) | g<br>mol<br>(molar amount) | 0<br>0 | 0<br>0 | 0<br>0 | 0<br>0 | 0<br>0 | 0<br>0 |
| | Diol compound (BPF: 9,9-Bis(4-hydroxyphenyl)fluorene) | g<br>mol<br>(molar amount) | 0<br>0 | 0<br>0 | 0<br>0 | 0<br>0 | 0<br>0 | 0<br>0 |
| | Diol compound (ISB: Isosorbide) | g<br>mol<br>(molar amount) | 0<br>0 | 0<br>0 | 0<br>0 | 0<br>0 | 0<br>0 | 0<br>0 |
| | Diol compound (SPG: Spiroglycol) | g<br>mol<br>(molar amount) | 0<br>0 | 0<br>0 | 0<br>0 | 0<br>0 | 0<br>0 | 0<br>0 |
| | Aromatic diol compound (Bis(4-hydroxyphenyl)sulfone) | g<br>mol<br>(molar amount) | 0<br>0 | 0<br>0 | 0<br>0 | 0<br>0 | 0<br>0 | 0<br>0 |
| | Aromatic diol compound (Bis(4-hydroxyphenyl)sulfide) | g<br>mol<br>(molar amount) | 0<br>0 | 0<br>0 | 0<br>0 | 0<br>0 | 0<br>0 | 0<br>0 |
| | Diol compound (BNEF: 9,9-Bis[6-(2-hydroxyethoxy)naphthalen-2-yl]fluorene) | g<br>mol<br>(molar amount) | 37.73<br>0.07 | 0<br>0 | 0<br>0 | 0<br>0 | 0<br>0 | 0<br>0 |
| | Aromatic diol compound (Biphenol: 4,4'-Dihydroxy-biphenyl) | g<br>mol<br>(molar amount) | 0<br>0 | 61.04<br>0.33 | 79.71<br>0.43 | 39.06<br>0.21 | 39.06<br>0.21 | 0<br>0 |
| | Aromatic diol compound (2EO-BINOL: 2,2'-Bishydroxyethoxy-1,1'-binaphthyl) | g<br>mol<br>(molar amount) | 0<br>0 | 0<br>0 | 0<br>0 | 0<br>0 | 0<br>0 | 26.18<br>0.07 |
| | Diaryl carbonate (DPC: Diphenyl carbonate) | g<br>mol<br>(molar amount) | 0<br>0 | 0<br>0 | 0<br>0 | 15.60<br>0.07 | 15.60<br>0.07 | 0<br>0 |

TABLE 4-continued

|  |  |  | | | | | | |
|---|---|---|---|---|---|---|---|---|
|  | Diphenoxysilane compound (DMDPS: Dimethyldiphenoxysilane) | g<br>mol<br>(molar amount) | 19.47<br>0.08 | 89.64<br>0.37 | 0<br>0 | 38.58<br>0.16 | 0<br>0 | 19.82<br>0.08 |
|  | Diphenoxysilane compound (DPDPS: Diphenyldiphenoxysilane) | g<br>mol<br>(molar amount) | 0<br>0 | 0<br>0 | 0<br>0 | 0<br>0 | 0<br>0 | 0<br>0 |
|  | Diphenoxysilane compound (DPDMS: Diphenyldimethoxysilane) | g<br>mol<br>(molar amount) | 0<br>0 | 0<br>0 | 107.42<br>0.44 | 0<br>0 | 35.00<br>0.14 | 0<br>0 |
|  | Molar ratio ((Diphenoxysilane compound + DPC)/BPA) | mol/mol | 1.14 | 1.12 | 1.03 | 1.10 | 1.03 | 1.16 |
|  | Catalyst ($Cs_2Co_3$, except for those clearly described) | μmol/mol (Number of moles (μmol) per mol of aromatic diol) | 30 ($NaHCO_3$) | 3 | 3 | 15 | 15 | 30 ($NaHCO_3$) |
| Reaction conditions | Final reaction temperature | (° C.) | 280 | 260 | 260 | 260 | 260 | 260 |
| Poly-carbonate copolymer (product) | Weight average molecular weight | Mw (g/mol) | 39,353 | 46,000 | 17,000 | 33,710 | 11,845 | 19,975 |
|  | Percentage of polymer molecules with weight average molecular weight of 1,000 or less | (mass %) | 1.5 | 0.03 | — | 0.01 | 0.81 | 9.0 |
|  | Siloxane constituent unit (Si-containing constituent unit) | (mol %) | 100.00 | 100 | 100 | 67.86 | 67.23 | 100 |
|  | Polycarbonate constituent unit (PC-containing constituent unit) | (mol %) | 0.00 | 0 | 0 | 32.14 | 32.77 | 0 |
|  | Si mass % | (mass %) | 4.7 | 11.6 | 7.6 | 8.2 | 6.0 | 6.5 |
|  | Q value (280° C./160 kgf) | ($\times 10^{-2}$ $cm^3$/sec) | 35 | 115 | 117 | 96 | 91 | >121 |
|  | Glass transition temperature (Tg) | (° C.) | 138 | 70 | 110 | 79 | 120 | 54 |
|  | Temperature for weight loss of 1% (DSC) | (° C.) | 369 | 378 | 345 | 357 | 363 | 296 |
|  | Refractive index (nd) | — | 1.667 | 1.633 | 1.653 | 1.636 | 1.650 | 1.644 |
|  | Abbe number (vd) | — | 19.2 | 22.8 | 22.5 | 21.9 | 21.6 | 20.0 |

|  |  |  | Ex. 32 | Ex. 33 | Ex. 34 | Ex. 35 | Comp. Ex. 1 | Comp. Ex. 2 |
|---|---|---|---|---|---|---|---|---|
| Raw materials/ catalysts | Aromatic diol compound (BPA: 2,2-Bis(4-hydroxyphenyl)propane) | g<br>mol<br>(molar amount) | 0<br>0 | 0<br>0 | 0<br>0 | 0<br>0 | 17.51<br>0.08 | BPA-type poly-carbonate resin (Iupilon S-3000) |
|  | Diol compound (BPEF: 9,9-Bis[4-(2-hydroxyethoxy)phenyl]fluorene) | g<br>mol<br>(molar amount) | 0<br>0 | 0<br>0 | 0<br>0 | 0<br>0 | 0<br>0 |  |
|  | Diol compound (BCF: 9,9-Bis(4-hydroxy-3-methylphenyl)fluorene) | g<br>mol<br>(molar amount) | 0<br>0 | 0<br>0 | 0<br>0 | 0<br>0 | 0<br>0 |  |
|  | Diol compound (BPF: 9,9-Bis(4-hydroxyphenyl)fluorene) | g<br>mol<br>(molar amount) | 0<br>0 | 0<br>0 | 0<br>0 | 0<br>0 | 0<br>0 |  |
|  | Diol compound (ISB: Isosorbide) | g<br>mol<br>(molar amount) | 0<br>0 | 10.22<br>0.07 | 0<br>0 | 0<br>0 | 0<br>0 |  |
|  | Diol compound (SPG: Spiroglycol) | g<br>mol<br>(molar amount) | 0<br>0 | 0<br>0 | 21.28<br>0.07 | 21.28<br>0.07 | 0<br>0 |  |
|  | Aromatic diol compound (Bis(4-hydroxyphenyl)sulfone) | g<br>mol<br>(molar amount) | 0<br>0 | 0<br>0 | 0<br>0 | 0<br>0 | 0<br>0 |  |
|  | Aromatic diol compound (Bis(4-hydroxyphenyl)sulfide) | g<br>mol<br>(molar amount) | 0<br>0 | 0<br>0 | 0<br>0 | 0<br>0 | 0<br>0 |  |
|  | Diol compound (BNEF: 9,9-Bis[6-(2-hydroxyethoxy)naphthalen-2-yl]fluorene) | g<br>mol<br>(molar amount) | 0<br>0 | 0<br>0 | 0<br>0 | 0<br>0 | 0<br>0 |  |
|  | Aromatic diol compound (Biphenol: 4,4'-Dihydroxy-biphenyl) | g<br>mol<br>(molar amount) | 0<br>0 | 0<br>0 | 0<br>0 | 0<br>0 | 0<br>0 |  |
|  | Aromatic diol compound (2EO-BINOL: 2,2'-Bishydroxyethoxy-1,1'-binaphthyl) | g<br>mol<br>(molar amount) | 26.18<br>0.07 | 0<br>0 | 0<br>0 | 0<br>0 | 0<br>0 |  |
|  | Diaryl carbonate (DPC: Diphenyl carbonate) | g<br>mol<br>(molar amount) | 5.40<br>0.03 | 5.20<br>0.02 | 0<br>0 | 5.20<br>0.02 | 0<br>0 |  |

TABLE 4-continued

|  |  |  |  |  |  |  |  |
|---|---|---|---|---|---|---|---|
|  | Diphenoxysilane compound (DMDPS: Dimethyldiphenoxysilane) | g mol | (molar amount) | 12.65 0.05 | 12.86 0.05 | 19.82 0.08 | 12.86 0.05 | 20.93 0.09 |
|  | Diphenoxysilane compound (DPDPS: Diphenyldiphenoxysilane) | g mol | (molar amount) | 0 0 | 0 0 | 0 0 | 0 0 | 0 0 |
|  | Diphenoxysilane compound (DPDMS: Diphenyldimethoxysilane) | g mol | (molar amount) | 0 0 | 0 0 | 0 0 | 0 0 | 0 0 |
|  | Molar ratio ((Diphenoxysilane compound + DPC)/BPA) | mol/mol |  | 1.10 | 1.10 | 1.16 | 1.10 | 1.12 |
|  | Catalyst (Cs$_2$Co$_3$, except for those clearly described) | μmol/mol | (Number of moles (μmol) per mol of aromatic diol) | 30 | 15 (NaHCO$_3$) | 30 | 30 (NaHCO$_3$) (NaHCO$_3$) | 7 |
| Reaction conditions | Final reaction temperature | (° C.) |  | 260 | 260 | 260 | 260 | 260 | — |
| Poly-carbonate copolymer (product) | Weight average molecular weight | Mw (g/mol) |  | 32,178 | 39,378 | 15,708 | 68,693 | 63,257 | 51,252 |
|  | Percentage of polymer molecules with weight average molecular weight of 1,000 or less | (mass %) |  | 7.4 | 0.50 | 1.4 | 1.0 | 1.6 | 0.15 |
|  | Siloxane constituent unit (Si-containing constituent unit) | (mol %) |  | 64.37 | 61.98 | 100 | 61.40 | 100 | 0 |
|  | Polycarbonate constituent unit (PC-containing constituent unit) | (mol %) |  | 35.63 | 38.02 | 0 | 38.60 | 0 | 100 |
|  | Si mass % | (mass %) |  | 4.3 | 9.1 | 7.8 | 4.9 | 9.8 | 0 |
|  | Q value (280° C./160 kgf) | (×10$^{-2}$ cm$^3$/sec) |  | >121 | >121 | >121 | 116 | — | 8 |
|  | Glass transition temperature (Tg) | (° C.) |  | 74 | 55 | 51 | 63 | 54 | 149 |
|  | Temperature for weight loss of 1% (DSC) | (° C.) |  | 317 | 242 | 236 | 252 | 335 | 420 |
|  | Refractive index (nd) | — |  | 1.653 | 1.511 | 1.482 | 1.490 | 1.577 | 1.583 |
|  | Abbe number (vd) | — |  | 19.4 | 54.8 | 54.3 | 49.0 | 28.8 | 30.2 |

Example A-36

The polycarbonate copolymer obtained in Example A-3 (10 g) and 190 g of a polycarbonate (manufactured by Mitsubishi Gas Chemical Company, Inc.; Iupilon S-3000) were kneaded and extruded at 280° C. using a kneading extruder (manufactured by Toyo Seiki Seisaku-sho, Ltd.; LABO PLASTOMILL 4C150). The Q value of the obtained composition was 11.9 (×10$^{-2}$ cm$^3$/sec). In addition, the composition was dried using a dryer at 110° C. for 12 hours, and it was then molded into a test piece for use in a Charpy impact test, using an injection molding machine (manufactured by Shinko Sellbic Co., Ltd.; "C-Mobile") at a resin temperature of 300° C. and at a mold temperature of 90° C. Thereafter, a notched Charpy impact test was carried out in accordance with JIS-K7111. As a result, the Charpy impact strength was 60.9 kJ/m$^2$.

Example A-37

The polycarbonate copolymer obtained in Example A-4 (10 g) and 190 g of a polycarbonate (manufactured by Mitsubishi Gas Chemical Company, Inc.; Iupilon S-3000) were kneaded and extruded at 280° C. using a kneading extruder (manufactured by Toyo Seiki Seisaku-sho, Ltd.; LABO PLASTOMILL 4C150). The Q value of the obtained composition was 14.1 (×10$^{-2}$ cm$^3$/sec). In addition, the composition was dried using a dryer at 110° C. for 12 hours, and it was then molded into a test piece for use in a Charpy impact test, using an injection molding machine (manufactured by Shinko Sellbic Co., Ltd.; "C-Mobile") at a resin temperature of 300° C. and at a mold temperature of 90° C. Thereafter, a notched Charpy impact test was carried out in accordance with JIS-K7111. As a result, the Charpy impact strength was 65.8 kJ/m$^2$.

Example A-38

The polycarbonate copolymer obtained in Example A-16 (150 g) and 1850 g of a polycarbonate (manufactured by Mitsubishi Gas Chemical Company, Inc.; Iupilon E-2000) were kneaded at a resin temperature of 280° C. using a kneading extrusion injection molding machine (high-speed injection molding machine, SODICK TR100EH), and were then subjected to injection molding under conditions of a mold temperature of 80° C. and a retained pressure of 90 MPa, so as to mold the mixture into a test piece for use in a Charpy impact test. A notched Charpy impact test was carried out in accordance with JIS-K7111. As a result, the Charpy impact strength was 70.1 kJ/m$^2$. Moreover, the Q value of the obtained composition was 5.5 (×10$^{-2}$ cm$^3$/sec).

Example A-39

The polycarbonate copolymer obtained in Example A-16 (300 g) and 1700 g of a polycarbonate (manufactured by Mitsubishi Gas Chemical Company, Inc.; Iupilon E-2000) were kneaded at a resin temperature of 280° C. using a kneading extrusion injection molding machine (high-speed injection molding machine, SODICK TR100EH), and were then subjected to injection molding under conditions of a mold temperature of 80° C. and a retained pressure of 90 MPa, so as to mold the mixture into a test piece for use in a Charpy impact test. A notched Charpy impact test was carried out in accordance with JIS-K7111. As a result, the Charpy impact strength was 76.7 kJ/m$^2$. Moreover, the Q value of the obtained composition was 8.1 (×10$^{-2}$ cm$^3$/sec).

Example A-40

The polycarbonate copolymer obtained in Example A-16 (600 g) and 1400 g of a polycarbonate (manufactured by Mitsubishi Gas Chemical Company, Inc.; Iupilon E-2000) were kneaded at a resin temperature of 280° C. using a kneading extrusion injection molding machine (high-speed injection molding machine, SODICK TR100EH), and were then subjected to injection molding under conditions of a mold temperature of 80° C. and a retained pressure of 90 MPa, so as to mold the mixture into a test piece for use in a Charpy impact test. A notched Charpy impact test was carried out in accordance with JIS-K7111. As a result, the Charpy impact strength was 6.9 kJ/m². Moreover, the Q value of the obtained composition was 17.2 ($\times 10^{-2}$ cm³/sec).

Comparative Example A-4

The Q value of a polycarbonate (manufactured by Mitsubishi Gas Chemical Company, Inc.; Iupilon S-3000) was 8.0 ($\times 10^{-2}$ cm³/sec). In addition, the polycarbonate was dried at 110° C. for 12 hours, using a dryer, and was then molded into a test piece for use in a Charpy impact test, using an injection molding machine (manufactured by Shinko Sellbic Co., Ltd.; "C-Mobile") at a resin temperature of 300° C. and at a mold temperature of 90° C. Thereafter, a notched Charpy impact test was carried out in accordance with JIS-K7111. As a result, the Charpy impact strength was 62.9 kJ/m².

Comparative Example A-5

2000 g of a polycarbonate (manufactured by Mitsubishi Gas Chemical Company, Inc.; Iupilon E-2000) was kneaded at a resin temperature of 300° C. using a kneading extrusion injection molding machine (high-speed injection molding machine, SODICK TR100EH), and was then subjected to injection molding under conditions of a mold temperature of 80° C. and a retained pressure of 90 MPa, so as to mold the mixture into a test piece for use in a Charpy impact test. A notched Charpy impact test was carried out in accordance with JIS-K7111. As a result, the Charpy impact strength was 72.7 kJ/m². Moreover, the Q value of the obtained composition was 2.8 ($\times 10^{-2}$ cm³/sec).

The results of Examples A-36 to -40 and Comparative Examples A-4 and -5 are shown in the following Table 5.

TABLE 5

| | | | Ex. A-36 | Ex. A-37 | Ex. A-38 | Ex. A-39 | Ex. A-40 | Comp. Ex. A-4 | Comp. Ex. A-5 |
|---|---|---|---|---|---|---|---|---|---|
| Raw materials | BPA-type polycarbonate resin (Iupilon S-3000) | g | 190 | 190 | — | — | — | 200 | — |
| | Siloxane-containing polycarbonate copolymer (Ex. A-3) | g | 10 | — | — | — | — | — | — |
| | Siloxane-containing polycarbonate copolymer (Ex. A-4) | g | — | 10 | — | — | — | — | — |
| | Siloxane-containing polycarbonate copolymer (Ex. A-16) | g | — | — | 150 | 300 | 600 | — | — |
| | BPA-type polycarbonate resin (Iupilon E-2000) | g | — | — | 1850 | 1700 | 1400 | — | 2000 |
| | Total | g | 200 | 200 | 2000 | 2000 | 2000 | 200 | 2000 |
| Evaluation of physical properties of composition | Charpy impact test (notched) | (kJ/m²) | 60.9 | 65.8 | 70.1 | 76.7 | 6.9 | 62.9 | 72.7 |
| | | Relative value (value (%) based on value of Comp. Ex. 3 (or 4) | 97 | 105 | 96 | 106 | 9 | 100 | 100 |
| | Q value (280° C., 160 kgf) | ($\times 10^{-2}$ cm³/sec) | 11.9 | 14.1 | 5.5 | 8.1 | 17.2 | 8.0 | 2.8 |
| | | Relative value (value (%) based on value of Comp. Ex. 3 (or 4) | 149 | 176 | 196 | 289 | 614 | 100 | 100 |

Examples of Polysiloxane Compound

Hereafter, examples of the polysiloxane compound will be described.

<Weight Average Molecular Weight (Mw) in Terms of Polystyrene>

Applying GPC (gel permeation chromatography), and using chloroform as a developing solvent, a calibration curve was produced using standard polystyrene with a known molecular weight (molecular weight distribution=1). Based on this calibration curve, the weight average molecular weight (Mw) in terms of polystyrene was calculated from the retention time of GPC.

<Glass Transition Temperature (Tg)>

The glass transition temperature (Tg) was measured using a differential scanning calorimeter (DSC). In the obtained DSC curve, the glass transition temperature (Tg) was obtained from an intersection of the baseline on the low temperature side extended to the high temperature side, with a tangent drawn with a point that made maximum the gradient of the curve of the stepwise change part of the glass transition.

(Synthesis Example 2) Synthesis of Dimethyldiphenoxy Silane

Decamethylcyclopentasiloxane (7.5 g; 20.2 mmol; Si molar amount: 101.0 mmol), diphenyl carbonate (21.6 g; 101.0 mmol), and cesium carbonate used as a catalyst (33 mg; 0.1 mmol) were substituted in a nitrogen atmosphere, and were stirred at 200° C. for 60 minutes.

Subsequently, the reaction mixture was cooled to 40° C., and was then distilled under reduced pressure at a degree of pressure reduction of 4 hPa and at 150° C., so as to obtain 23.7 g of a colorless oily component.

The obtained oily component was analyzed by 1H-NMR, and it was confirmed that the oily component was dimethyldiphenoxy silane. ($^1$H-NMR (CDCl$_3$, 500 MHz, S; ppm)= 0.378 (s; 6H), 6.942, 6.944 (d; 4H), 6.959, 6.961, 6.995 (t; 2H), 7.230, 7.245, 7.257 (t; 4H)). The molar yield was found to be 96.0%.

Example B-1

2,2-Bis(4-hydroxyphenyl)propane (30.03 g; 0.13 mol), dimethyldiphenoxy silane (33.50 g; 0.14 mol), and 11 μmol/mol cesium carbonate used as a catalyst (wherein the amount of the catalyst indicates a relative number of moles to the 2,2-bis(4-hydroxyphenyl)propane) were added into a 100-ml four-neck flask equipped with a stirrer, and the inside of the reaction system was then substituted in a nitrogen atmosphere. The raw materials were melted by heating at 180° C., and were stirred for 30 minutes.

Thereafter, a transesterification reaction was carried out over 1.5 hours, while phenol distilled from the reaction system was condensed in a cooling tube and was removed. The inside of the system was set at 240° C. and a degree of pressure reduction was set at 4 hPa or less, and the reaction mixture was further retained for 1.5 hours, so as to obtain a colorless and transparent polyarylene siloxane.

The Mw of the polyarylene siloxane was measured using GPC, and as a result, it was 26,699.

Example B-2

2,2-Bis(4-hydroxyphenyl)propane (30.03 g; 0.13 mol), dimethyldiphenoxy silane (34.40 g; 0.14 mol), and 11 μmol/mol cesium carbonate used as a catalyst (wherein the amount of the catalyst indicates a relative number of moles to the 2,2-bis(4-hydroxyphenyl)propane) were added into a 100-ml four-neck flask equipped with a stirrer, and the inside of the reaction system was then substituted in a nitrogen atmosphere. The raw materials were melted by heating at 180° C., and were stirred for 30 minutes.

Thereafter, a transesterification reaction was carried out over 1.5 hours, while phenol distilled from the reaction system was condensed in a cooling tube and was removed. The inside of the system was set at 240° C. and a degree of pressure reduction was set at 4 hPa or less, and the reaction mixture was further retained for 1.5 hours, so as to obtain a colorless and transparent polyarylene siloxane.

The Mw of the polyarylene siloxane was measured using GPC, and as a result, it was 33,521.

Example B-3

2,2-Bis(4-hydroxyphenyl)propane (30.05 g; 0.13 mol), dimethyldiphenoxy silane (34.69 g; 0.14 mol), and 11 μmol/mol cesium carbonate used as a catalyst (wherein the amount of the catalyst indicates a relative number of moles to the 2,2-bis(4-hydroxyphenyl)propane) were added into a 100-ml four-neck flask equipped with a stirrer, and the inside of the reaction system was then substituted in a nitrogen atmosphere. The raw materials were melted by heating at 180° C., and were stirred for 30 minutes.

Thereafter, a transesterification reaction was carried out over 1.5 hours, while phenol distilled from the reaction system was condensed in a cooling tube and was removed. The inside of the system was set at 240° C. and a degree of pressure reduction was set at 4 hPa or less, and the reaction mixture was further retained for 1.5 hours, so as to obtain a colorless and transparent polyarylene siloxane.

The Mw of the polyarylene siloxane was measured using GPC, and as a result, it was 30,603.

Example B-4

2,2-Bis(4-hydroxyphenyl)propane (30.03 g; 0.13 mol), dimethyldiphenoxy silane (35.10 g; 0.14 mol), and 11 μmol/mol cesium carbonate used as a catalyst (wherein the amount of the catalyst indicates a relative number of moles to the 2,2-bis(4-hydroxyphenyl)propane) were added into a 100-ml four-neck flask equipped with a stirrer, and the inside of the reaction system was then substituted in a nitrogen atmosphere. The raw materials were melted by heating at 180° C., and were stirred for 30 minutes.

Thereafter, a transesterification reaction was carried out over 1.5 hours, while phenol distilled from the reaction system was condensed in a cooling tube and was removed. The inside of the system was set at 240° C. and a degree of pressure reduction was set at 4 hPa or less, and the reaction mixture was further retained for 1.5 hours, so as to obtain a colorless and transparent polyarylene siloxane.

The Mw of the polyarylene siloxane was measured using GPC, and as a result, it was 36,940.

Example B-5

2,2-Bis(4-hydroxyphenyl)propane (30.08 g; 0.13 mol), dimethyldiphenoxy silane (36.00 g; 0.15 mol), and 11 μmol/mol cesium carbonate used as a catalyst (wherein the amount of the catalyst indicates a relative number of moles to the 2,2-bis(4-hydroxyphenyl)propane) were added into a 100-ml four-neck flask equipped with a stirrer, and the inside of the reaction system was then substituted in a nitrogen atmosphere. The raw materials were melted by heating at 180° C., and were stirred for 30 minutes.

Thereafter, a transesterification reaction was carried out over 1.5 hours, while phenol distilled from the reaction system was condensed in a cooling tube and was removed. The inside of the system was set at 240° C. and a degree of pressure reduction was set at 4 hPa or less, and the reaction mixture was further retained for 1.5 hours, so as to obtain a colorless and transparent polyarylene siloxane.

The Mw of the polyarylene siloxane was measured using GPC, and as a result, it was 39,994.

The Tg of the polyarylene siloxane was measured using DSC, and as a result it was 49° C.

Example B-6

2,2-Bis(4-hydroxyphenyl)propane (30.03 g; 0.13 mol), dimethyldiphenoxy silane (37.38 g; 0.15 mol), and 11 μmol/mol cesium carbonate used as a catalyst (wherein the amount of the catalyst indicates a relative number of moles to the 2,2-bis(4-hydroxyphenyl)propane) were added into a 100-ml four-neck flask equipped with a stirrer, and the inside of the reaction system was then substituted in a nitrogen atmosphere. The raw materials were melted by heating at 180° C., and were stirred for 30 minutes.

Thereafter, a transesterification reaction was carried out over 1.5 hours, while phenol distilled from the reaction system was condensed in a cooling tube and was removed. The inside of the system was set at 240° C. and a degree of pressure reduction was set at 4 hPa or less, and the reaction mixture was further retained for 1.5 hours, so as to obtain a colorless and transparent polyarylene siloxane.

The Mw of the polyarylene siloxane was measured using GPC, and as a result, it was 34,196.

Example B-7

2,2-Bis(4-hydroxyphenyl)propane (17.51 g; 0.077 mol), dimethyldiphenoxy silane (20.93 g; 0.086 mol), and 7 μmol/mol cesium carbonate used as a catalyst (wherein the amount of the catalyst indicates a relative number of moles to the 2,2-bis(4-hydroxyphenyl)propane) were added into a 100-ml four-neck flask equipped with a stirrer, and the inside of the reaction system was then substituted in a nitrogen atmosphere. The raw materials were melted by heating at 180° C., and were stirred for 30 minutes.

Thereafter, a transesterification reaction was carried out over 1 hour, while phenol distilled from the reaction system was condensed in a cooling tube and was removed. The inside of the system was set at 260° C. and a degree of pressure reduction was set at 4 hPa or less, and the reaction mixture was further retained for 1.5 hours, so as to obtain a colorless and transparent polyarylene siloxane.

The Mw of the polyarylene siloxane was measured using GPC, and as a result, it was 63,257.

The Tg of the polyarylene siloxane was measured using DSC, and as a result it was 54° C.

Synthesis Example 3

Octaphenylcyclotetrasiloxane represented by the following formula (3)(14.9 g; 0.19 mol), diphenyl carbonate (16.1 g; 0.08 mol), and cesium carbonate used as a catalyst (33 mg; 0.1 mmol) were substituted in a nitrogen atmosphere, and were stirred at 200° C. for 10 minutes. After cooling to room temperature, 20 g of heptane was added to the solidified reaction mixture, and the temperature of the mixture was heated to 90° C., and was then subjected to hot filtration. The obtained filtrate was left at room temperature for 3 days, so that a white crystal was precipitated. Furthermore, a crystal obtained by filtration of the mixture, to which 10 g of heptane cooled to 5° C. had been added, was removed from the filter, and was then dried at 40° C. at a degree of pressure reduction of 1 hPa for 45 hours. As a result, 24.1 g of white powders were obtained. As a result of an analysis by $^1$H-NMR, the obtained powders were confirmed to be diphenyldiphenoxy silane. Diphenyldiphenoxy silane ($^1$H-NMR (CDCl3, 500 MHz, δ; ppm)=6.915, 6.927, 6.939, 6.952, 6.965 (p; 6H), 7.142, 7.155, 7.169 (t; 4H), 7.354, 7.366, 7.379 (t; 4H), 7.425, 7.437, 7.449 (t; 2H)), 7.750, 7.762 (d; 4H). The molar yield was found to be 81.1%.

[Formula 64]

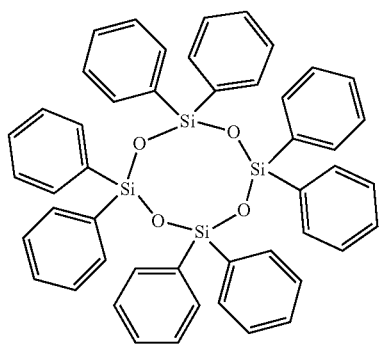

(3)

Example B-8

2,2-Bis(4-hydroxyphenyl)propane (11.75 g; 0.052 mol), diphenyldiphenoxy silane (20.25 g; 0.055 mol), and 20 μmol/mol cesium carbonate used as a catalyst (wherein the amount of the catalyst indicates a relative number of moles to the 2,2-bis(4-hydroxyphenyl)propane) were added into a 100-ml four-neck flask equipped with a stirrer, and the inside of the reaction system was then substituted in a nitrogen atmosphere. The raw materials were melted by heating at 180° C., and were stirred for 30 minutes.

Thereafter, a transesterification reaction was carried out over 1 hour, while phenol distilled from the reaction system was condensed in a cooling tube and was removed. The inside of the system was set at 260° C. and a degree of pressure reduction was set at 4 hPa or less, and the reaction mixture was further retained for 1.5 hours, so as to obtain a colorless and transparent polyarylene siloxane.

The Mw of the polyarylene siloxane was measured using GPC, and as a result, it was 24,482.

The Tg of the polyarylene siloxane was measured using DSC, and as a result it was 89° C.

Comparative Example B-1

2,2-Bis(4-hydroxyphenyl)propane (20.00 g; 0.088 mol) and dimethyldiphenoxy silane (23.62 g; 0.097 mol) were added into a 100-ml four-neck flask equipped with a stirrer, and the inside of the reaction system was then substituted in a nitrogen atmosphere. The raw materials were melted by heating at 180° C., and were stirred for 30 minutes.

Thereafter, the inside of the system was set to be 240° C. and a degree of pressure reduction was set to be 4 hPa (400 Pa) or less, and a transesterification reaction was attempted. However, the raw materials were distilled away, and the reaction did not progress.

Comparative Example B-2

2,2-Bis(4-hydroxyphenyl)propane (21.28 g; 0.093 mol), dimethyldiphenoxy silane (25.12 g; 0.10 mol), and 11 μmol/mol cesium carbonate used as a catalyst (wherein the amount of the catalyst indicates a relative number of moles to the 2,2-bis(4-hydroxyphenyl)propane) were added into a 100-ml four-neck flask equipped with a stirrer, and the inside of the reaction system was then substituted in a nitrogen atmosphere. The raw materials were melted by heating at 180° C., and were stirred for 30 minutes.

Thereafter, the temperature in the system was increased to 240° C. under normal pressure over 1.5 hours, and was further retained for 1.5 hours, so as to obtain a colorless and transparent polyarylene siloxane.

The Mw of the polyarylene siloxane was measured using GPC, and as a result, it was 1,547.

Comparative Example B-3

2,2-Bis(4-hydroxyphenyl)propane (29.96 g; 0.13 mol), dimethyldiphenoxy silane (36.10 g; 0.15 mol), and 16600 μmol/mol cesium carbonate used as a catalyst (or 16.6 mmol/mol: wherein the amount of the catalyst indicates a relative number of moles to the 2,2-bis(4-hydroxyphenyl)propane) were added into a 100-ml four-neck flask equipped with a stirrer, and the inside of the reaction system was then substituted in a nitrogen atmosphere. The raw materials were melted by heating at 180° C., and were stirred for 30 minutes.

Thereafter, a transesterification reaction was carried out over 1 hour, while phenol distilled from the reaction system was condensed in a cooling tube and was removed. The inside of the system was set at 240° C. and a degree of pressure reduction was set at 4 hPa or less, and the reaction mixture was further retained for 1.5 hours, so as to obtain a colorless and transparent polyarylene siloxane.

The Mw of the colorless and transparent polyarylene siloxane was measured using GPC, and as a result, it was 886.

Comparative Example B4

2,2-Bis(4-hydroxyphenyl)propane (30.75 g; 0.14 mol) and dimethyldiphenoxy silane (36.90 g; 0.15 mol) were added into a 100-ml four-neck flask equipped with a stirrer.

Thereafter, the inside of the reaction system was immediately set to be 240° C. and a degree of pressure reduction was set to be 4 hPa (400 Pa) or less, and a transesterification reaction was attempted. However, the raw materials were distilled away, and the reaction did not progress.

The results of individual examples and comparative examples are shown in Table 6.

TABLE 6

| | | | Ex. 38 | Ex. 39 | Ex. 40 | Ex. 41 | Ex. 42 | Ex. 43 |
|---|---|---|---|---|---|---|---|---|
| Raw materials/ catalysts | Aromatic diol compound: BPA (2,2-bis(4-hydroxyphenyl) propane) | g mol (molar amount) | 30.03 0.13 | 30.03 0.13 | 30.05 0.13 | 30.03 0.13 | 30.08 0.13 | 30.03 0.13 |
| | Diphenoxysilane compound: DMDPS (dimethyldiphenoxysilane) (only in Ex. 8, DPDPS (diphenyldiphenoxysilane)) | g mol (molar amount) | 33.50 0.14 | 34.40 0.14 | 34.69 0.14 | 35.10 0.14 | 36.00 0.15 | 37.38 0.15 |
| | Diphenoxysilane compound/BPA | (molar ratio) | 1.04 | 1.07 | 1.08 | 1.09 | 1.12 | 1.16 |
| | Catalyst (Cs$_2$CO$_3$) | μmol/mol (Number of moles (μmol) per mol of aromatic diol compound) | 11 | 11 | 11 | 11 | 11 | 11 |
| Reaction conditions | Reaction temperature | (° C.) | 240 | 240 | 240 | 240 | 240 | 240 |
| Polyarylene siloxane compound (product) | Weight average molecular weight Glass transition temperature | Mw (g/mol) (° C.) | 26.699 — | 33.521 — | 30.603 — | 36.940 — | 39.994 49 | 34.196 — |
| Remarks | | | — | — | — | — | — | — |

| | | Ex. 44 | Ex. 45 | Comp. Ex. 5 | Comp. Ex. 6 | Comp. Ex. 7 | Comp. Ex. 8 |
|---|---|---|---|---|---|---|---|
| | Raw materials/ catalysts | 17.51 0.077 20.93 0.086 1.12 7 | 11.75 0.052 20.25 0.055 1.07 20 | 20.00 0.088 23.62 0.097 1.10 0 | 21.28 0.093 25.12 0.10 1.10 11 | 29.96 0.13 36.10 0.15 1.13 16.600 | 30.75 0.14 36.99 0.15 1.12 11 |
| | Reaction conditions | 240 | 240 | 240 | 240 | 240 | 240 |
| | Polyarylene siloxane compound (product) | 63.257 54 | 24.482 89 | — — | 1.547 — | 886 — | — — |

TABLE 6-continued

| Remarks | — | — | Raw materials were distilled away, and the reaction did not progress (without catalysts). | Reacted under normal pressure (without vacuum distillation) | — | Pressure reduction at initiation of reaction: raw materials were distilled away, and were not polymerized. |
| --- | --- | --- | --- | --- | --- | --- |

What is claimed is:

1. A method for producing a polysiloxane compound, which includes polymerization of monomers comprising:

an oxy silane compound comprising at least any one of a diaryloxy silane compound that is any one of dialkyldiaryloxy silane, diaryldiaryloxy silane and monoalkylmonoaryldiaryloxy silane, and a dialkoxy silane compound that is any one of dialkyldialkoxy silane, diaryldialkoxy silane and monoalkylmonoaryldialkoxy silane; and a diol compound selected from (1-1)
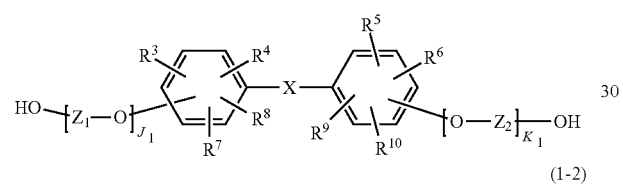

(1-2)
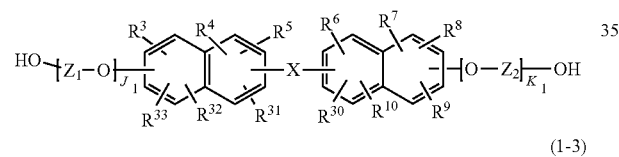

(1-3)
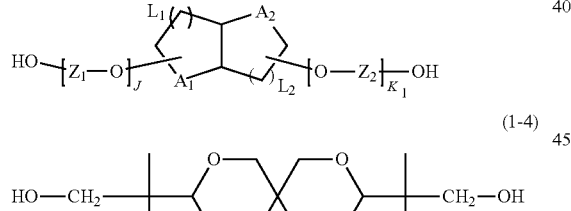

(1-4)

wherein in the polymerization, the oxy silane compound and the diol compound are polymerized using a transesterification catalyst, while removing the generated aryl alcohol and/or alkyl alcohol, in a molten state and under reduced pressure, the monomers for polymerization do not comprise a carbonate compound, and the amount of the transesterification catalyst to the diol compound is 0.01 μmol/mol to 16,000 μmol/mol at a molar ratio, so that a poly(arylene/alkylene) siloxane compound with a weight average molecular weight of 10,000 to 300,000, comprising a constituent unit represented by any one of the following formulae (1-1') to (1-4'), is produced:

(1-1)'
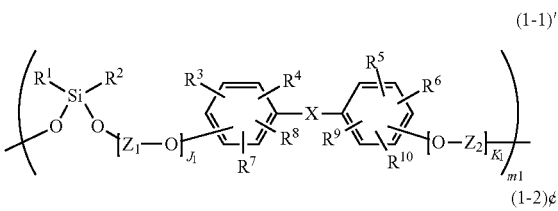

(1-2)'

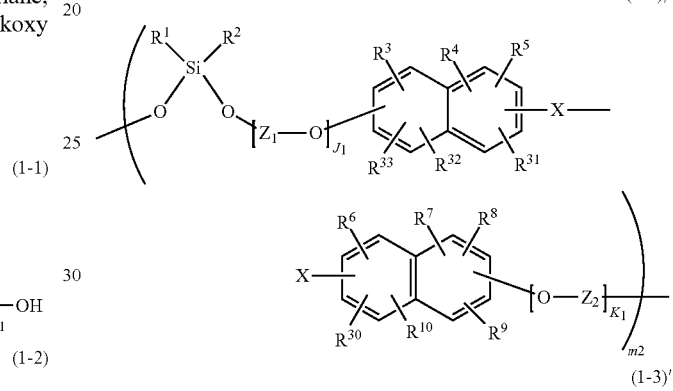

(1-3)'

(1-4)'
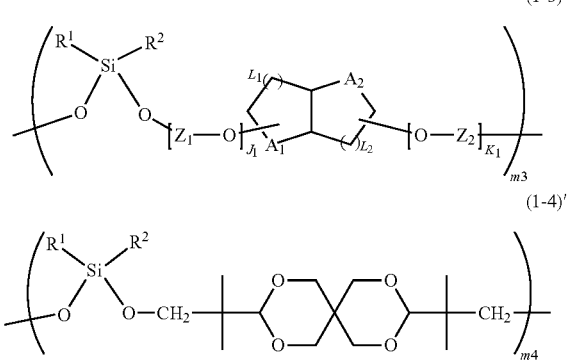

wherein, in the above formulae (1-1) to (1-4) and (1-1') to (1-4'), $R^1$ and $R^2$ each independently represent an alkyl group containing 1 to 20 carbon atoms and optionally having a substituent, or an aryl group containing 6 to 30 carbon atoms and optionally having a substituent, $R^3$ to $R^{10}$ and $R^{30}$ to $R^{33}$ each independently represent hydrogen, halogen, alkoxy, an alkyl group containing 1 to 20 carbon atoms and optionally having a substituent, an alkenyl group containing 2 to 20 carbon atoms and optionally having a substituent, or an aryl group containing 6 to 30 carbon atoms and optionally having a substituent, $Z_1$ and $Z_2$ each independently represent an alkylene group containing 1 to 5 carbon atoms and optionally having a substituent, $J_1$ each independently represent an integer of 0 or more and 5 or less, $K_1$ each independently represents an integer of 0 or more and 5 or less, $A_1$ and $A_2$ each independently represent either —O— or —CH—, $L_1$ and $L_2$ each independently represent an integer of 0 or more and 3 or less, $m_1$ to $m_4$ each represent the total number of constituent units in each formula, which is a natural number of 10 or more and 1000 or less, and X represents a single bond or any one of structural formulae represented by the following formula (2):

(2)

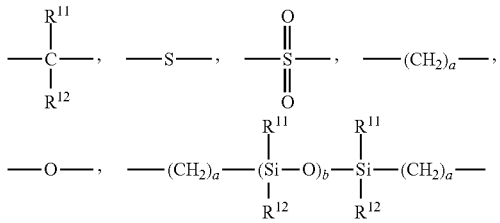

wherein $R^{11}$ and $R^{12}$ each independently represent hydrogen, halogen, an alkyl group containing 1 to 20 carbon atoms and optionally having a substituent, or an aryl group containing 6 to 30 carbon atoms and optionally having a substituent, or $R^{11}$ and $R^{12}$ bind to each other to form a carbocyclic or heterocyclic ring containing 1 to 20 carbon atoms and optionally having a substituent, a and b each independently represent an integer of 0 or 1 or more and 5000 or less;

wherein the transesterification catalyst comprises an alkali metal compound and/or an alkaline-earth metal compound comprising any one or more of a carbonate, a hydroxide and an oxide;

wherein the polymerization is initially carried out at atmospheric pressure followed by a step-wise reduction in pressure to a final pressure of 400 Pa or less; and in the polymerization, the polysiloxane compound is produced, while removing alcohol generated as a by-product.

2. The method for producing a polysiloxane compound according to claim 1, wherein the X has a siloxane constituent unit showing a fluorene ring structure formed by the binding of $R^{11}$ and $R^{12}$.

3. The method for producing a polysiloxane compound according to claim 1, wherein the reaction temperature in the polymerization is within a range of 150° C. or higher and 300° C. or lower.

4. The method for producing a polysiloxane compound according to claim 1, wherein the reaction time before the pressure reduction, which is duration of the polymerization at atmospheric pressure, is 0.5 to 3 hours, and the reaction time after the pressure reduction, which is duration of entirety of the polymerization reaction under reduced pressure, is 1 to 5 hours.

5. The method for producing a polysiloxane compound according to claim 1, wherein, in the polymerization, the amount of the transesterification catalyst to the aromatic diol compound is 0.1 to 100 umol/mol at a molar ratio.

6. The method for producing a polysiloxane compound according to claim 1, wherein the transesterification catalyst is the alkali metal compound and/or the alkaline-earth metal compound.

7. The method for producing a polysiloxane compound according to claim 1, wherein, in the polymerization, a solvent is not used.

8. The method for producing a polysiloxane compound according to claim 1, wherein the molar ratio between the diaryloxy silane compound and the aromatic diol compound, which are used in the polymerization, is 0.9 or more and 1.2 or less.

9. The method for producing a polysiloxane compound according to claim 1, wherein, in the polymerization, the oxy silane compound or the diaryloxy silane compound, and the alicyclic diol compound or the aromatic diol compound are polymerized at a reaction temperature of higher than 200° C., and/or under reduced pressure.

10. A composition comprising a polysiloxane compound produced by the following production method and a polycarbonate resin;

wherein the production method includes polymerization of monomers comprising:

an oxy silane compound comprising at least any one of a diaryloxy silane compound that is any one of dialkyldiaryloxy silane, diaryldiaryloxy silane and monoalkylmonoaryldiaryloxy silane, and a dialkoxy silane compound that is any one of dialkyldialkoxy silane, diaryldialkoxy silane and monoalkylmonoaryldialkoxy silane; and a diol compound selected from (1-1)

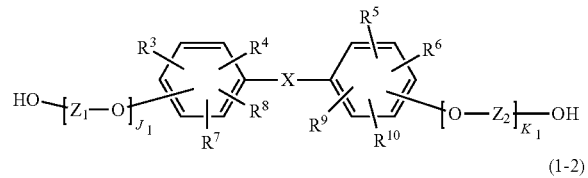

(1-2)

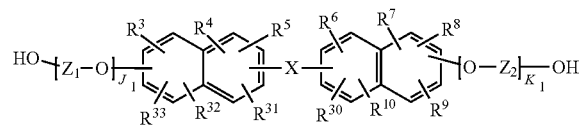

(1-3)

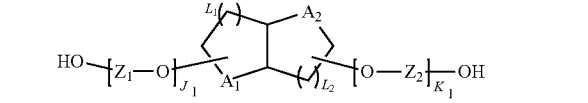

(1-4)

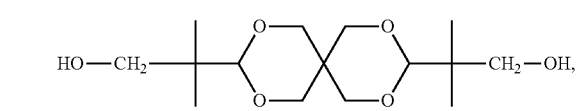

wherein in the polymerization, the oxy silane compound and the diol compound are polymerized using a transesterification catalyst, while removing the generated aryl alcohol and/or alkyl alcohol, in a molten state and under reduced pressure, the monomers for polymerization do not comprise a carbonate compound, and the amount of the transesterification catalyst to the diol compound is 0.01 μmol/mol to 16,000 μmol/mol at a molar ratio, so that a polysiloxane compound with a weight average molecular weight of 10,000 to 300,000, comprising a constituent unit represented by any one of the following formulae (1-1') to (1-4'), is produced:

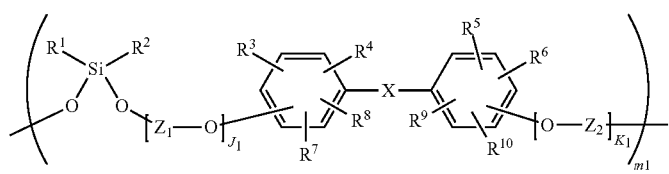

(1-1)'

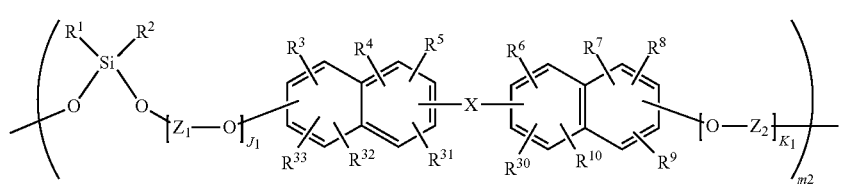

(1-2)'

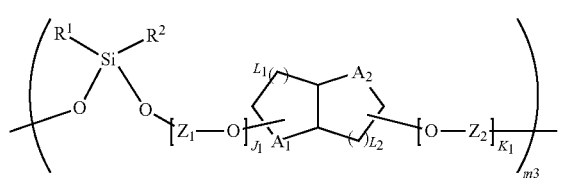

(1-3)'

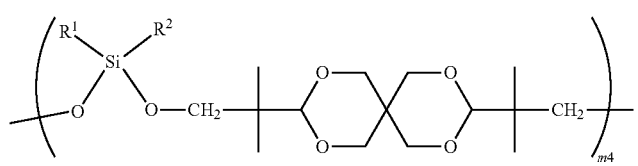

(1-4)' wherein, in the above formulae (1-1) to (1-4) and (1-1') to (1-4'), $R^1$ and $R^2$ each independently represent an alkyl group containing 1 to 20 carbon atoms and optionally having a substituent, or an aryl group containing 6 to 30 carbon atoms and optionally having a substituent, $R^3$ to $R^{10}$ and $R^{30}$ to $R^{33}$ each independently represent hydrogen, halogen, alkoxy, an alkyl group containing 1 to 20 carbon atoms and optionally having a substituent, an alkenyl group containing 2 to 20 carbon atoms and optionally having a substituent, or an aryl group containing 6 to 30 carbon atoms and optionally having a substituent, $Z_1$ and $Z_2$ each independently represent an alkylene group containing 1 to 5 carbon atoms and optionally having a substituent, $J_1$ each independently represent an integer of 0 or more and 5 or less, $K_1$ each independently represents an integer of 0 or more and 5 or less, $A_1$ and $A_2$ each independently represent either —O— or —CH—, $L_1$ and $L_2$ each independently represent an integer of 0 or more and 3 or less, $m_1$ to $m_4$ each represent the total number of constituent units in each formula, which is a natural number of 10 or more and 1000 or less, and X represents a single bond or any one of structural formulae represented by the following formula (2):

(2)

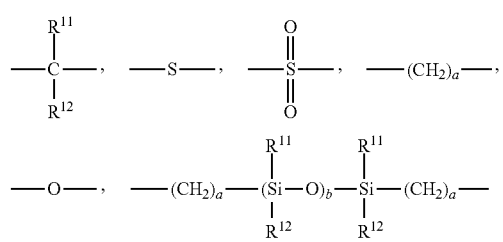

wherein $R^{11}$ and $R^{12}$ each independently represent hydrogen, halogen, an alkyl group containing 1 to 20 carbon atoms and optionally having a substituent, or an aryl group containing 6 to 30 carbon atoms and optionally having a substituent, or $R^{11}$ and $R^{12}$ bind to each other to form a carbocyclic or heterocyclic ring containing 1 to 20 carbon atoms and optionally having a substituent, and a and b each independently represent an integer of 0 or 1 or more and 5000 or less; and wherein the polysiloxane compound comprises a constituent unit represented by any one of the following formulae (1-1)" to (1-4)" and having a weight average molecular weight of 5,000 to 300,000, wherein the total content of a ring form represented by the following formula (5-4) is 4.0% by weight or less:

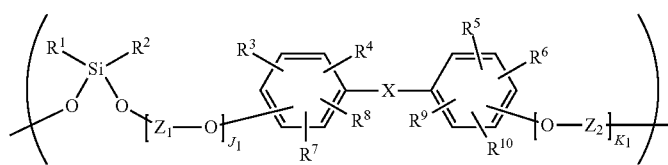
(1-1)″

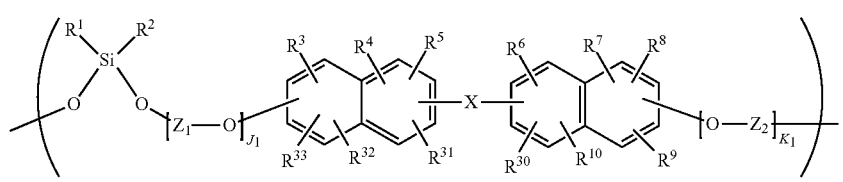
(1-2)″

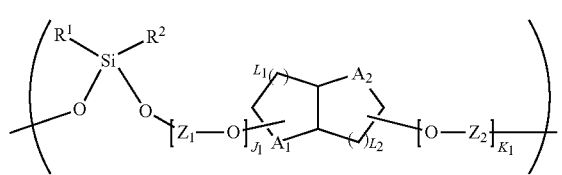
(1-3)″

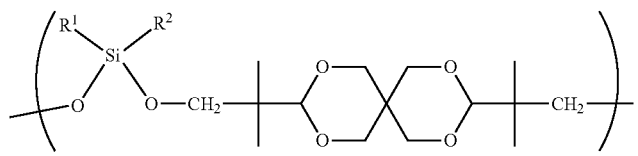
(1-4)″ wherein, in the above formulae (1-1)″ to (1-4)″, $R^1$ and $R^2$ each independently represent an alkyl group containing 1 to 20 carbon atoms and optionally having a substituent, or an aryl group containing 6 to 30 carbon atoms and optionally having a substituent, $R^3$ to $R^{10}$ and $R^{30}$ to $R^{33}$ each independently represent hydrogen, halogen, alkoxy, an alkyl group containing 1 to 20 carbon atoms and optionally having a substituent, an alkenyl group containing 2 to 20 carbon atoms and optionally having a substituent, or an aryl group containing 6 to 30 carbon atoms and optionally having a substituent, $Z_1$ and $Z_2$ each independently represent an alkylene group containing 1 to 5 carbon atoms and optionally having a substituent, $J_1$ each independently represents an integer of 0 or more and 5 or less, $K_1$ each independently represents an integer of 0 or more and 5 or less, $A_1$ and $A_2$ each independently represent either —O— or —CH—, $L_1$ and $L_2$ each independently represent an integer of 0 or more and 3 or less, and X represents a single bond or any one of structural formulae represented by the following formula (2):

(2)

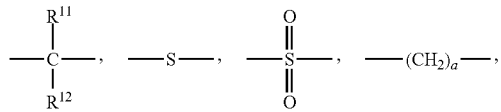

-continued

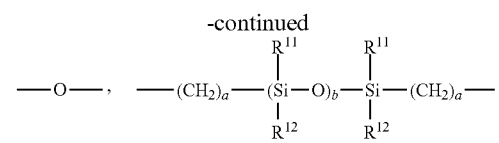

wherein $R^{11}$ and $R^{12}$ each independently represent hydrogen, halogen, an alkyl group containing 1 to 20 carbon atoms and optionally having a substituent, or an aryl group containing 6 to 30 carbon atoms and optionally having a substituent, or $R^{11}$ and $R^{12}$ bind to each other to form a carbocyclic or heterocyclic ring containing 1 to 20 carbon atoms and optionally having a substituent, and a and b each independently represent an integer of 0 or 1 or more and 5000 or less, and (5-4)

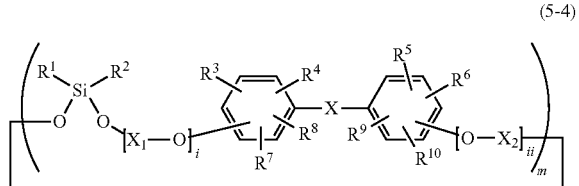

wherein the constituent unit represented by the formula (5-4) and other constituent units are arbitrarily disposed, and the total value of m is 2 to 10, $R^1$ and $R^2$ each independently represent an alkyl group containing 1 to 20 carbon atoms and optionally having a substituent, or an aryl group containing 6 to 30 carbon atoms and optionally having a substituent, $R^3$ to $R^{10}$ each independently represent hydrogen, halogen, alkoxy, an alkyl group containing 1 to 20 carbon atoms and optionally having a substituent, an alkenyl group containing 2 to 20 carbon atoms and optionally having a substituent, or an aryl group containing 6 to 30 carbon atoms and optionally having a substituent, $X_1$ and $X_2$ each independently represent an alkylene group containing 1 to 5 carbon atoms and optionally having a substituent, i and ii each independently represent an integer of 0 or more and 5 or less, m represents an integer of 2 to 10, and X represents a single bond or any one of structural formulae represented by the following formula (2):

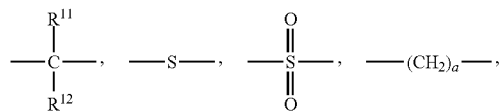

(2)

-continued

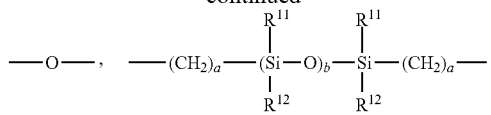

wherein $R^{11}$ and $R^{12}$ each independently represent hydrogen, halogen, an alkyl group containing 1 to 20 carbon atoms and optionally having a substituent, or an aryl group containing 6 to 30 carbon atoms and optionally having a substituent, or $R^{11}$ and $R^{12}$ bind to each other to form a carbocyclic or heterocyclic ring containing 1 to 20 carbon atoms and optionally having a substituent, and a and b each independently represent an integer of 0 or 1 or more and 5000 or less.

11. The composition according to claim 10, wherein the total amount of Si is 0.1% to 20% by mass.

12. The composition according to claim 10, wherein $Q_1$ that is the Q value of the composition measured under conditions of 280° C. and 160 kgf is 120% or more of $Q_2$ that is the Q value of only the polycarbonate resin comprised in the composition measured under the same conditions as described above.

* * * * *